(12) United States Patent
Miki et al.

(10) Patent No.: US 7,991,532 B2
(45) Date of Patent: Aug. 2, 2011

(54) WHEEL CONTROL DEVICE AND CONTROL DEVICE

(75) Inventors: Nobuaki Miki, Tokyo (JP); Munehisa Horiguchi, Tokyo (JP); Takafumi Miyake, Tokyo (JP); Susumu Okawa, Tokyo (JP)

(73) Assignee: Equos Research Co., Ltd., Tokyo (JP)

( * ) Notice: Subject to any disclaimer, the term of this patent is extended or adjusted under 35 U.S.C. 154(b) by 820 days.

(21) Appl. No.: 11/663,511

(22) PCT Filed: Dec. 27, 2005

(86) PCT No.: PCT/JP2005/023982
§ 371 (c)(1),
(2), (4) Date: Sep. 28, 2007

(87) PCT Pub. No.: WO2006/070842
PCT Pub. Date: Jul. 6, 2006

(65) Prior Publication Data
US 2008/0162009 A1    Jul. 3, 2008

(30) Foreign Application Priority Data

Dec. 27, 2004  (JP) ................................. 2004-375149
Dec. 27, 2004  (JP) ................................. 2004-375282
Mar. 30, 2005  (JP) ................................. 2005-099498
Apr. 27, 2005  (JP) ................................. 2005-129417

(51) Int. Cl.
*G06F 7/00* (2006.01)

(52) U.S. Cl. ............... 701/80; 701/78; 701/70; 701/71

(58) Field of Classification Search .............. 701/48, 701/70, 71, 74, 80
See application file for complete search history.

(56) References Cited

U.S. PATENT DOCUMENTS

| | | | | |
|---|---|---|---|---|
| 4,717,175 | A * | 1/1988 | Arai et al. ............... | 280/5.523 |
| 4,884,651 | A * | 12/1989 | Harada et al. ............ | 180/197 |
| 5,408,411 | A * | 4/1995 | Nakamura et al. ........ | 701/48 |
| 5,711,585 | A * | 1/1998 | Tozu et al. ............... | 303/146 |
| 5,762,157 | A * | 6/1998 | Uehara ..................... | 180/197 |
| 6,035,251 | A * | 3/2000 | Hac et al. ................. | 701/70 |
| 6,233,505 | B1 * | 5/2001 | Kranz et al. .............. | 701/1 |
| 6,236,926 | B1 * | 5/2001 | Naitou ..................... | 701/70 |
| 6,415,215 | B1 * | 7/2002 | Nishizaki et al. .......... | 701/70 |
| 6,470,250 | B2 * | 10/2002 | Nishizaki et al. .......... | 701/48 |
| 6,533,370 | B2 * | 3/2003 | Yokoyama et al. ........ | 303/163 |
| 6,697,728 | B2 * | 2/2004 | Kin et al. ................. | 701/70 |
| 6,792,343 | B2 * | 9/2004 | Yasui et al. .............. | 701/71 |
| 7,502,676 | B2 * | 3/2009 | Ono et al. ................ | 701/41 |

(Continued)

FOREIGN PATENT DOCUMENTS

JP    63-184575    7/1988

(Continued)

*Primary Examiner* — Mark Hellner
*Assistant Examiner* — Helal A Algahaim
(74) *Attorney, Agent, or Firm* — Bacon & Thomas, PLLC

(57) ABSTRACT

The present invention provides a novel method for generating braking force in a wheel. In a vehicle having wheels, a wheel control device for controlling the wheels is provided with an actuator for performing an operation to vary a slip angle of the wheels, and a controller for controlling the actuator to increase the braking force of the wheels by increasing the slip angle absolute value of the wheels such that a lateral force is generated in the wheels relative to a ground contact surface of the wheels.

4 Claims, 26 Drawing Sheets

U.S. PATENT DOCUMENTS

| | | | |
|---|---|---|---|
| 7,672,772 B2 * | 3/2010 | Kitazaki et al. | 701/82 |
| 2001/0004168 A1 * | 6/2001 | Onogi | 303/199 |
| 2001/0056317 A1 * | 12/2001 | Nishizaki et al. | 701/48 |
| 2002/0010535 A1 * | 1/2002 | Nishio | 701/70 |
| 2002/0047305 A1 * | 4/2002 | Yokoyama et al. | 303/163 |
| 2002/0109402 A1 * | 8/2002 | Nakamura | 303/146 |
| 2002/0167156 A1 * | 11/2002 | Akutagawa et al. | 280/757 |
| 2003/0074123 A1 * | 4/2003 | Kin et al. | 701/70 |
| 2003/0182045 A1 * | 9/2003 | Miyazaki | 701/70 |
| 2004/0016594 A1 * | 1/2004 | Yasui et al. | 180/446 |
| 2004/0176899 A1 * | 9/2004 | Hallowell | 701/84 |
| 2004/0262991 A1 * | 12/2004 | Anwar | 303/147 |
| 2005/0004740 A1 * | 1/2005 | Miyazaki | 701/78 |
| 2005/0005691 A1 * | 1/2005 | Ono et al. | 73/146 |
| 2005/0055149 A1 * | 3/2005 | Kato et al. | 701/80 |
| 2005/0085986 A1 * | 4/2005 | Aizawa et al. | 701/73 |
| 2005/0222728 A1 * | 10/2005 | Hac et al. | 701/38 |
| 2006/0012245 A1 * | 1/2006 | Post et al. | 303/154 |
| 2006/0074541 A1 * | 4/2006 | Ono et al. | 701/80 |
| 2006/0108170 A1 * | 5/2006 | Ishikawa et al. | 180/282 |
| 2009/0012669 A1 * | 1/2009 | Takenaka et al. | 701/29 |

FOREIGN PATENT DOCUMENTS

| | | |
|---|---|---|
| JP | 2-204175 | 8/1990 |
| JP | 4-345513 | 12/1992 |
| JP | 4-345515 | 12/1992 |
| JP | 5-58320 | 3/1993 |
| JP | 5-139138 | 6/1993 |
| JP | 5-155325 | 6/1993 |
| JP | 6-080047 | 3/1994 |
| JP | 2000-118429 | 4/2000 |

* cited by examiner

F I G. 18A
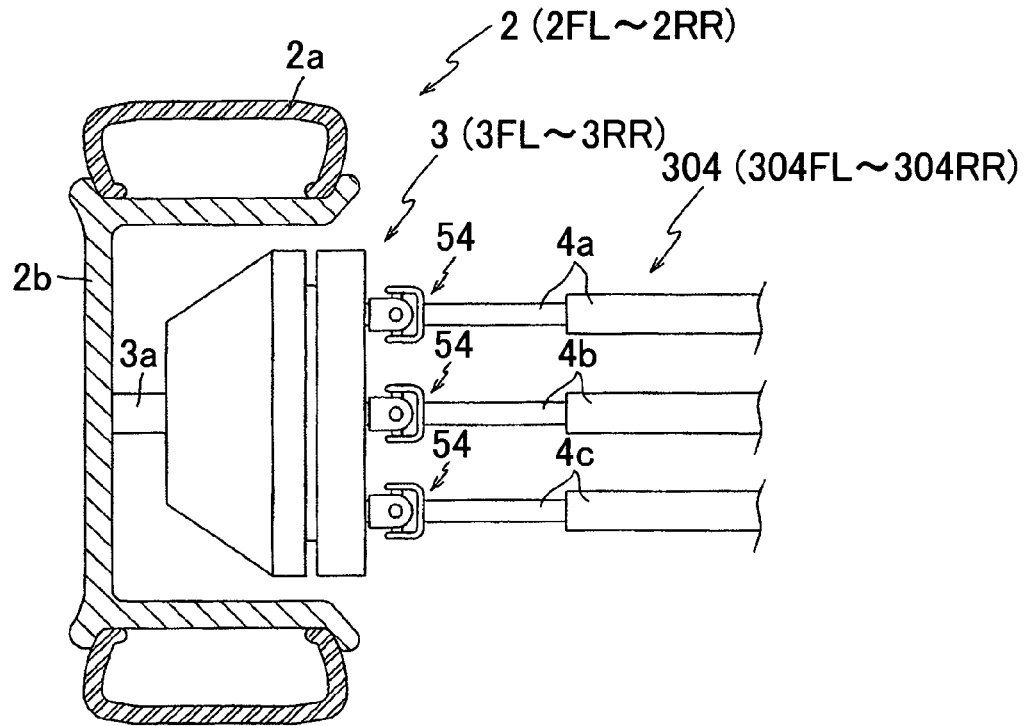
F I G. 18B
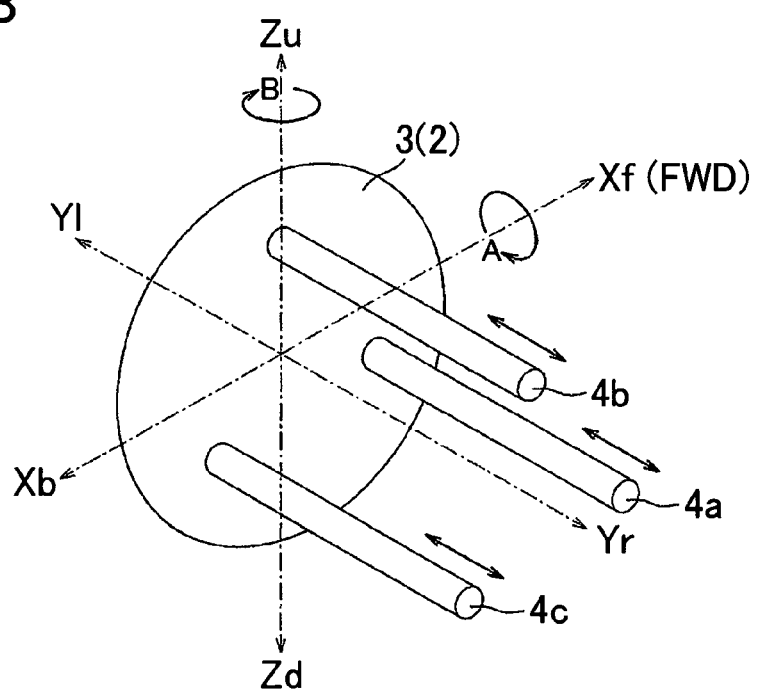

WHEEL CONTROL DEVICE AND CONTROL DEVICE

The disclosure of PCT International Patent Application No. PCT/JP2005/023982 filed on Dec. 27, 2005 including the specification, drawings and abstract is incorporated herein by reference in its entirety.

BACKGROUND OF THE INVENTION

1. Field of the Invention

The present invention relates to a wheel control device and a control device, and more particularly to a wheel control device and a control device with which an improvement in the braking force of a vehicle can be achieved, and reductions in vehicle stability during wheel driving can be suppressed.

2. Description of the Related Art

Antilock control exists as a conventional example of a technique for controlling a wheel to achieve an increase in the braking force thereof (Japanese Patent Application Publication No. JP-A-HEI5-155325). According to this antilock control, the slip ratio of the wheel is controlled during vehicle braking to ensure that the wheel does not lock, and in so doing, a reduction in the braking force of the vehicle caused by an excessive brake operating force (brake pressure, for example) is prevented.

Techniques for suppressing decreases in vehicle stability during driving of the wheels also exist. An example of these techniques is known as traction control (Japanese Patent Application Publication No. JP-A-HEI6-80047). According to this traction control, when the spin tendency of a drive wheel is large during vehicle driving, the driving torque of the drive wheel is reduced by the brake, and thus the slip ratio of the drive wheel is controlled. As a result, reductions in vehicle stability caused when the slip ratio of the drive wheel deviates from an appropriate range are suppressed.

SUMMARY OF THE INVENTION

Incidentally, the slip ratio of the wheel and the braking force are related such that when the slip ratio increases from zero, the braking force passes through a first region (a linear region, for example) in which it increases monochromatically and then shifts to a second region in which it decreases rapidly. The actual value of the slip ratio when the braking force shifts from the first region to the second region varies constantly, and it is difficult to detect the actual slip ratio value accurately upon every variation.

Hence, in antilock control, an anticipated value that is anticipated to be lower than the actual value of the slip ratio at all times when the braking force shifts from the first region to the second region is determined, and the brake operating force is controlled on the basis of this anticipated value such that the slip ratio of the wheel never exceeds the anticipated value. Further, in conventional antilock control, ON/OFF control of an operation is performed using the start of wheel slipping or locking as a trigger, and this control may generate an extremely unpleasant bodily sensation. Therefore, repeated ON/OFF control such as antilock control cannot make continuous use of road surface friction, and cannot make use of a MAX friction value. In other words, realistically, it is difficult to perform wheel braking using a road surface μ to the full.

In consideration of the circumstances described above, an object of the present invention is to provide a novel method of generating braking force in a wheel of a vehicle using a technique of controlling the wheel such that the braking force of the wheel increases.

Further, in consideration of these circumstances, the present inventors developed a novel method of generating braking force in a wheel using a technique of controlling the wheel so that the braking force of the wheel increases. More specifically, this method (which is unpublished at the time of this application) achieves an increase in the braking force of the wheel by increasing slip angle absolute value of the wheel during vehicle braking using an actuator device, and using a lateral force generated on the ground contact surface of the wheel as braking force.

The present invention has been designed to further improve this novel method relating to wheel control technology, and it is an object thereof to provide a control device that can improve the braking force of a vehicle and shorten the braking distance.

Further, according to the conventional example (traction control) described above, the slip ratio of the wheel is controlled to suppress reductions in vehicle stability. However, there is a limit to the extent to which reductions in vehicle stability can be suppressed relying only on control of the slip ratio. Hence, there is a need for a novel technique of suppressing reductions in vehicle stability using a different principle to slip ratio control.

In consideration of these circumstances, an object of the present invention is to provide a novel technique of suppressing reductions in vehicle stability during wheel driving in a vehicle, in which the slip angle of a steered wheel is controlled.

The various aspects described below are obtained from the present invention. Each aspect is compartmentalized into paragraphs, and each paragraph is allocated a numeral and described in a form citing the numerals of other paragraphs where necessary. This form is taken to facilitate understanding of a part of the technical features that may be employed by the present invention and combinations thereof, and should not be interpreted to mean that the technical features that may be employed by the present invention and combinations thereof are limited to the following aspects. In other words, this should be interpreted to mean that technical features described in the present specification but not described in the following aspects may be extracted and employed appropriately as technical features of the present invention.

Furthermore, the fact that each paragraph is described in a form citing the numerals of other paragraphs does not mean that the technical features described in each paragraph cannot be separated from the technical features described in the other paragraphs and presented independently, and should be interpreted to mean that the technical features described in each paragraph may be presented independently, appropriately, and in accordance with the properties thereof.

A wheel control device according to a first aspect which controls a wheel in a vehicle having the wheel, and includes: an actuator that operates to vary a slip angle of the wheel; and a controller for controlling the actuator to increase a braking force of the wheel by increasing a slip angle absolute value of the wheel such that a lateral force is generated in the wheel relative to a ground contact surface of the wheel. The controller has a braking control portion for controlling the actuator to apply braking to the vehicle, and when braking of the vehicle is required, the braking control portion performs at least one of increasing the slip angle absolute value by a fixed amount and varying (increasing or decreasing) the slip angle absolute value by any amount.

When the wheel rolls along a road surface at a slip angle α that is not zero, rolling resistance and lateral force are generated between the wheel and the road surface. Of the resulting force of the rolling resistance and lateral force, i.e. the total frictional force, the component acting in the vehicle body advancement direction is the frictional force that contributes to wheel braking. This frictional force increases in accordance with the lateral force.

Cornering force acting on the wheel is saturated after increasing from zero when the slip angle α increases from zero, whereas lateral force continues to increase monochromatically even though the gradient thereof becomes steadily sharper. By increasing the slip angle absolute value α of the wheel, the lateral force having this characteristic can be used actively in wheel braking.

Hence, by using the lateral force of the wheel, the braking force of the wheel can be increased independently of the wheel brake. Here, the term "increasing the braking force" indicates both generating braking force in a wheel in which no braking force has been generated and increasing braking force that has already been generated.

On the basis of the learning described above, in the wheel control device according to this invention, the slip angle absolute value of the wheel is increased to increase the braking force of the wheel. Hence, according to this wheel control device, wheel braking can be performed through the active use of lateral force.

In the aspect, the term "the slip angle absolute value of the wheel is increased" may indicate varying the slip angle from zero to a value other than zero, or in other words generating a slip angle in the wheel, or varying the slip angle from a value other than zero to a value having a larger absolute value.

In the aspect, the object of "increasing the braking force of the wheel" includes applying braking force to brake the vehicle, or in other words to generate deceleration in the vehicle body during traveling, and also applying braking force to increase the ground contact property of the tire (wheel) to ensure that the vehicle is driven (accelerated) or started smoothly, or in other words to raise the ground contact property of a drive wheel in the vehicle to suppress a spin tendency in the drive wheel.

Incidentally, when the vehicle turns, a slip angle tends to be generated in the wheel regardless of whether the wheel is a steered wheel or a non-steered wheel. When the wheel control device according to this invention is operated, variation is applied to the slip angle generated in response to the vehicle turning such that the absolute value thereof increases.

To apply variation to the slip angle, the "actuator" of this invention is operated, and the "actuator" may be provided as a dedicated actuator that is operated to apply this variation Note, however, that when the vehicle is provided with an actuator that is operated to generate a slip angle by applying a steering angle to a steered wheel in accordance with a turn command issued by a driver, variation that does not correspond to the turn command issued by the driver may be applied to the slip angle of the steered wheel by the same actuator.

In the wheel control device according to the aspect, the vehicle has a plurality of wheels, and when these wheels correspond respectively to a wheel in which the slip angle absolute value is increased, the wheel control device may be implemented in an embodiment whereby a control target value of the slip angle absolute value of each wheel is determined independently of the control target value or actual value of slip angle absolute value of the other wheel.

Alternatively, the wheel control device according to this invention may be implemented in an embodiment whereby the control target value of the slip angle absolute value of each wheel is determined depending on the control target value or actual value of slip angle absolute value of the other wheel.

For example, a target value of the slip angle absolute value may be determined provisionally and independently for each wheel, whereupon the provisional target value determined in relation to a subject wheel of the plurality of wheels is corrected to approach or match the provisional target value determined in relation to the other wheel, with which the subject wheel is to be compared.

This correction may be permitted or prohibited in accordance with the relationship between the subject wheel and the other wheel in terms of the magnitude of the wheel braking ability (for example, the ground contact load, the road surface frictional coefficient, and so on). For example, when a difference in wheel braking ability between the subject wheel and the other wheel is equal to or smaller than a reference value (for example, when the ground contact load or road surface frictional coefficient differs between the left and right wheels by a reference value or more), correction may be prohibited, and when the difference exceeds the reference value, correction may be permitted.

When the vehicle has a plurality of wheels, the "actuator" of the aspect is preferably provided for each wheel, for example, and the slip angle of the corresponding wheel is preferably varied independently of the slip angle of the other wheel.

Further, the wheel control device according to the aspect may be implemented in an embodiment whereby the controller increases the slip angle absolute value of the wheel not in accordance with the turn command issued by the driver, for example.

According to the wheel control device of the aspect, the lateral force of the wheel is used actively to perform wheel braking by increasing the slip angle absolute value of the wheel, and as a result, braking is applied to the vehicle. Hence, according to this wheel control device, the braking force of the wheel can be increased more easily than in a case where the braking force of the wheel is dependent on antilock control alone, and by extension, the braking distance of the vehicle can be shortened easily, or in other words the braking effect can be improved.

Furthermore, ON/OFF control such as that of the conventional art is not required, and therefore bodily discomfort can be suppressed. As a result, the braking force can be improved through the continuous use of road surface friction.

According to an embodiment of the wheel control device according to the aspect, the braking control portion increases the slip angle absolute value of the wheel in response to a braking command signal instructing vehicle braking.

An example of the "required deceleration" in the aspect and each of the following aspects is an instructed deceleration or instructed braking force reflecting the strength of the desire of the driver to brake (for example, an amount by which the brake is operated by the driver), and another example is a target deceleration or target braking force obtained through calculation during automatic control represented by inter-vehicle distance control and automatic braking control.

In a wheel control device according to a second aspect, pertaining to the wheel control device according to the first aspect, when braking of the vehicle is required, the braking control portion varies the slip angle absolute value by a variable amount based on at least one of a frictional coefficient of a part of a road surface along which the vehicle is traveling that is contacted by the wheel, and a ground contact load of the wheel.

In a wheel control device according to a third aspect pertaining to the wheel control device according to the first aspect or the second aspect, the controller has an emergency braking control portion for controlling the actuator to apply emergency braking to the vehicle, and when emergency braking of the vehicle is required, the emergency braking control portion performs at least one of increasing the slip angle absolute value by a fixed amount and varying the slip angle absolute value by a variable amount corresponding to a required deceleration of the vehicle.

According to the wheel control device of the aspect, the lateral force of the wheel is used actively to perform wheel braking by increasing the slip angle absolute value of the wheel, and as a result, emergency braking is applied to the vehicle. In other words, the lateral force of the wheel is used to realize emergency vehicle braking.

According to an embodiment of the wheel control device of the aspect, the braking control portion increases the slip angle absolute value of the wheel in response to an emergency braking signal instructing emergency vehicle braking.

In a wheel control device according to a fourth aspect, pertaining to the wheel control device according to any one of the first to third aspects, the vehicle also has a power source for driving the wheel, and the controller has a driving control portion for controlling the actuator when the vehicle needs to be driven by the power source to reduce a driving torque of the wheel, generated by the drive source, using the braking force of the wheel.

According to this wheel control device of the aspect, the lateral force of the wheel is used actively to perform wheel braking by increasing the slip angle absolute value of the wheel. As a result, the driving torque of the wheel, generated by the drive source, is reduced by the braking force of the wheel. Hence, according to this wheel control device, the spin tendency of the drive wheel is suppressed during vehicle driving (including both acceleration and start-up), and therefore smooth vehicle driving is realized.

According to an embodiment of the wheel control device of the aspect, the driving control portion increases the slip angle absolute value of the drive wheel in response to a signal indicating that the spin tendency of the drive wheel has exceeded an allowable range.

Note that the wheel control device may be provided in the following embodiment. That is, a wheel control device controls a wheel in a vehicle having the wheel, and includes: an actuator that operates to vary a slip angle of the wheel; and a controller for controlling the actuator to increase a braking force of the wheel by increasing a slip angle absolute value of the wheel such that a lateral force is generated in the wheel relative to a ground contact surface of the wheel. The controller has a braking control portion for controlling the actuator to apply braking to the vehicle, and when braking of the vehicle is required, the braking control portion varies the slip angle absolute value by a variable amount based on at least one of a frictional coefficient of a part of a road surface along which the vehicle is traveling that is contacted by the wheel, and a ground contact load of the wheel.

A control device according to a fifth aspect is a control device for a vehicle having a wheel constituted to be steerable, an actuator device for steerably driving the wheel, and a wheel driving device for driving the wheel to rotate, which operates the actuator device and the wheel driving device to control a slip angle and a rotation speed of the wheel, and includes: an actuator operating unit for operating the actuator device to increase a braking force of the wheel by increasing a slip angle absolute value of the wheel such that a lateral force is generated on a ground contact surface of the wheel; and a wheel driving device operating unit for operating the wheel driving device to vary the rotation speed of the wheel, the slip angle absolute value of which has been increased by the actuator operating unit, such that an amount of vehicle advancement direction deformation on the ground contact surface of the wheel increases.

A control device according to a sixth aspect, pertaining to the control device according to the fifth aspect, also has: a ground speed detecting unit for detecting a ground speed of the vehicle; a rotation speed detecting unit for detecting the rotation speed of the wheel; a slip angle detecting unit for detecting the slip angle of the wheel; a deformation amount calculating unit for calculating the amount of vehicle advancement direction deformation on the ground contact surface of the wheel on the basis of the ground speed, the rotation speed, and the slip angle detected by the ground speed detecting unit, the rotation speed detecting unit, and the slip angle detecting unit; and a storage unit for storing a limit value of the vehicle advancement direction deformation on the ground contact surface of the wheel. The wheel driving device operating unit operates the wheel driving device to vary the rotation speed of the wheel such that the amount of vehicle advancement direction deformation on the ground contact surface of the wheel increases within a range that does not exceed the deformation limit value stored in the storage unit.

A control device according to a seventh aspect, pertaining to the control device according to the sixth aspect, also includes: a frictional coefficient detecting unit for detecting a frictional coefficient of a part of a road surface along which the wheel is traveling that corresponds to the ground contact surface of the wheel; and a correcting unit for correcting the deformation limit value stored in the storage unit on the basis of the frictional coefficient detected by the frictional coefficient detecting unit. The wheel driving device operating unit operates the wheel driving device to vary the rotation speed of the wheel such that the amount of vehicle advancement direction deformation on the ground contact surface of the wheel increases within a range that does not exceed the deformation limit value corrected by the correcting unit.

In a control device according to an eighth aspect, pertaining to the control device according to any one of the fifth through seventh aspects, the wheel includes a left wheel and a right wheel disposed on left and right sides of the vehicle, and the actuator operating unit operates the actuator device such that the left wheel and right wheel have a toe-in relationship when the slip angle absolute value of at least one of the left wheel and right wheel is increased to increase the braking force of at least one of the left wheel and right wheel.

In a control device according to a ninth aspect, pertaining to the control device of the eighth aspect, the actuator operating unit operates the actuator device such that the slip angle absolute value of the left wheel and the slip angle absolute value of the right wheel are identical.

A control device according to a tenth aspect is a control device for a vehicle having left and right wheels and an actuator device for adjusting a camber angle of the left and right wheels, which operates the actuator device to control the camber angle of the left and right wheels, and includes: a braking instruction determining unit for determining whether or not a braking instruction for braking the vehicle has been issued; and an actuator device operating unit for operating the actuator device to increase an absolute value of the camber angle of the left and right wheels when the braking instruction determining unit determines that a braking instruction has been issued.

In a control device according to an eleventh aspect, pertaining to the control device according to the tenth aspect, the left and right wheels are constituted to be steerable, the actuator device is constituted to be capable of adjusting a steering angle of the left and right wheels, and the actuator device operating unit operates the actuator device to increase an absolute value of the steering angle of the left and right wheels and such that the left and right wheels become toe-in or toe-out when the braking instruction determining unit determines that a braking instruction has been issued.

A control device according to a twelfth aspect pertaining to the control device according to the eleventh aspect, also includes: a frictional coefficient detecting unit for detecting a frictional coefficient of a part of a road surface along which the left and right wheels are traveling that corresponds to a ground contact surface of the left and right wheels; a ground contact load detecting unit for detecting a ground contact load on the ground contact surface of the left and right wheels; a coefficient calculating unit for calculating a coefficient obtained by multiplying the frictional coefficient detected by the frictional coefficient detecting unit by the ground contact load detected by the ground contact load detecting unit; and an angle correcting unit for correcting an absolute value of the camber angle and the steering angle of the left and right wheels on the basis of the coefficient calculated by the coefficient calculating unit. The angle correcting unit corrects the absolute value of the camber angle and the steering angle such that the absolute value of at least one of, or both of, the camber angle and the steering angle of a wheel having a smaller coefficient becomes larger than the absolute value of the camber angle or the steering angle of a wheel having a larger coefficient.

In a control device according to a thirteenth aspect, pertaining to the control device according to any one of the tenth through twelfth aspects, the vehicle has an operating member that is operated by a driver, and a brake device for applying a braking force to the left and right wheels in conjunction with an operation state of the operating member. The braking instruction determining unit determines that a braking instruction has been issued when the operating member is operated or when an operation of the operating member satisfies a predetermined condition, and when the braking instruction determining unit determines that a braking instruction has been issued, the actuator device operating unit operates the actuator device and the brake device applies the braking force to the left and right wheels.

A wheel control device according to a fourteenth aspect is a wheel control device for a vehicle having front/rear left/right steered wheels and a power source, which controls a slip angle of the steered wheels and includes: an actuator device for performing an operation to vary respective slip angles of a left wheel and a right wheel of the steered wheels; and a controller for controlling the actuator device during driving of the steered wheels by the power source such that the respective slip angles of the left wheel and right wheel of the steered wheels vary by identical amounts at a time in a direction for increasing respective toe-in tendencies of the left wheel and right wheel. The controller has a first control portion for varying the respective slip angles of the left wheel and right wheel of the steered wheels by identical amounts at a time and by a variable amount based on at least one of a frictional coefficient of a part of a road surface along which the vehicle is traveling that is contacted by a corresponding wheel, and a ground contact load of the corresponding wheel.

In this wheel control device, the respective slip angles of the left wheel and right wheel of the steered wheels are varied by identical amounts at a time during driving of the steered wheels in a direction for increasing the respective toe-in tendencies of the left wheel and right wheel.

Hence, according to this wheel control device, the toe-in tendency of the steered wheel is increased beyond normal levels during driving of the steered wheel, regardless of whether the steered wheel is in a state of direct advancement or a turning state.

Thus, according to this wheel control device, in a case where the vehicle stability may deteriorate due to the slip ratio of the steered wheels departing from an appropriate range during driving of the steered wheels, deterioration of the vehicle stability is suppressed by a method other than slip ratio control, i.e. by increasing the toe-in tendency of the steered wheels. This method of increasing the toe-in tendency may be employed instead of conventional slip ratio control, or in conjunction therewith (for example, in organic combination therewith).

According to the wheel control device of the aspect, the respective slip angles of the left wheel and right wheel of the steered wheels are varied by identical amounts at a time, but this does not mean that the absolute values of the slip angles of the left wheel and right wheel are always guaranteed to be equal. The reason for this is that, although the tendency of the slip angle absolute values of the left wheel and right wheel to match is strong when the steered wheels are in a state of direct advancement, this tendency usually weakens during turning.

In the wheel control device according to the aspect, it is desirable to vary the respective slip angles of the left and right steered wheels substantially in synchronization to suppress an imbalance in the tire acting force between the left and right steered wheels.

Incidentally, during turning of the vehicle, a slip angle is generated in the steered wheels in accordance with the turn of the vehicle, and when the wheel control device according to the aspect is operated, variation is applied to the generated slip angle to increase the absolute value thereof.

To apply variation to the slip angle, the "actuator device" of the aspect is operated, and the "actuator device" may be provided as a dedicated actuator device that is operated to apply this variation. Note, however, that when the vehicle is provided with an actuator device that is operated to generate a slip angle by applying a steering angle to the steered wheels in accordance with a turn command issued by the driver, variation that does not correspond to the turn command issued by the driver may be applied to the slip angle of the steered wheels by the same actuator device.

In the wheel control device according to the aspect, the slip angles of the left and right steered wheels are varied by identical amounts at a time, and a target value of the variation amount may be determined on the basis of the driving ability (for example, the ground contact load, road surface frictional coefficient, and so on) of each wheel. In this case, the respective driving abilities of the left and right steered wheels do not necessarily match.

Hence, when a difference between the wheel driving abilities of the left and right steered wheels exceeds a reference value, (when the ground contact load or road surface frictional coefficient differs between the left and right wheels in excess of a reference value, for example), the wheel control device according to the aspect may determine a target value for the amount of variation to be applied to the slip angle of each wheel on the basis of one wheel driving ability selected from the driving abilities of the left and right steered wheels, or an average value (including both a simple average and a weighted average) of the two driving abilities.

Further, the wheel control device according to this invention may be implemented in an aspect whereby the controller varies the slip angles of the left and right steered wheels by identical amounts at a time in a direction for increasing the toe-in tendency of the wheels, for example, rather than in accordance with the turn command issued by the driver.

When the vehicle has wheels on the front and rear and the left and right thereof, typically the left and right front wheels serve as the steered wheels, but the left and right rear wheels may also be steered wheels. In this case, the left and right front wheels serve as main steered wheels corresponding to the turn command issued by the driver, while the left and right rear wheels typically serve as auxiliary steered wheels that are steered with the aim of improving vehicle stability during vehicle turning or the like.

In either case, the wheel control device according to the aspect may be implemented when steered wheels are provided on the front and rear and the left and right of the vehicle. In this case, the wheel control device may be implemented in an embodiment whereby control (to be referred to hereafter as "slip angle control") is performed on only the left and right front wheels to vary the respective slip angles thereof by identical amounts at a time in a direction for increasing the respective toe-in tendencies of the left wheel and right wheel, or an embodiment whereby slip angle control is performed on only the left and right rear wheels, or an embodiment whereby slip angle control is performed on the left and right rear wheels as well as the left and right front wheels.

Further, according to the wheel control device of the aspect, the amount of variation in the respective slip angles of the left wheel and right wheel of the steered wheels is controlled in accordance with at least one of the frictional coefficient of the road surface and the ground contact load. Hence, according to this wheel control device, the toe-in tendency of the steered wheels can be controlled easily with no excess or deficiency.

Furthermore, ON/OFF control such as that of the conventional art is not required, and therefore bodily discomfort can be suppressed. As a result, the driving force can be improved through the continuous use of road surface friction.

In a wheel control device according to a fifteenth aspect, pertaining to the wheel control device according to the fourteenth aspect, the controller also includes a second control portion for performing at least one of varying the respective slip angles of the left wheel and right wheel of the steered wheels by identical amounts at a time and by a fixed amount, and varying the respective slip angles of the left wheel and right wheel of the steered wheels by identical amounts at a time and by a variable amount based on a required acceleration of the vehicle.

According to this wheel control device, when the second control portion is implemented in an embodiment whereby the respective slip angles of the left wheel and right wheel are varied by identical amounts at a time and by a fixed amount, the constitution of the second control portion can be simplified easily. Further, when the second control portion is implemented in an embodiment whereby the respective slip angles of the left wheel and right wheel are varied by identical amounts at a time and by a variable amount based on the required acceleration of the vehicle, the precision with which the required acceleration of the vehicle is realized can be improved easily.

In a wheel control device according to a sixteenth aspect, pertaining to the wheel control device according to the fourteenth aspect or fifteenth aspect, the controller also includes a third control portion for varying the respective slip angles of the left wheel and right wheel of the steered wheels by identical amounts at a time in a direction for increasing the respective toe-in tendencies of the left wheel and right wheel in a case where a spin tendency of the steered wheels may depart from an allowable range when the power source is operated in accordance with an operation performed by the driver to instruct start-up of the vehicle through the power source.

According to this wheel control device, the toe-in tendency of the steered wheels is increased during driving of the steered wheels before the spin-tendency of the steered wheels becomes excessive, and therefore, a reduction in vehicle body stability during driving can be suppressed more easily than when the toe-in tendency of the steered wheels is increased after the spin-tendency of the steered wheels become excessive.

The term "a spin tendency of the steered wheels departs from an allowable range" in the aspect may be interpreted to mean that both the spin tendency of the left wheel and the spin tendency of the right wheel from among the steered wheels depart from the allowable range, or that one of the spin tendency of the left wheel and the spin tendency of the right wheel from among the steered wheels departs from the allowable range.

Note that the wheel control device may be provided in the following embodiment. A wheel control device for a vehicle having left and right steered wheels, left and right non-steered wheels, and a power source controls a slip angle of the steered wheels and includes: an actuator device for performing an operation to vary respective slip angles of the left wheel and right wheel of the steered wheels; and a controller for controlling the actuator device during driving of the steered wheels by the power source such that the respective slip angles of the left wheel and right wheel of the steered wheels vary by identical amounts at a time in a direction for increasing respective toe-in tendencies of the left wheel and right wheel. The controller has a first control portion for varying the respective slip angles of the left wheel and right wheel of the steered wheels by identical amounts at a time and by a variable amount based on at least one of a frictional coefficient of a part of a road surface along which the vehicle is traveling that is contacted by a corresponding wheel, and a ground contact load of the corresponding wheel.

According to the wheel control device of any of the first through fourth aspects, the wheel can be controlled such that the braking force of the wheel increases.

According to the control device of the fifth aspect, the actuator operating unit is provided for a vehicle having a wheel constituted to be steerable, an actuator device for steerably driving the wheel, and a wheel driving device for driving the wheel to rotate, and operates the actuator device to increase the slip angle absolute value of the wheel such that a lateral force is generated on the ground contact surface of the wheel. Hence, the lateral force generated in the wheel can be used as the braking force of the vehicle.

Here, when the wheel rolls along a road surface at a slip angle that is not zero, rolling resistance and lateral force are generated on the ground contact surface of the wheel. Of the resulting force of the rolling resistance and lateral force, i.e. the total frictional force, the component acting in the vehicle advancement direction is the frictional force that contributes to wheel braking, and this frictional force increases in accordance with the lateral force.

In other words, cornering force acting on the wheel is saturated after increasing from zero when the slip angle increases from zero, whereas lateral force continues to increase monochromatically even though the gradient thereof becomes steadily sharper. By increasing the slip angle absolute value of the wheel, the lateral force having this characteristic can be used to perform wheel braking. As a result, the lateral force generated in the wheel according to the present invention can be used to increase the braking force of the wheel without depending on the brake device of the wheel.

Further, according to the control device of the present invention, the wheel driving device operating unit is provided for operating the wheel driving device to vary the rotation speed of the wheel, the slip angle absolute value of which has been increased by the actuator operating unit, such that the amount of vehicle advancement direction deformation on the ground contact surface of the wheel increases. Therefore, the frictional force generated on the ground contact surface of the wheel can be increased, and a further improvement in the braking force of the wheel can be achieved.

Hence, in comparison with a case in which control is only performed to increase the slip angle absolute value of the wheel, the amount of vehicle advancement direction deformation on the ground contact surface of the wheel can be increased even at the same ground speed of the vehicle, and greater frictional force can be generated on the ground contact surface of the wheel. Therefore, the braking effect achieved by increasing the slip angle absolute value of the wheel can be further enhanced, and as a result, the braking force of the vehicle can be increased synergistically, enabling a further reduction in braking distance.

According to the control device of the sixth aspect, in addition to the effects exhibited by the control device of the fifth aspect, the deformation amount calculating unit for calculating the amount of vehicle advancement direction deformation on the ground contact surface of the wheel and the storage unit for storing a limit value of the vehicle advancement direction deformation on the ground contact surface of the wheel are provided, and the wheel driving device operating unit operates the wheel driving device to vary the rotation speed of the wheel such that the amount of vehicle advancement direction deformation on the ground contact surface of the wheel increases within a range that does not exceed the deformation limit value stored in the storage unit. Therefore, frictional force can be generated reliably on the ground contact surface of the wheel, and the braking force of the wheel can be increased with a high degree of efficiency.

In other words, when the deformation amount calculated by the deformation amount calculating unit has not yet reached the deformation limit value, greater frictional force can be generated efficiently on the ground contact surface of the wheel by varying the rotation speed of the wheel such that the deformation amount approaches the deformation limit value, and thus an improvement in the braking force of the wheel can be achieved.

On the other hand, when the deformation amount calculated by the deformation amount calculating unit has already exceeded the deformation limit value, the current wheel rotation speed is inappropriate and the ground contact surface of the wheel is in an inefficient deformation state. Therefore, braking force cannot be generated efficiently in the wheel, and conversely, driving force may be generated. Hence, by varying the rotation speed of the wheel such that the deformation amount approaches the deformation limit value, the braking force of the wheel can be increased efficiently.

According to the control device of the seventh aspect in addition to the effects exhibited by the control device of the sixth aspect, the frictional coefficient detecting unit for detecting the frictional coefficient of the part of the road surface along which the wheel is traveling that corresponds to the ground contact surface of the wheel, and the correcting unit for correcting the deformation limit value stored in the storage unit on the basis of the frictional coefficient detected by the frictional coefficient detecting unit are provided, and therefore the rotation speed of the wheel can be varied such that the amount of vehicle advancement direction deformation on the ground contact surface of the wheel increases within a range that does not exceed the deformation limit value corrected by the correcting unit. Thus, control can be performed with a high degree of reliability.

In other words, the deformation limit value relating to the ground contact surface of the wheel is commensurate with the frictional coefficient of the road surface along which the wheel travels, and therefore, while the vehicle is in motion, the deformation limit value varies constantly in accordance with the road surface condition. Hence, if the rotation speed of the wheel is controlled with the deformation limit value set at a fixed value, braking control of the wheel can no longer be performed correctly. In the present invention, on the other hand, the correcting unit is provided, and therefore braking control corresponding to the actual road surface condition can be performed appropriately.

According to the control device of the eighth aspect, in addition to the effects exhibited by the control device of any of the fifth through seventh aspects, the actuator operating unit operates the actuator device such that the left wheel and right wheel have a toe-in relationship when the slip angle absolute value of at least one of the left wheel and right wheel is increased to increase the braking force of at least one of the left wheel and right wheel, and therefore an improvement in the braking force can be achieved while maintaining the steering stability of the vehicle.

According to the control device of the ninth aspect, in addition to the effects exhibited by the control device of the eighth aspect, the actuator operating unit operates the actuator device such that the slip angle absolute value of the left wheel and the slip angle absolute value of the right wheel are identical, and therefore an improvement in the braking force can be achieved while maintaining the steering stability of the vehicle even more reliably. This effect is particularly striking during braking control from a state of direct advancement.

According to the control device of the tenth aspect, when the braking instruction determining unit determines that a braking instruction has been issued in a vehicle having left and right wheels and an actuator device for adjusting the camber angle of the left and right wheels, the actuator device operating unit operates the actuator device to increase the absolute value of the camber angle of the left and right wheels. Hence, camber thrust can be generated in the wheels and used as braking force, whereby an improvement in the braking force of the wheels can be achieved.

Note that when the actuator device is operated by the actuator device operating unit to set the left and right wheels to negative camber or positive camber, camber thrust can be generated in the left and right wheels in an opposing or repulsing direction such that the generated camber thrusts cancel each other out. In so doing, the behavior of the vehicle during braking can be stabilized, and an improvement in the braking force of the wheels can be achieved.

According to the control device of the eleventh aspect, in addition to the effects exhibited by the control device of the tenth aspect, the actuator device operating unit is capable of operating the actuator device to increase the absolute value of the steering angle of the left and right wheels and such that the left and right wheels become toe-in or toe-out when a braking instruction has been issued. As a result, lateral force can be generated in the left and right wheels, and this lateral force can be used as braking force.

Further, by making the left and right wheels toe-in or toe-out, the behavior of the vehicle during braking can be stabilized, and the camber thrust generated in the left and right wheels can be provided with a vehicle advancement direction component such that the resulting force of the vehicle advancement direction component of the camber thrust and the vehicle advancement direction component of the lateral force can be increased. As a result, the braking force of the vehicle can be improved.

According to the control device of the twelfth aspect, in addition to the effects exhibited by the control device of the eleventh aspect, the coefficient calculating unit calculates a coefficient obtained by multiplying the frictional coefficient detected by the frictional coefficient detecting unit by the ground contact load detected by the ground contact load detecting unit, and the angle correcting unit corrects the absolute value of the camber angle and the steering angle of the left and right wheels on the basis of the coefficient calculated by the coefficient calculating unit. Therefore, the balance between the braking forces generated in the left and right wheels can be made even, and the behavior of the vehicle during braking can be stabilized.

Here, the braking force (frictional force) that can be generated on the ground contact surface of the wheel is dependent on a coefficient obtained by multiplying the frictional coefficient of the road surface by the ground contact load of the ground contact surface. In other words, when a coefficient obtained by multiplying the frictional coefficient by the ground contact load is calculated for each of the left and right wheels and the calculated coefficients are identical, the braking forces that can be generated on the ground contact surfaces of the left and right wheels are also identical, and when the coefficients differ between the left and right wheels, a difference arises in the braking forces that can be generated on the ground contact surfaces of the left and right wheels.

Hence, when the coefficients of the left and right wheels take different values, for example, and the absolute values of the camber angles and steering angles are set equally in the left and right wheels, a difference arises in the braking forces generated on the ground contact surfaces of the left and right wheels. Therefore, a yawing moment occurs on the side having the larger braking force when an attempt is made to turn the vehicle, and as a result, the behavior of the vehicle during braking may become unstable.

However, according to the control device of the present invention, when the coefficients of the left and right wheels take different values, the absolute values of the camber angles and steering angles of the left and right wheels are corrected by the angle correcting unit on the basis of these coefficients, or more specifically, the absolute value of at least one or both of the camber angle and steering angle of the wheel having the smaller coefficient is corrected to become larger than the absolute value of the camber angle or steering angle of the wheel having the larger coefficient. Therefore, the balance between the braking forces generated in the left and right wheels can be made even, and the behavior of the vehicle during braking can be stabilized.

According to the control device of the thirteenth aspect, in addition to the effects exhibited by the control device of any of the tenth through twelfth aspects, the vehicle includes the brake device, and when the braking instruction determining unit determines that a braking instruction has been issued, the operation of the actuator device by the actuator device operating unit, i.e. the operation to generate a braking force by applying the camber angle and so on to the left and right wheels, can be performed at the same time as the operation performed by the brake device to apply the braking force to the left and right wheels. Therefore, the braking force of the vehicle can be increased in accordance with these two combined braking forces, and the braking distance can be shortened.

Here, the braking instruction determining unit is constituted to determine that a braking instruction has been issued when the operation of the operating member satisfies a predetermined condition, and at normal times (i.e. when an operation to satisfy the predetermined condition has not been performed), only the brake device need be operated such that excessive braking force and wear to the wheel, leading to a reduction in the life of the wheel, can be suppressed. On the other hand, during an emergency (i.e. when an operation to satisfy the predetermined condition has been performed), the two braking forces are combined, and as a result, the braking force required during an emergency can be exhibited reliably.

Examples of cases in which the operation of the operating member satisfies the predetermined condition include a case in which the operating member is operated at a higher speed than a reference operating speed, a case in which the operating member is operated by a larger operating amount than a reference operating amount, a case in which the operating member is operated for a longer time than a reference time, and a combination of these cases.

According to the wheel control device of any of the fourteenth through sixteenth aspects, reductions in vehicle stability during wheel driving can be suppressed.

BRIEF DESCRIPTION OF THE DRAWINGS

FIG. 18A is a sectional view of a wheel, and FIG. 18B is a pattern diagram showing a method of adjusting a camber angle and a steering angle of the wheel;

DETAILED DESCRIPTION OF THE PREFERRED EMBODIMENTS

Several more specific embodiments of the present invention will be described in detail below on the basis of the drawings.

Figure 1:
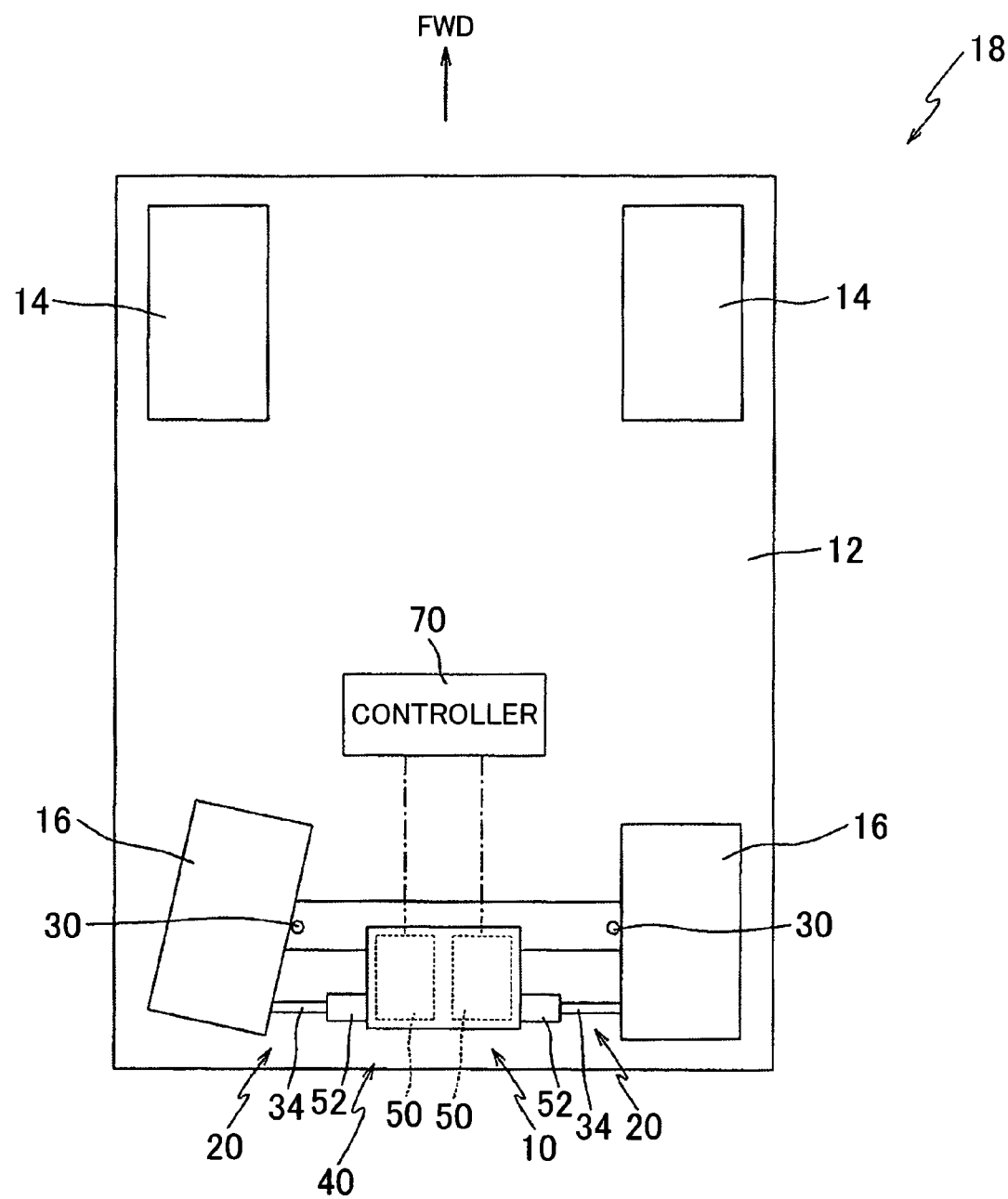
FIG. 1 is a plan view showing a wheel control device according to a first embodiment of the present invention, together with a vehicle in which the wheel control device is installed.

FIG. 1 is a plan view showing a wheel control device 10 according to a first embodiment of the present invention. The wheel control device 10 is installed and used in a vehicle 18 formed by attaching a plurality of wheels 14, 16 to a vehicle body 12. As shown in FIG. 1, an example of the vehicle 18 has left and right front wheels 14, 14 and left and right rear wheels 16, 16.

In the vehicle 18, the left and right front wheels 14, 14 are steered by a steering mechanism, not shown in the drawing, in accordance with a steering operation performed by a driver on a steering wheel, not shown in the drawing. In this embodiment, the left and right rear wheels 16, 16 are attached to the vehicle body 12 via respective steering devices 20, 20. The wheel control device 10 is installed in the vehicle 18 to control the left and right rear wheels 16, 16 independently of one another in relation to a slip angle $\alpha$. In FIG. 1, the left and right rear wheels 16, 16 are illustrated in attitudes having different slip angles $\alpha$.

The wheel control device 10 is installed in the vehicle 18 to increase the braking force of each rear wheel 16, 16 by increasing the slip angle absolute value $\alpha$ of each rear wheel 16, 16 by an appropriate amount during braking of the vehicle 18. Control of the slip angle $\alpha$ (to be referred to as "braking control" hereafter) will be described in detail below.

The steering devices 20, 20 support the respective rear wheels 16, 16 swingably about a king pin 30 that extends in a substantially up-down direction. The steering devices 20, 20 each have a tie rod 34 for the respective rear wheels 16, 16, which extends in a lateral direction from a tip end portion of a knuckle arm (not shown) of each rear wheel 16, 16.

The wheel control device 10 is further provided with an electric driving device 40 for displacing the tie rods 34, 34 of the rear wheels 16, 16 linearly. For each rear wheel 16, 16, the electric driving device 40 has an electric actuator 50 serving as a drive source and a motion transmission mechanism 52 for transmitting mechanical motion generated in the electric actuator 50 to the corresponding tie rod 34. In an example of the electric driving device 40, an electric motor is used as the electric actuator 50, and a screw mechanism for converting the rotary motion of the electric motor into linear motion of the tie rod 34 is used as the motion transmission mechanism 52.

Figure 2:
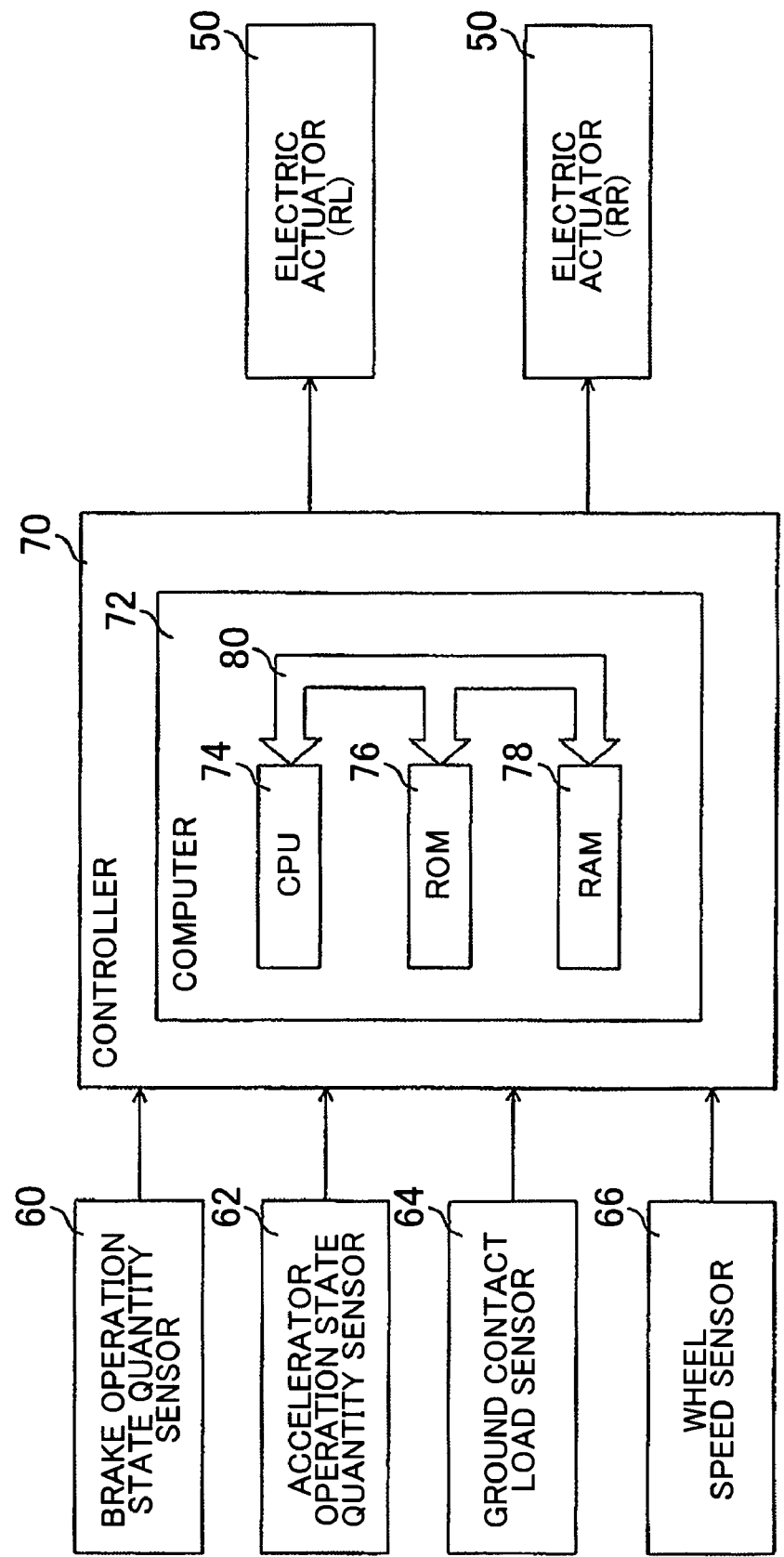
FIG. 2 is a block diagram illustrating conceptually the electric configuration of the wheel control device shown in FIG. 1.

FIG. 2 is a block diagram illustrating conceptually the electric configuration of the wheel control device 10. The wheel control device 10 has a plurality of types of sensor, including a brake operation state quantity sensor 60, an accelerator operation state quantity sensor 62, a ground contact load sensor 64, and a wheel speed sensor 66.

The brake operation state quantity sensor 60 is constituted to detect depression of a brake pedal, which serves as a brake operating member not shown in the drawing, by a driver, the depression force, and the depression stroke or depression speed, for example, as the brake operation quantity of state. More specifically, the brake operation state quantity sensor 60 is constituted to include a brake switch, a force sensor, a pedal angle sensor, a pedal stroke sensor, and so on, for example.

The accelerator operation state quantity sensor 62 is constituted to detect depression of an accelerator pedal, which serves as an accelerator operating member not shown in the drawing, by a driver, the depression force, and the depression stroke or depression speed, for example, as the accelerator operation quantity of state. More specifically, the accelerator operation state quantity sensor 62 is constituted to include an accelerator switch, a force sensor, a pedal angle sensor, a pedal stroke sensor, and so on, for example.

The ground contact load sensor 64 is provided for each rear wheel 16, 16 to detect a ground contact load acting on each rear wheel 16, 16. The ground contact load sensor 64 may be constituted by a load sensor (for example, a distortion gauge attached to an axle) for detecting the ground contact load of each rear wheel 16, 16 directly, or an alternate physical quantity sensor for detecting another physical quantity that varies in accordance with the magnitude of the ground contact load, for example the height of the vehicle body 12 in the positions of the rear wheels 16, 16 (the vehicle height at each rear wheel 16, 16) or the vertical stroke.

The wheel speed sensor 66 is provided for each wheel 14, 16, and detects the angular velocity of each wheel 14, 16 as the wheel speed. An example of the wheel speed sensor 66 is an electromagnetic pickup sensor for electromagnetically detecting the time intervals at which a large number of teeth, formed in series in the circumferential direction of a rotary body that rotates together with the wheels 14, 16, pass thereby.

The wheel speed sensor 66 of each wheel is used to estimate the vehicle body speed, i.e. the traveling speed of the vehicle body 12, in cooperation with the other wheel speed sensors 66, to detect the rotation angle acceleration of each wheel 14, 16 as the wheel acceleration of each wheel 14, 16, and to detect a frictional coefficient $\mu$ (to be referred to simply as "road surface $\mu$" hereafter) between each wheel 14, 16 and the road surface in relation to each wheel 14, 16. The road surface $\mu$ corresponding to each wheel 14, 16 may be assumed to increase steadily as the absolute value of wheel deceleration or wheel acceleration generated in each wheel 14, 16 during braking or driving of each wheel 14, 16 increases, for example.

As shown in FIG. 2, the wheel control device 10 is also provided with a controller 70. The controller 70 is electrically connected to the brake operation state quantity sensor 60, accelerator operation state quantity sensor 62, ground contact load sensor 64, and wheel speed sensor 66. The controller 70 is also electrically connected to the electric actuator 50 for controlling the slip angle α of the left rear wheel (RL) 16 and the electric actuator 50 for controlling the slip angle α of the right rear wheel (RR) 16.

The controller 70 is constituted mainly by a computer 72. As is well known, in the computer 72, a CPU 74, ROM 76, and RAM 78 are connected by a bus 80. A braking control program for controlling the slip angles α of the rear wheels 16, 16 independently of each other via the electric actuators 50 during braking of the vehicle 18 is stored in the ROM 76 together with other programs, and by having the CPU 74 execute this braking control program while using the RAM 78, braking control is executed by the wheel control device 10.

Figure 3:
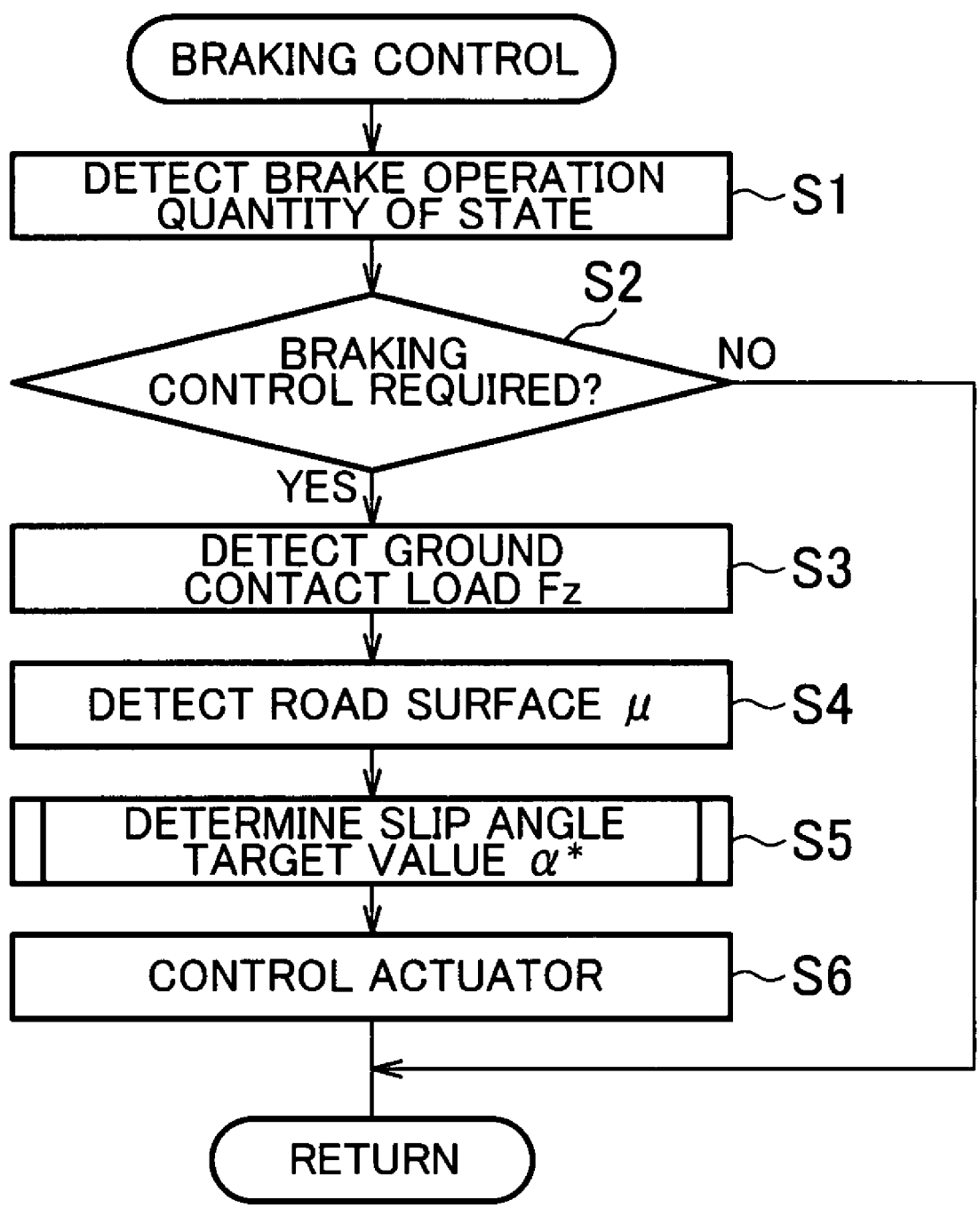
FIG. 3 is a flowchart illustrating conceptually a braking control program executed by a computer shown in FIG. 2.
Figure 4:
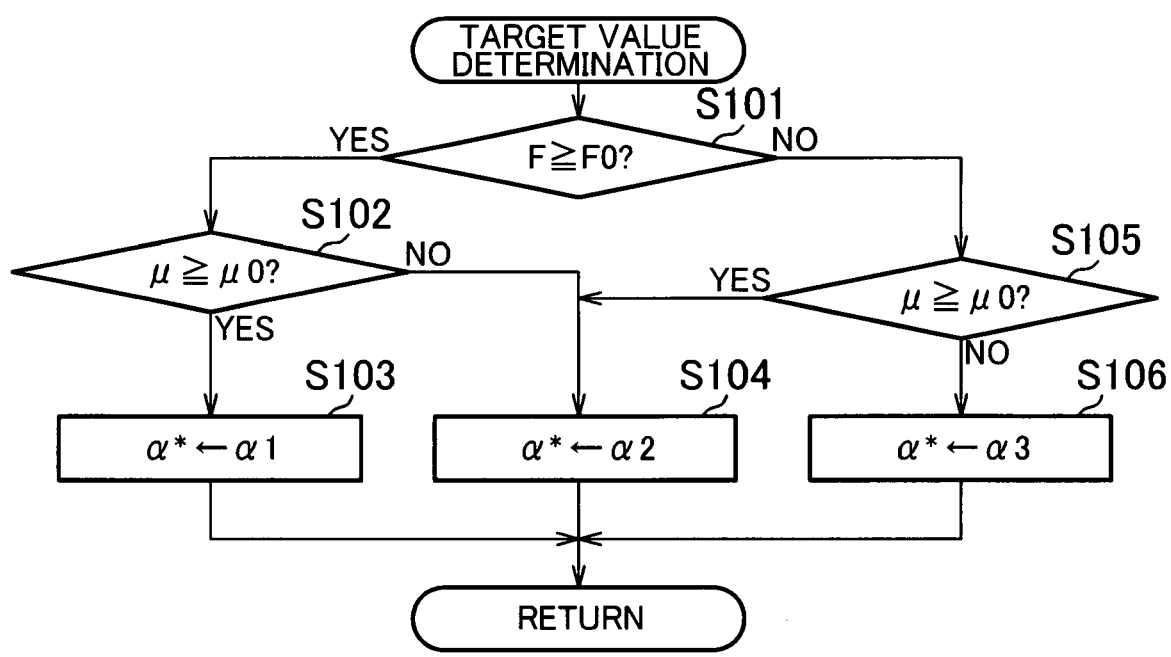
FIG. 4 is a flowchart illustrating conceptually the details of S5 in FIG. 3 as a target value determination routine.
Figure 5:
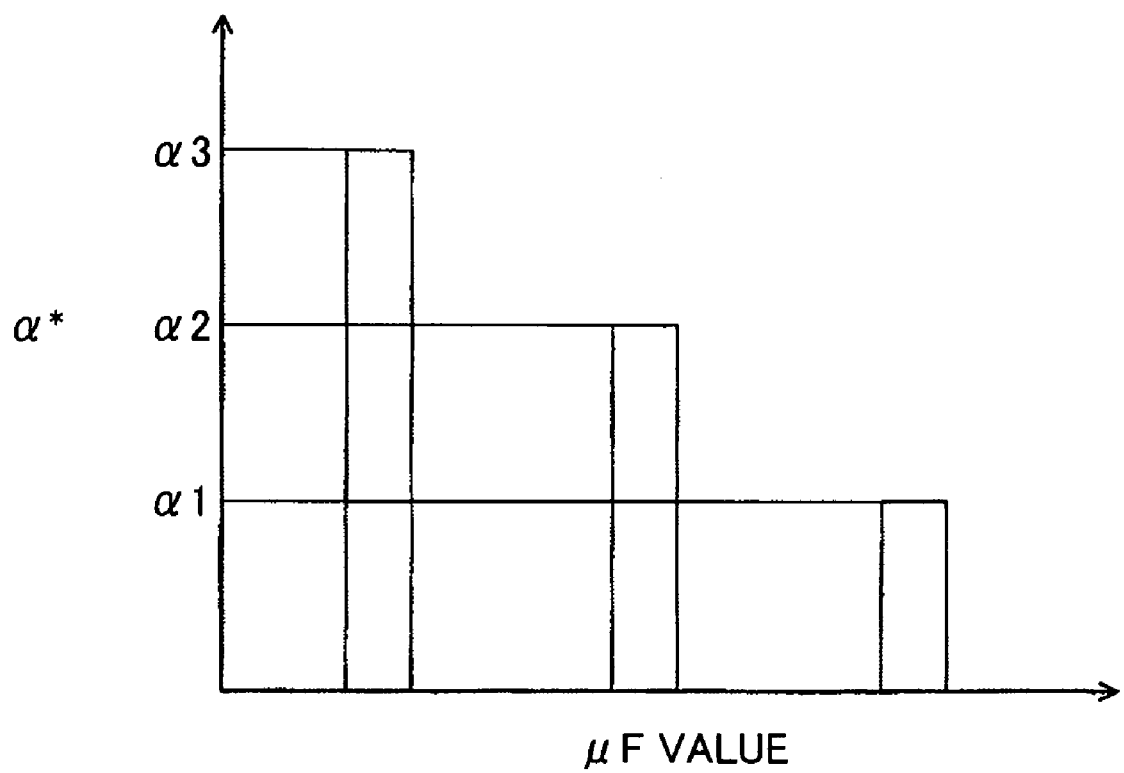
FIG. 5 is a graph illustrating a condition in which a target value $\alpha^*$ is determined through execution of the target value determination routine shown in FIG. 4.

FIG. 3 is a flowchart illustrating conceptually the braking control program. FIG. 4 is a flowchart illustrating conceptually the details of S5 in FIG. 3 as a target value determination routine. FIG. 5 is a graph showing a condition in which the magnitude of a target value α* of the slip angle α is determined in accordance with a μF value, which is the product of the road surface μ and a ground contact load F.

The braking control program will be described below with reference to FIGS. 3 to 5, but first, the theoretical background to the braking control that is executed by the braking control program will be described with reference to FIGS. 6 to 8.

Figure 6:
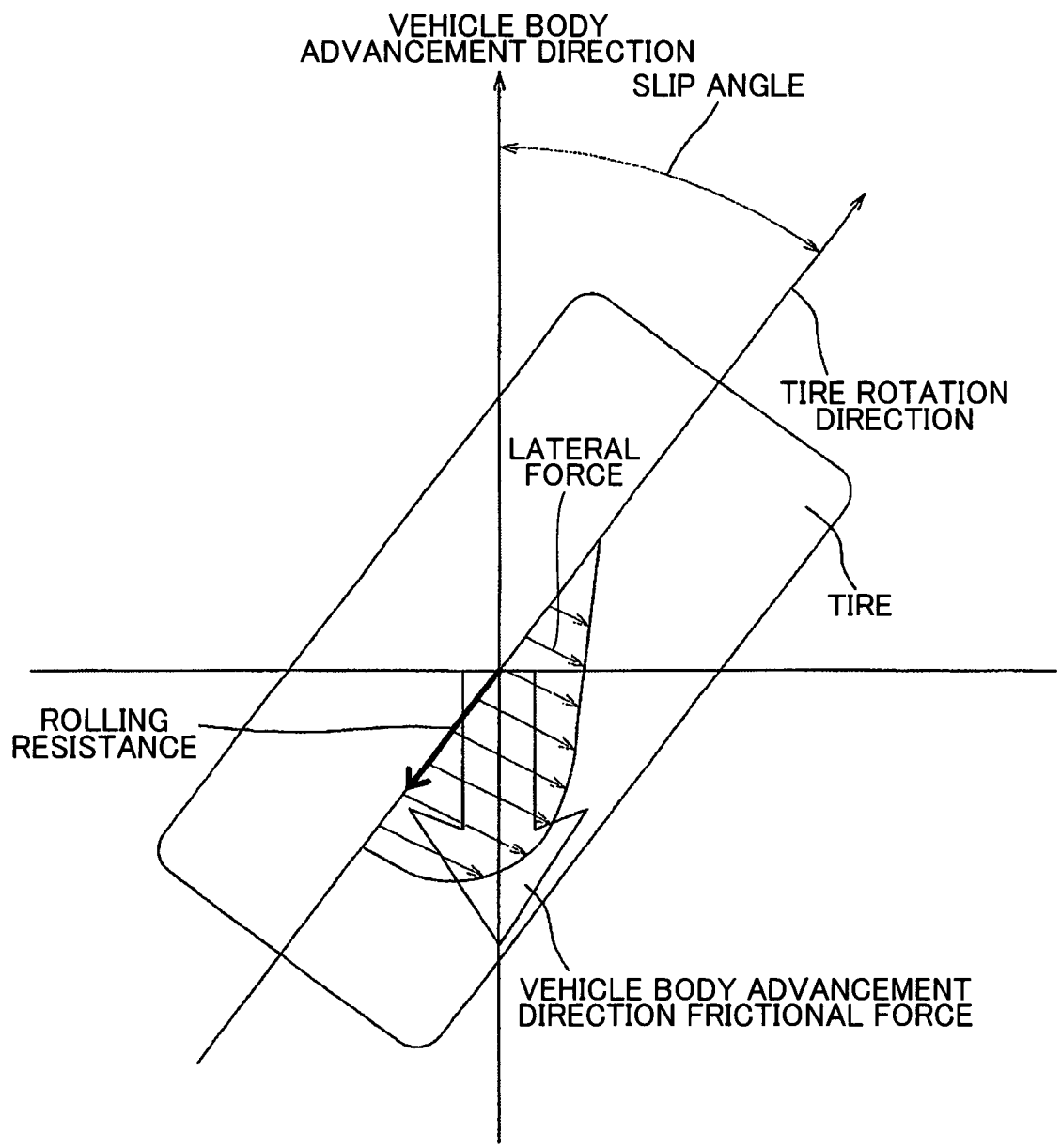
FIG. 6 is a plan view illustrating a theory by which wheel braking is performed through execution of the braking control program shown in FIG. 3.

FIG. 6 is a plan view showing several forces generated between the wheel and the road surface when the vehicle advances directly and the slip angle α of a certain wheel is not zero. The term "slip angle α" is defined originally as the angle formed by the tire advancement direction and the tire rotary surface direction, but when the vehicle advances directly and the vehicle body slip angle at the center of gravity of the vehicle body is zero, the slip angle α is equal to the angle formed by the vehicle body advancement direction and the tire rotary surface direction.

In a state where the slip angle α of a certain wheel is not zero and the wheel is rolling along the road surface, rolling resistance and lateral force are generated between the wheel and the road surface. Of the resulting force of the rolling resistance and the lateral force, or in other words the total frictional force, the component acting in the vehicle body advancement direction is the frictional force that contributes to wheel and vehicle body braking.

Cornering force acting on the wheel is saturated after increasing from zero when the slip angle α increases from zero, whereas lateral force continues to increase even though the gradient thereof becomes steadily sharper. By increasing the slip angle absolute value of each wheel during vehicle braking, the lateral force having this characteristic can be used actively in wheel braking.

Figure 7:
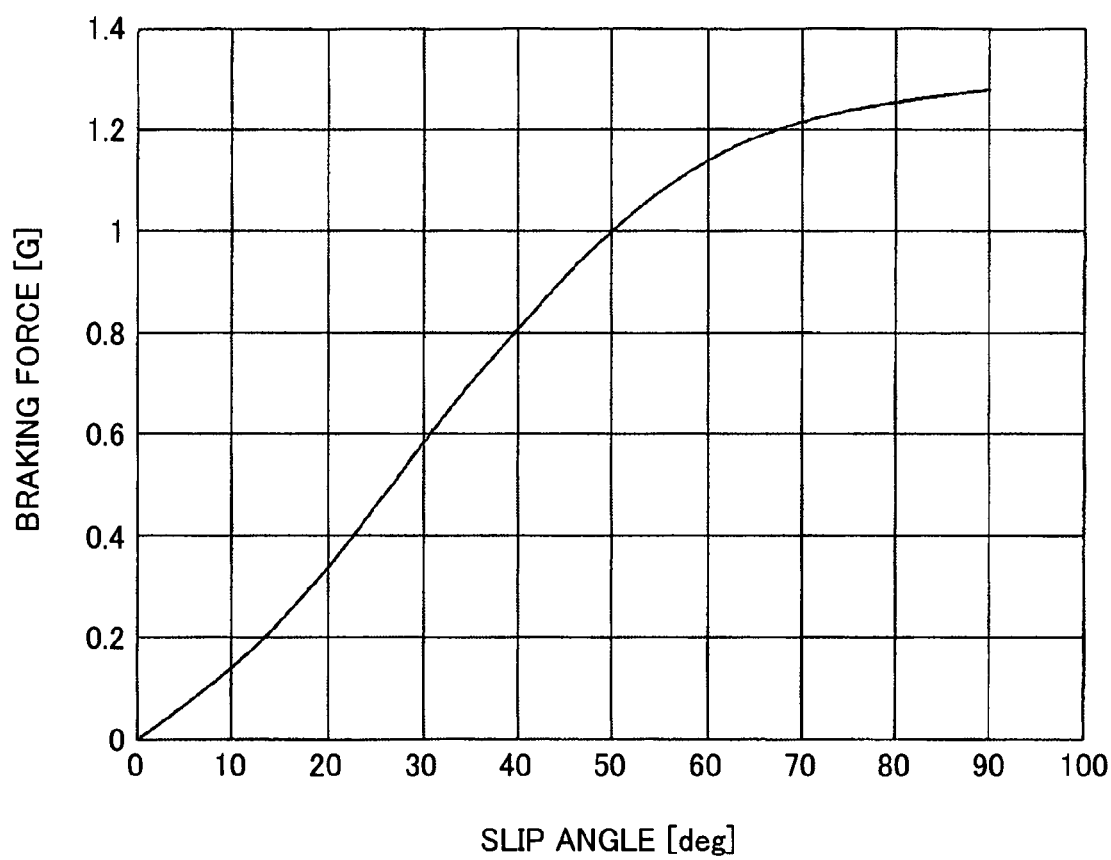
FIG. 7 is a graph illustrating the theory by which wheel braking is performed through execution of the braking control program shown in FIG. 3.

When the lateral force is used actively in wheel braking, a braking force that increases monochromatically as the slip angle α increases is generated, as shown in the example in FIG. 7. Since the braking force increases monochromatically, the bodily discomfort caused by ON/OFF control in a hydraulic brake or the like is eliminated. Further, when the lateral force is used in wheel braking, it is possible to realize vehicle deceleration exceeding 1 [G], and therefore the vehicle braking distance can be shortened easily.

Incidentally, control for preventing reductions in braking force caused by an excessive brake operation force (brake pressure, for example), in which the slip ratio of a wheel is controlled such that the wheel does not lock, is known as antilock control.

The relationship between the slip ratio and the braking force is different to the relationship between the slip angle and the control force, and when the slip ratio increases from zero, the braking force has a tendency to pass through a first region (a linear region, for example) in which it increases monochromatically and then shift to a second region in which it decreases rapidly. Further, the actual value of the slip ratio when the braking force shifts from the first region to the second region is not always constant, and it is difficult to detect and estimate the slip ratio accurately upon every variation.

Hence, in antilock control, the brake operating force is controlled so as not to exceed a value that is anticipated to be lower than the actual value of the slip ratio at all times when the braking force shifts from the first region to the second region. Therefore, in antilock control, it is difficult in reality to perform wheel braking using the road surface μ extensively, and the braking force is limited to approximately 0.8 [G], for example.

In contrast, when wheel braking using lateral force is performed, braking force exceeding 1 [G] is generated easily, as shown in FIG. 7. For example, a braking force that is approximately 1.5 times greater than the maximum braking force generated during antilock control can be generated. In comparison with a case in which antilock control alone must be relied on, the braking force increases easily, and by expansion, shortening of the braking distance can also be achieved easily.

On the basis of the knowledge described above, the slip angle α of each rear wheel 16, 16 is optimized in this embodiment such that the lateral force is used actively in wheel braking. This braking control will be described in detail below with reference to FIGS. 3 to 5.

The braking control program shown in FIG. 3 is executed repeatedly for each rear wheel 16, 16 after power has been supplied to the computer 72. During each execution, first, in a step S1 (to be referred to simply as "S1" hereafter; this applies likewise to the other steps), the brake operation quantity of state is detected on the basis of a brake signal output by the brake operation state quantity sensor 60.

Next, in S2, a determination is made on the basis of the detected brake operation quantity of state as to whether or not braking control using lateral force is required, or in other words whether or not an increase in braking force is required. For example, when a larger braking force than usual is required during an emergency braking operation, it is determined that the braking control is required. An emergency braking operation may be determined according to whether or not the depression speed, depression force, and so on of the brake operation quantity of state exceed a threshold.

Assuming that the braking control is not required, the determination of S2 becomes negative, and the current execution of the braking control program ends immediately. When braking control is required, the determination of S2 becomes affirmative, and the routine advances to S3.

In S3, the ground contact load F is detected for each rear wheel 16, 16 by the ground contact load sensor 64. Next, in S4, the road surface μ that is in contact with the rear wheels 16, 16, i.e. a part of the road surface along which the vehicle 18 travels, is detected for each rear wheel 16, 16 in the manner described above using the wheel speed sensor 66.

Next, in S5, a target value α* to which the slip angle α is to be controlled by the electric actuators 50, 50 is determined for each rear wheel 16, 16 on the basis of the detected ground contact load F and road surface μ. The target value α* does not indicate the slip angle absolute values α to be exhibited respectively by the rear wheels 16, 16, but instead indicates a relative value, or in other words an increment from the current value.

To determine the target value α*, the target value determination routine shown in FIG. 4 is executed for each rear wheel 16, 16. In the target value determination routine, first, a determination is made in S101 as to whether or not the detected ground contact load F of the current execution subject wheel is equal to or greater than a reference value F0. When the ground contact load F is equal to or greater than the reference value F0, the determination of S101 becomes affirmative, and the routine advances to S102.

In S102, a determination is made as to whether or not the detected road surface μ relating to the current execution subject wheel is equal to or greater than a reference value μ0. When the road surface μ is equal to or greater than the reference value μ0, the determination of S102 becomes affirmative, and the routine advances to S103. In S103, the target value α* of the slip angle α relating to the current execution subject wheel is determined so as to equal to a set value α1. The current execution of the target value determination routine is then terminated.

When the detected ground contact load F of the current execution subject wheel is equal to or greater than the reference value F0 but the detected road surface μ is not equal to or greater than the reference value μ0, the determination of S101 becomes affirmative, the determination of S102 becomes negative, and the routine advances to S104. In S104, the target value α* of the slip angle α relating to the current execution subject wheel is determined so as to equal to a set value α2. In this case, the road surface μ is lower than that of a case in which the determination of S102 is affirmative, and it is therefore necessary to compensate for this difference using the lateral force generated by the slip angle α. Accordingly, the set value α2 is set at a larger value than the set value α1. The current execution of the target value determination routine is then terminated.

When the detected ground contact load F of the current execution subject wheel is not equal to or greater than the reference value F0 but the detected road surface μ is equal to or greater than the reference value μ0, the determination of S101 becomes negative, the determination of S105 becomes affirmative, and the routine advances to S104.

On the other hand, when the detected ground contact load F is not equal to or greater than the reference value F0 and the detected road surface μ is not equal to or greater than the reference value μ0, the determination of S101 becomes negative, the determination of S105 becomes negative, and the routine advances to S106.

In S106, the target value α* of the slip angle α relating to the current execution subject wheel is determined so as to equal to a set value α3. In this case, the ground contact load F is smaller than that of a case in which the determination of S105 is affirmative, and it is therefore necessary to compensate for this difference using the lateral force generated by the slip angle α. Accordingly, the set value α3 is set at a larger value than the set value α2. The current execution of the target value determination routine is then terminated.

Hence, in this embodiment, as described above and illustrated in the graph of FIG. 5, the target value α* is set steadily smaller as the road surface μ increases, and the target value α* is set steadily smaller as the ground contact load F increases.

In this embodiment, the difference in the road surface μ and the difference in the ground contact load F between the left and right rear wheels 16, 16 are taken into account when increasing the slip angles α of the respective rear wheels 16, 16 independently of one another. Hence, a situation in which wheel braking is performed on a split μ road or performed when lateral load movement is generated as the vehicle 18 turns such that the yaw moment of the vehicle 18 deteriorates due to a difference in braking force between the left and right rear wheels 16, 16, leading to a reduction in the stability of the vehicle 18, can be avoided easily.

As is evident from the above description, in this embodiment each rear wheel 16, 16 constitutes an example of the "wheel" in claim 1, the electric actuator 50 constitutes an example of the "actuator" in the same claim, and the controller 70 constitutes an example of the "controller" in the same claim.

Furthermore, in this embodiment the part of the computer 72 that executes the braking control program shown in FIG. 3 constitutes an example of the "braking control portion" in claim 1 and the "braking control portion" in claim 2.

Further, in this embodiment a mode in which the left and right rear wheels 16, 16 of the wheels 14, 16 are selected as the control subject wheels and the slip angles α of the left and right rear wheels 16, 16 are controlled independently of each other is employed. However, the control subject wheels and the control mode may be altered appropriately.

Figure 8:
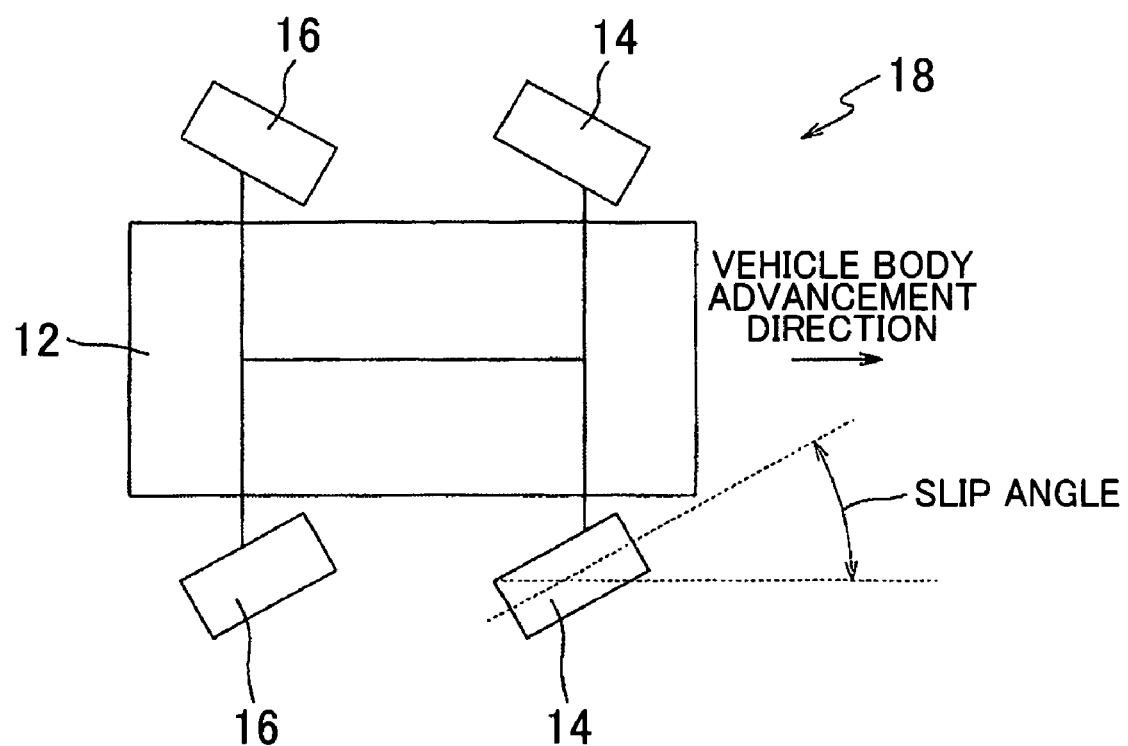
FIG. 8 is a plan view illustrating a modified example of the first embodiment shown in FIG. 1.

For example, as shown in FIG. 8, a mode in which all of the wheels 14, 16 are set as the control subject wheels and the slip angles α are controlled such that the absolute values thereof are equal but the signs thereof are reversed may be employed. In the example shown in FIG. 8, the left and right front wheels 14, 14 and the left and right rear wheels 16, 16 are controlled respectively such that both sets of wheels are toe-in, but it is also possible to perform control such that one or both sets of wheels are toe-out.

Further, although not shown in the drawings, a mode in which either the left and right front wheels 14, 14 or the left and right rear wheels 16, 16 are set as the control subject wheels and the slip angles α are controlled such that the absolute values thereof are equal but the signs thereof are reversed may be employed.

Furthermore, in this embodiment, the slip angle α of the control subject wheel is varied in accordance with the road surface condition (including a road surface condition expressed by the road surface μ) and the ground contact load, but the present invention may be implemented in an aspect whereby the slip angle α of the control subject wheel is varied in accordance with the required braking force of the vehicle instead of, or in addition to, these parameters. An example of the required braking force is an instructed braking force reflecting the strength of the desire of the driver to brake, and another example is a calculated braking force obtained through calculation during automatic control represented by inter-vehicle distance control and automatic braking control.

Further, in this embodiment, when braking control using lateral force is required, the absolute value of the target value α* of the slip angle α is based on the ground contact load F and the road surface μ, but is increased by a variable quantity not based on the required braking force of the vehicle (=a target value α* indicating an increment from the current value).

However, the present invention may be implemented in an embodiment whereby, when braking control using lateral force is required, the absolute value of the target value α* of the slip angle α is based on the required braking force, but is increased by a variable quantity not based on the ground contact load F and the road surface μ, or an embodiment whereby the target value α* of the slip angle α is increased by a variable quantity based on the required braking force, the ground contact load F, and the road surface μ. In any case, a variable quantity based on at least the required braking force is determined so as to increase steadily as the required braking force increases.

Furthermore, in this embodiment the lateral force of the wheel is used actively in wheel braking, and therefore the vehicle braking effect is improved. Increasing the slip angle absolute value α to use the lateral force leads to an increase above typical levels in the projected surface area when the wheel is projected in the vehicle body advancement direction. An increase in the projected surface area of the wheel leads to an increase in the surface area with which the wheel collides with objects such as snow and gravel when the wheel travels along poor roads such as snowy roads and gravelly roads, for example.

Hence, when wheel braking is performed using the lateral force of the wheel actively, the braking effect is improved not only by the lateral force, which nevertheless serves as a principal factor, but also by an increase in the resistance with which the wheel collides with objects such as snow and gravel.

Furthermore, in this embodiment a brake, not shown in the drawing, is operated during vehicle braking, and therefore the braking effect is the sum total of the effect produced by operating the brake and the effect produced by the lateral force. In this manner, braking using lateral force may be performed in combination with other types of braking. Note, however, that the present invention may be implemented in an aspect whereby wheel braking is performed using lateral force alone. For example, when braking not directly attributable to the will of the driver is required, braking may be realized by lateral force alone, without operating the brake.

Next, a second embodiment of the present invention will be described. In this embodiment, a driving control program for increasing the slip angle absolute value α of each rear wheel 16, 16 during wheel driving is added to the first embodiment. The second embodiment differs from the first embodiment only in the elements relating to the driving control program, and all other elements are shared therebetween. Hence, these shared elements are cited using identical reference symbols or names, and duplicate description thereof has been omitted. Accordingly, only the driving control program will be described in detail.

In this embodiment, the left and right rear wheels 16, 16 are driven by a power source (an engine or an electric motor, for example) of the vehicle 18, and as a result, the vehicle 18 is driven. During driving of the rear wheels 16, 16, in particular during start-up, the torque by which the power source of the vehicle 18 attempts to drive the rear wheels 16, 16 may become excessive in relation to the road surface μ. When the driving torque of the rear wheels 16, 16 becomes excessive, the slip ratio of the rear wheels 16, 16 decreases, leading to a reduction in the driving force generated between the rear wheels 16, 16 and the road surface, and as a result, smooth start-up of the vehicle 18 is impeded.

To reduce the excessive driving torque, brakes (not shown in the drawings, but friction brakes, for example) of the rear wheels 16, 16 may be operated, but in this embodiment, the slip angle absolute value α of the rear wheels 16, 16 is increased instead of, or in parallel with, an operation of the brakes. Therefore, wheel braking using the lateral force of the rear wheels 16, 16 is performed, and the braking force generated as a result reduces the driving torque of the rear wheels 16, 16, thereby suppressing the spin tendency of the rear wheels 16, 16.

Figure 9:
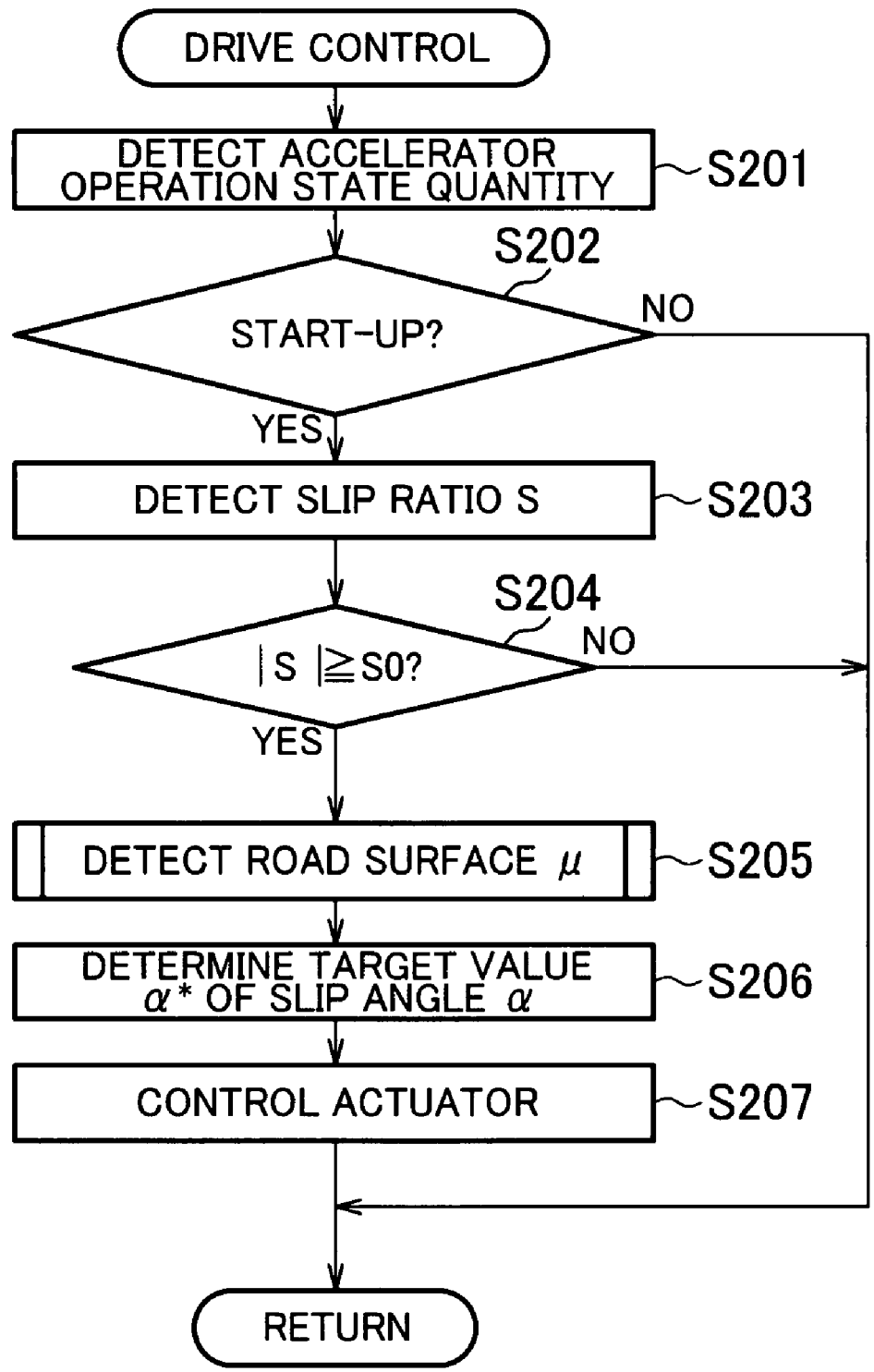
FIG. 9 is a flowchart illustrating conceptually a driving control program executed by a computer in a wheel control device according to a second embodiment of the present invention.

A driving control program illustrated conceptually by the flowchart in FIG. 9 is executed by the computer 72 to perform this driving control. The driving control program is executed repeatedly for each rear wheel 16, 16 when power is supplied to the computer 72.

During each execution of the driving control program, first, the accelerator operation quantity of state is detected by the accelerator operation state quantity sensor 62 in S201. More specifically, for example, an acceleration operation performed by the driver and the strength of the desire of the driver to accelerate, or in other words the required acceleration of the driver, are detected. The required acceleration of the driver may be estimated to be steadily greater as the travel of the accelerator operating member increases, for example. Hence, the required acceleration of the driver may also be expressed as the accelerator travel. An example of the accelerator travel is the depression angle of the accelerator pedal.

Next, in S202, a determination as to whether or not the vehicle 18 is in a start-up state, in which the driver attempts to start the vehicle 18, is made by referring to the detected accelerator operation quantity of state alone or in combination with another physical quantity (the aforementioned vehicle body speed and wheel acceleration). When the vehicle 18 is not in the start-up state, the determination of S202 becomes negative, and the current execution of the driving control program ends immediately.

On the other hand, when the vehicle 18 is in the start-up state, the determination of S202 becomes affirmative, and in S203, a slip ratio s of the current execution subject wheel is detected using the wheel speed sensor 66. The slip ratio s is obtained by dividing the difference between the wheel speed and the vehicle body speed by the vehicle body speed, for example. Next, in S204, a determination is made as to whether or not the absolute value of the detected slip ratio s is equal to or greater than a reference value s0, or in other words whether or not the spin tendency of the current execution subject wheel is excessive.

When it is determined that the absolute value of the slip ratio s is not equal to or greater than the reference value s0, the determination of S204 becomes negative, and the current execution of the driving control program ends immediately. On the other hand, when it is determined that the absolute value of the slip ratio s is equal to or greater than the reference value s0, the determination of S204 becomes affirmative, and the routine advances to S205.

In S205, the road surface μ relating to the current execution subject wheel is detected using the wheel speed sensor 66. Next, in S206, the target value α* of the slip angle absolute value α is determined for the current execution subject wheel on the basis of the detected road surface μ and the detected required acceleration of the driver. More specifically, the target value α* is determined to increase steadily as the amount of braking force required to reduce the driving torque that is applied to the current execution subject wheel increases, this braking force being generated by the lateral force of the wheel.

Figure 10:
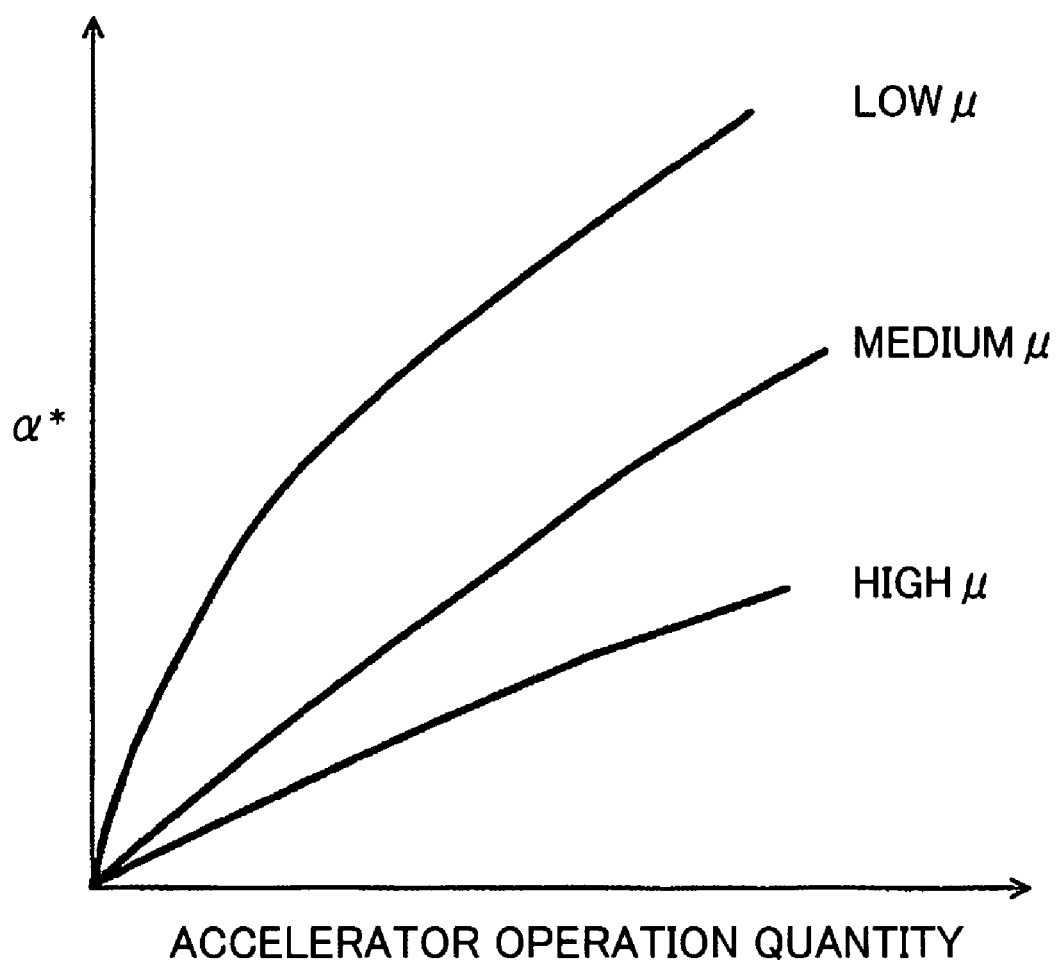
FIG. 10 is a graph illustrating a condition in which the target value $\alpha^*$ is determined through execution of the driving control program shown in FIG. 9.

More specifically, as shown conceptually by the graph in FIG. 10, the target value α* is determined to increase steadily as the required acceleration of the driver, or in other words the accelerator travel, increases and the road surface μ decreases. The relationship between the accelerator travel, road surface μ, and target value α* is stored in the ROM 76, and the computer 72 determines the target value α* in accordance with the stored relationship so as to correspond to both the detected accelerator travel and the road surface μ.

Next, in S207, the electric actuator 50 corresponding to the current execution subject wheel is driven such that the determined target value α* is reached. Thus, the spin tendency of the current execution subject wheel is suppressed, and smooth start-up of the vehicle 18 is realized. The current execution of the driving control program is then terminated.

As is evident from the above description, in this embodiment the part of the computer 72 that executes the driving control program constitutes an example of the "driving control portion" in claim 4.

Several embodiments of the present invention were described in detail above on the basis of the drawings. However, these embodiments are merely examples, and the present invention may be implemented in other aspects, beginning with the embodiments described in the section entitled "DISCLOSURE OF THE INVENTION", that have been subjected to various modifications and improvements on the basis of the knowledge of a person skilled in the art.

Figure 11:
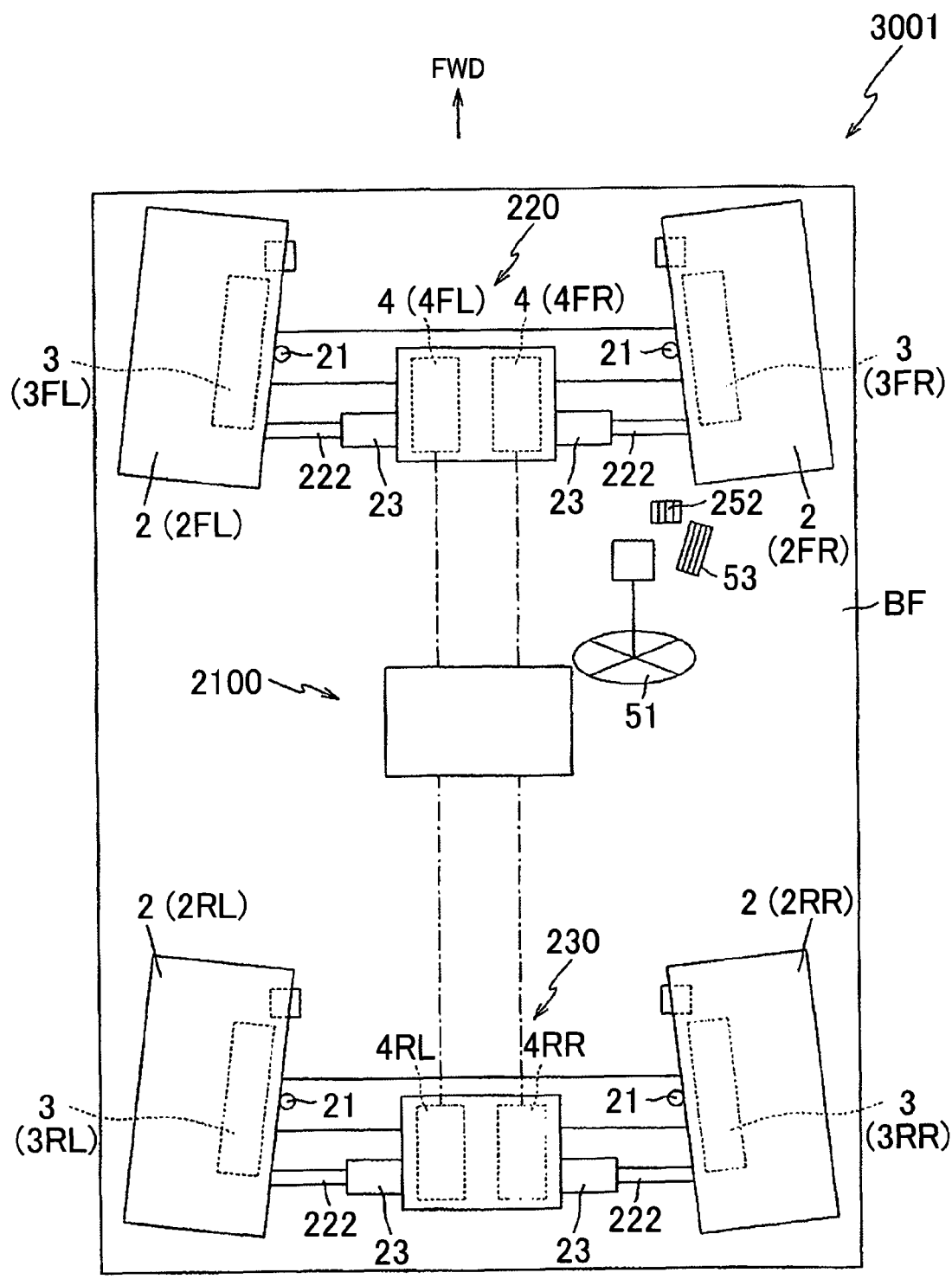
FIG. 11 is a pattern diagram showing a vehicle in which a control device according to a third embodiment of the present invention is installed.

Next, a third embodiment will be described with reference to the attached drawings. FIG. 11 is a pattern diagram showing a vehicle 3001 in which a control apparatus 2100 according to the third embodiment of the present invention is installed. Note that an arrow FWD in FIG. 11 indicates the advancement direction of the vehicle 3001. Furthermore, FIG. 11 shows a state in which a predetermined steering angle is applied to all wheels 2.

First, the schematic constitution of the vehicle 3001 will be described. As shown in FIG. 11, the vehicle 3001 is constituted mainly by a vehicle body frame BF, a plurality of (in this embodiment, four) wheels 2 supported on the vehicle body frame BF, a wheel driving device 3 for driving each wheel 2 to rotate independently, and an actuator device 4 for steer-driving each wheel 2 independently. During braking, a slip angle θ and a rotation speed of the wheels 2 are controlled respectively by the control device 2100, to be described below, and thus the braking force can be improved and the braking distance can be shortened.

Next, the constitution of each part will be described in detail. As shown in FIG. 11, the wheels 2 include left and right front wheels 2FL, 2FR positioned on the front side of the advancement direction of the vehicle 3001, and left and right rear wheels 2RL, 2RR positioned on the rear side of the advancement direction. The front and rear wheels 2FL to 2RR are constituted to be steerable by steering devices 220, 230.

The steering devices 220, 230 are steering devices for steering the wheels 2, and as shown in FIG. 11, are constituted mainly by a king pin 21 for supporting each wheel 2 swingably, a tie rod 222 connected to a knuckle arm (not shown) of each wheel 2, and a transmission mechanism portion 23 for transmitting the driving force of the actuator device 4 to the tie rod 222.

As noted above, the actuator device 4 is a steer-driving device for steer-driving each wheel 2 independently, and as shown in FIG. 11, is constituted by four actuators (FL to RR actuators 4FL to 4RR). When the driver operates a steering wheel 51, a part of the actuator devices 4 (for example, those relating to the front wheels 2FL, 2FR alone) or all of the actuator devices 4 are driven to apply a steering angle corresponding to the travel of the steering wheel 51.

The actuator device 4 is also driven when the driver operates a brake pedal 252, whereby a slip angle θ corresponding to the travel of the brake pedal 252 is applied to the wheels 2 such that braking control of the wheels 2 is performed. Note that braking control will be described in detail below.

In this embodiment, the FL to RR actuators 4FL to 4RR are constituted by electric motors, and the transmission mechanism portion 23 is constituted by a screw mechanism. When the electric motor rotates, the rotary motion thereof is converted into linear motion by the transmission mechanism portion 23 and transmitted thus to the tie rod 222. As a result, the wheel 2 is driven to swing about the king pin 21, and thus a predetermined steering angle is applied to the wheel 2.

The wheel driving device 3 is a rotary driving device for driving the wheels 2 to rotate independently, and as shown in FIG. 11, is constituted by four electric motors (FL to RR motors 3FL to 3RR) provided for the four wheels 2 (i.e. as in-wheel motors). When the driver operates an accelerator pedal 53, rotary driving force from each wheel driving device 3 is applied to each wheel 2, and thus each wheel 2 is rotated at a rotation speed corresponding to the travel of the accelerator pedal 53.

The wheel driving device 3 is also drive-controlled when the driver operates the brake pedal 252, whereby each wheel 2 is rotated at a rotation speed corresponding to the travel of the brake pedal 252. Thus, braking control of the wheels 2 is performed. Note that braking control will be described in detail below.

The control device 2100 is a control device for controlling each part of the vehicle 3001 constituted in the manner described above, and performs braking control of the wheels 2 by operating the wheel driving device 3 and actuator device 4 to control the rotation speed and slip angle θ of the wheels 2. The constitution of the control device 2100 will now be described in detail with reference to FIG. 12.

Figure 12:
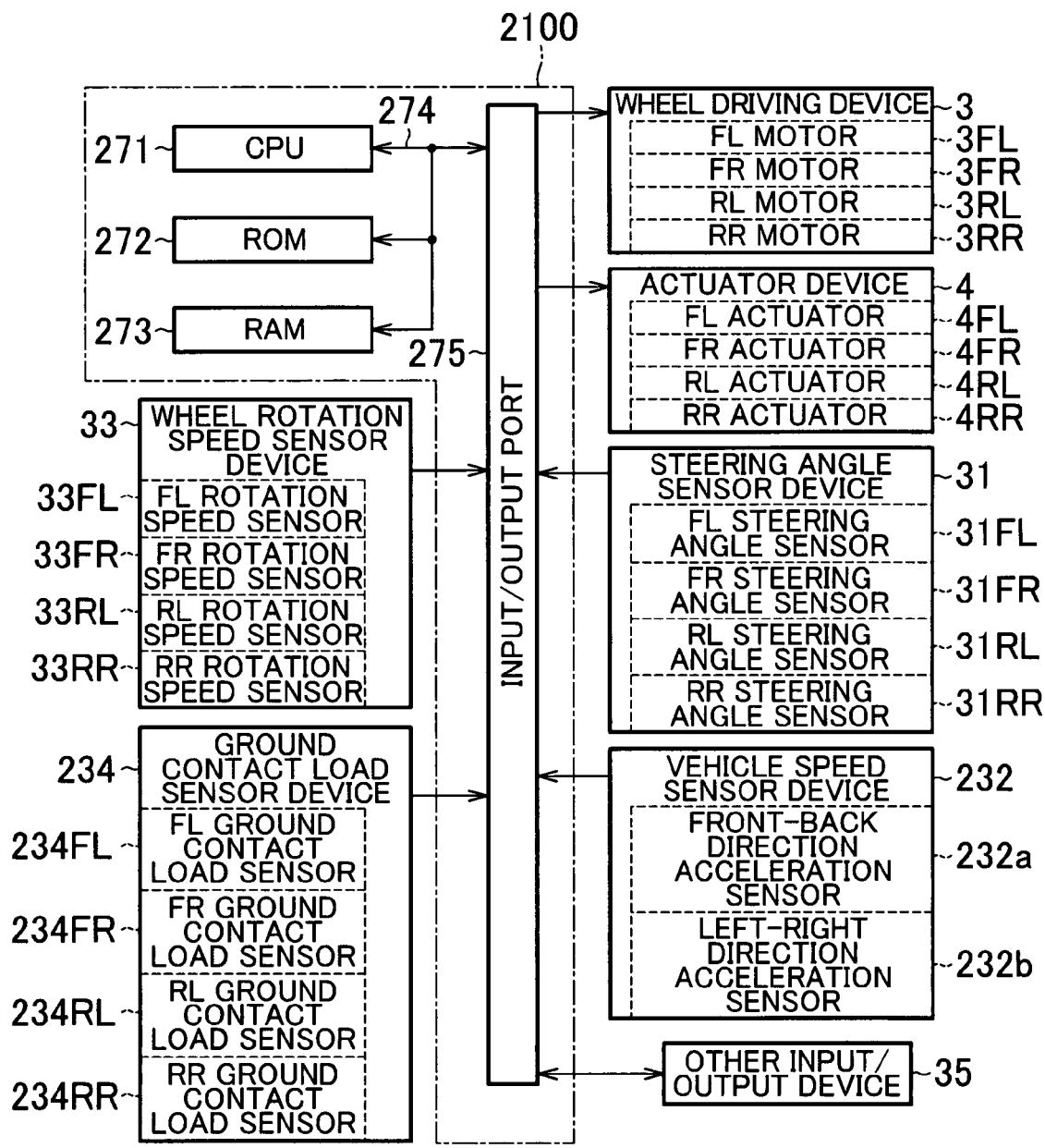
FIG. 12 is a block diagram showing the electric configuration of the control device.

FIG. 12 is a block diagram showing the electric configuration of the control device 2100. As shown in FIG. 12, the control device 2100 has a CPU 271, ROM 272, and RAM 273, which are connected to an input/output port 275 via a bus line 274. A plurality of devices such as the wheel driving motors 3 are also connected to the input/output port 275.

The CPU 271 is a calculation device for controlling the parts connected by the bus line 274. The ROM 272 is non-rewritable, non-volatile memory storing a control program that is executed by the CPU 271, fixed value data, and so on. The RAM 273 is memory for storing various data rewritably during execution of the control program. Note that the ROM 272 stores a deformation limit value Llim shown in FIG. 14 and a flowchart (braking control) program shown in FIG. 15.

As described above, the wheel driving device 3 is a device for driving the wheels 2 (see FIG. 11) to rotate, and is constituted by four FL to RR motors 3FL to 3RR for applying rotary driving force to each wheel 2, and a drive circuit (not shown) for drive-controlling the motors 3FL to 3RR on the basis of a command from the CPU 271.

Also as described above, the actuator device 4 is a device for steer-driving the wheels 2, and is constituted by four FL to RR actuators 4FL to 4RR for applying a steer-driving force to each wheel 2, and a drive circuit (not shown) for drive-controlling the actuators 4FL to 4RR on the basis of a command from the CPU 271.

A steering angle sensor device 31 is a device for detecting the steering angle of each wheel 2 and outputting the detection result to the CPU 271. The steering angle sensor device 31 is constituted by four FL to RR steering angle sensors 31 FL to 31 RR for detecting the respective steering angles of the wheels 2, and a processing circuit (not shown) for processing the detection results of the respective steering angle sensors 31 FL to 31 RR and outputting the processed results to the CPU 271.

Note that in this embodiment, the steering angle sensors 31 FL to 31 RR are provided respectively in the transmission mechanism portions 23, and are constituted by non-contact type rotation angle sensors for detecting the rotation speed when rotary motion is converted into linear motion in the transmission mechanism portion 23. The rotation speed is commensurate with the displacement of the tie rod 222, and therefore the CPU 271 may obtain the steering angle of each wheel 2 on the basis of the detection result (rotation speed) that is input from the steering angle sensor device 31.

Here, the steering angle detected by the steering angle sensor device 31 is the angle formed by a center line (a virtual line d2, see FIG. 13) of each wheel 2 and a reference line of the vehicle 3001 (the vehicle body frame BF), and is determined regardless of the advancement direction (a virtual line d1, see FIG. 13) of the vehicle 3001. Meanwhile, the slip angle θ (see FIG. 13), to be described below, is the angle formed by the center line of each wheel 2 and the advancement direction of the vehicle 3001, and is calculated on the basis of the detection results of the steering angle sensor device 31 and a vehicle speed sensor device 232 to be described below. A method of calculating the slip angle θ will be described below.

A ground contact load sensor device 234 is a device for detecting a ground speed (absolute value and advancement direction) Vc of the vehicle 3001 relative to the road surface, and outputting the detection result to the CPU 271. The ground contact load sensor device 234 is constituted by front-back and left-right direction acceleration sensors 232a, 232b, and a processing circuit (not shown) for processing the detection results of the acceleration sensors 232a, 232b and outputting the processed results to the CPU 271.

The front-rear direction acceleration sensor 232a is a sensor for detecting the acceleration of the vehicle 3001 (the vehicle body frame BF) in the front-rear direction (the up-down direction in FIG. 11), while the left-right direction acceleration sensor 232b is a sensor for detecting the acceleration of the vehicle 3001 (the vehicle body frame BF) in the left-right direction (the left-right direction in FIG. 11). Note that in this embodiment, the acceleration sensors 232a, 232b are constituted by piezoelectric sensors using a piezoelectric element.

The CPU 271 time-integrates the detection results (acceleration values) of the acceleration sensors 232a, 232b, input from the ground contact load sensor device 234, to calculate the speed in two directions (the front-rear and left-right directions), and by synthesizing these two direction components, the CPU 271 can obtain the ground speed (absolute value and advancement direction) Vc of the vehicle 3001.

Further, when the advancement direction of the vehicle 3001 is obtained in this manner, the CPU 271 is capable of obtaining the slip angle θ of each wheel 2, or in other words the angle formed by the center line (the virtual line d2) of each wheel 2 and the advancement direction (the virtual line d1) of the vehicle 3001, on the basis of the advancement direction of the vehicle 3001 and the steering angle of each wheel 2, detected by the steering angle sensor device 31 as described above (see FIG. 13).

A wheel rotation speed sensor device 33 is a device for detecting the rotation speed of each wheel 2 and outputting the detection result to the CPU 271. The wheel rotation speed sensor device 33 is constituted by four FL to RR rotation speed sensors 33FL to 33RR for respectively detecting the rotation speed of the wheels 2, and a processing circuit (not shown) for processing the detection results of the rotation speed sensors 33FL to 33RR and outputting the processed results to the CPU 271.

Note that in this embodiment, the rotation sensors 33FL to 33RR are provided on each wheel 2, and detect the angular velocity of each wheel 2 as the rotation speed. In other words, the rotation sensors 33FL to 33RR are constituted by electromagnetic pickup type sensors having a rotary body that rotates in conjunction with the corresponding wheel 2 and a pickup for electromagnetically detecting the presence of a large number of teeth formed in the circumferential direction of the rotary body.

The CPU 271 is capable of obtaining the actual peripheral velocity Vr (see FIG. 13) of each wheel 2 from the rotation speed of each wheel 2, input from the wheel rotation speed sensor device 33, and the outer diameter of each wheel 2.

The ground contact load sensor device 234 is a device for detecting the ground contact load generated between each wheel 2 and the road surface, and outputting the detection result to the CPU 271. The ground contact load sensor device 234 is constituted by FL to RR ground contact load sensors 234FL to 234RR for detecting the respective ground contact loads of the wheels 2, and a processing circuit (not shown) for processing the detection results of the ground contact load sensors 234FL to 234RR and outputting the processed results to the CPU 271.

Note that in this embodiment, the ground contact load sensors 234FL to 234RR are constituted by piezo-resistance type three-axis load sensors. Each load sensor 234FL to 234RR is disposed above a suspension shaft (not shown) of the corresponding wheel 2, and the ground contact load is detected in the front-rear direction, the left-right direction, and the up-down direction of the vehicle 3001.

The CPU 271 is capable of obtaining a frictional coefficient μ of the road surface on the ground contact surface of the wheels 2 from the detection results (ground contact load) of the load sensors 234FL to 234RR, input from the ground contact load sensor device 234.

For example, focusing on the front wheel 2FL, when the front-rear direction, left-right direction, and up-down direction ground contact loads of the vehicle 3001, detected by the FL load sensor 234, are Fx, Fy, and Fz, respectively, the frictional coefficient μ of the part of the road surface corresponding to the ground contact surface of the front wheel 2FL is obtained by calculating an advancement direction frictional coefficient μx of the vehicle 3001 from Fx/Fz, and calculating a left-right direction frictional coefficient μy of the vehicle 3001 from Fy/Fz.

An operation state detection sensor device (not shown) for detecting the operation state (the rotation angle, depression amount, operation speed, and so on) of the steering wheel 51, brake pedal 252, and accelerator pedal 53 (see FIG. 11), for example, may be used as another input/output device 35 shown in FIG. 12.

For example, when the brake pedal 252 is operated, the operation quantity of state thereof is detected by the operation state detection sensor and output to the CPU 271. The CPU 271 increases the slip angle absolute value θ of each wheel 2 by driving the actuator device 4, thereby initiating braking control (see FIG. 15).

Figure 13A:
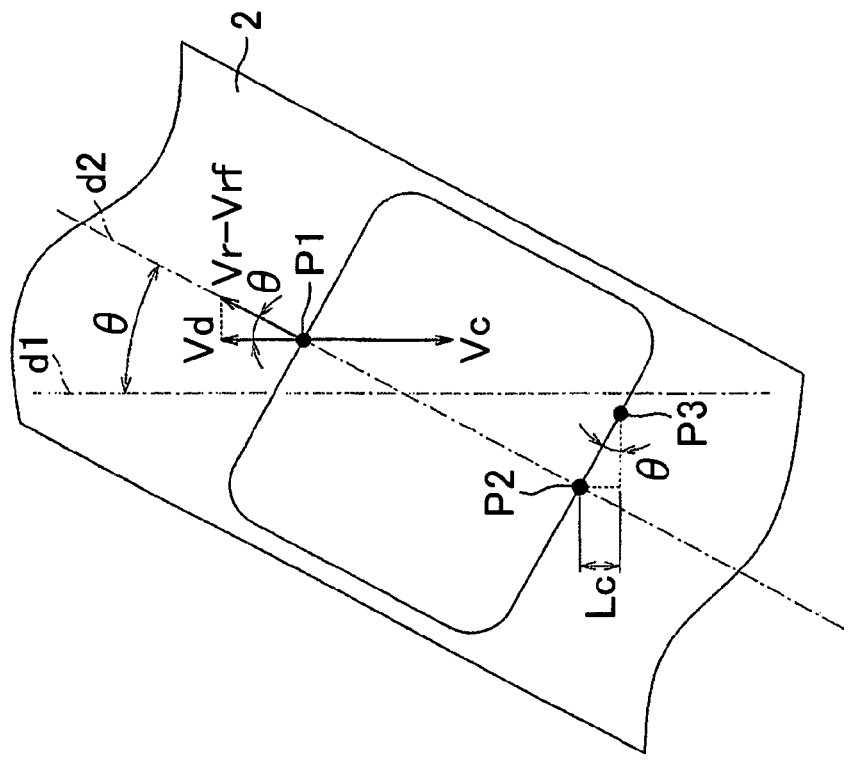
FIG. 13A is a top view of a wheel.
Figure 13B:
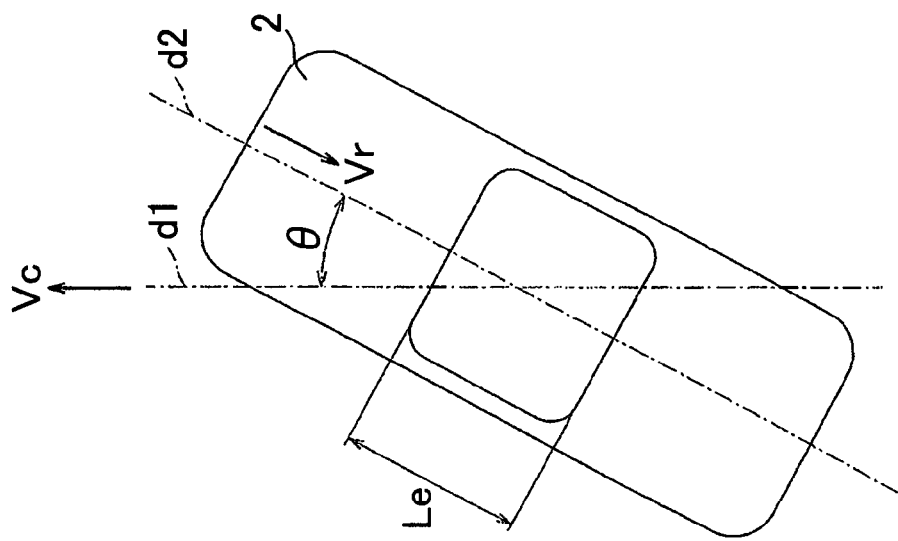
FIG. 13B is a partially enlarged view of FIG. 12A.

Next, the braking control of the present invention will be described with reference to FIGS. 13 to 15. FIG. 13 is a pattern diagram showing the condition of the wheel 2 during braking control, FIG. 13A being a top view of the wheel 2 and FIG. 13B being a partially enlarged view of FIG. 13A.

Note that FIG. 13 shows a state in which the vehicle 3001 travels at the ground speed Vc and the slip angle θ of the wheel 2 is not zero. The solid line indicates the outer shape and ground contact surface of the wheel 2, the virtual line d1 indicates the advancement direction of the vehicle 3001, and the virtual line d2 indicates the center line of the wheel 2. Further, as shown in FIG. 13A, the ground contact surface of the wheel 2 contacts the road surface by a length Le in the center line direction (the direction of the virtual line d2).

In the state shown in FIG. 13, assuming that the wheel 2 rolls freely (i.e. rolls such that slippage does not occur between the wheel 2 and the road surface), a peripheral velocity Vrf of the wheel 2 during free rolling is expressed by $Vrf=Vc/\cos\theta$. However, an actual peripheral velocity Vr of the wheel 2 differs from the peripheral velocity Vrf during free rolling due to the effects of braking force generated by the state of the road surface and the slip angle $\theta$, driving torque from the wheel driving device 3 (see FIG. 11), and so on.

Hence, as shown in FIG. 13B, in a predetermined position (a position P1, for example) on the ground contact surface of the wheel 2, a speed difference (Vr−Vrf) between the actual peripheral velocity Vr and the peripheral velocity Vrf during free rolling serves as a speed relative to the road surface. A speed Vd obtained by breaking this speed down into the advancement direction of the vehicle 3001 is expressed by $Vd=(Vr-Vrf)\times\cos\theta$.

Furthermore, the vehicle 3001 is traveling at the ground speed Vc, and therefore, as shown in FIG. 13B, in the position P1 on the ground contact surface of the wheel 2, a speed Vc also serves as the speed relative to the road surface. Hence, the speed component in the advancement direction (the virtual line d1 direction) of the vehicle 3001, from the speed relative to the road surface in the position P1, is expressed by $Vc-Vd=Vc-(Vr-Vrf)\times\cos\theta$.

In other words, assuming that the wheel 2 rolls freely, the position P1 moves along the center line (the virtual line d2) to reach a position P2, as shown in FIG. 13B. Since the ground contact surface of the wheel 2 has a speed component in the advancement direction (the virtual line d1 direction) of the vehicle 3001, the position P1, having reached the position P2, then reaches the position P3.

Hence, of the deformation amount in the position P1, a deformation amount Lc in the advancement direction (the virtual line d1 direction) of the vehicle 3001 is expressed by $Lc=(Vc-(Vr-Vrf)\times\cos\theta)\times t=(Vc-(Vr-Vrf)\times\cos\theta)\times Le/Vr$. Note that since $Vrf=Vc/\cos\theta$, the deformation amount Lc of the ground contact surface of the wheel 2 in the advancement direction of the vehicle 3001 is ultimately expressed by $Lc=(2\times Vc-Vr\times\cos\theta)\times Le/Vr$.

Hence, assuming that the ground speed Vc and slip angle $\theta$ of the vehicle 3001 are fixed values, the deformation amount Lc of the ground contact surface of the wheel 2 in the advancement direction of the vehicle 3001 is dependent on the actual peripheral velocity Vr of the wheel 2. Therefore, during braking of the vehicle 3001, the deformation amount Lc of the ground contact surface of the wheel 2 in the vehicle advancement direction can be increased by controlling the actual peripheral velocity Vr (rotation speed) of the wheel 2, even when the ground speed Vc remains the same, as will be described below. As a result, greater frictional force (braking force) can be generated on the ground contact surface of the wheel 2, enabling an improvement in the braking force of the vehicle 3001 and a corresponding reduction in braking distance.

Here, the slip ratio s of the wheel 2 is expressed in the following manner using the peripheral velocity Vrf of the wheel 2 during free rolling and the actual peripheral velocity Vr of the wheel 2. When $Vrf>Vr$, $s=(Vr-Vrf)/Vrf$, and when $Vr>Vrf$, $s=(Vr-Vrf)/Vr$. Note that $Vrf=Vc/\cos\theta$.

Hence, similarly to the deformation amount Lc described above, the slip ratio s can also be expressed as a function of the ground speed Vc of the vehicle 3001, the slip angle $\theta$, and the actual peripheral velocity Vr of the wheel 2.

Figure 14:
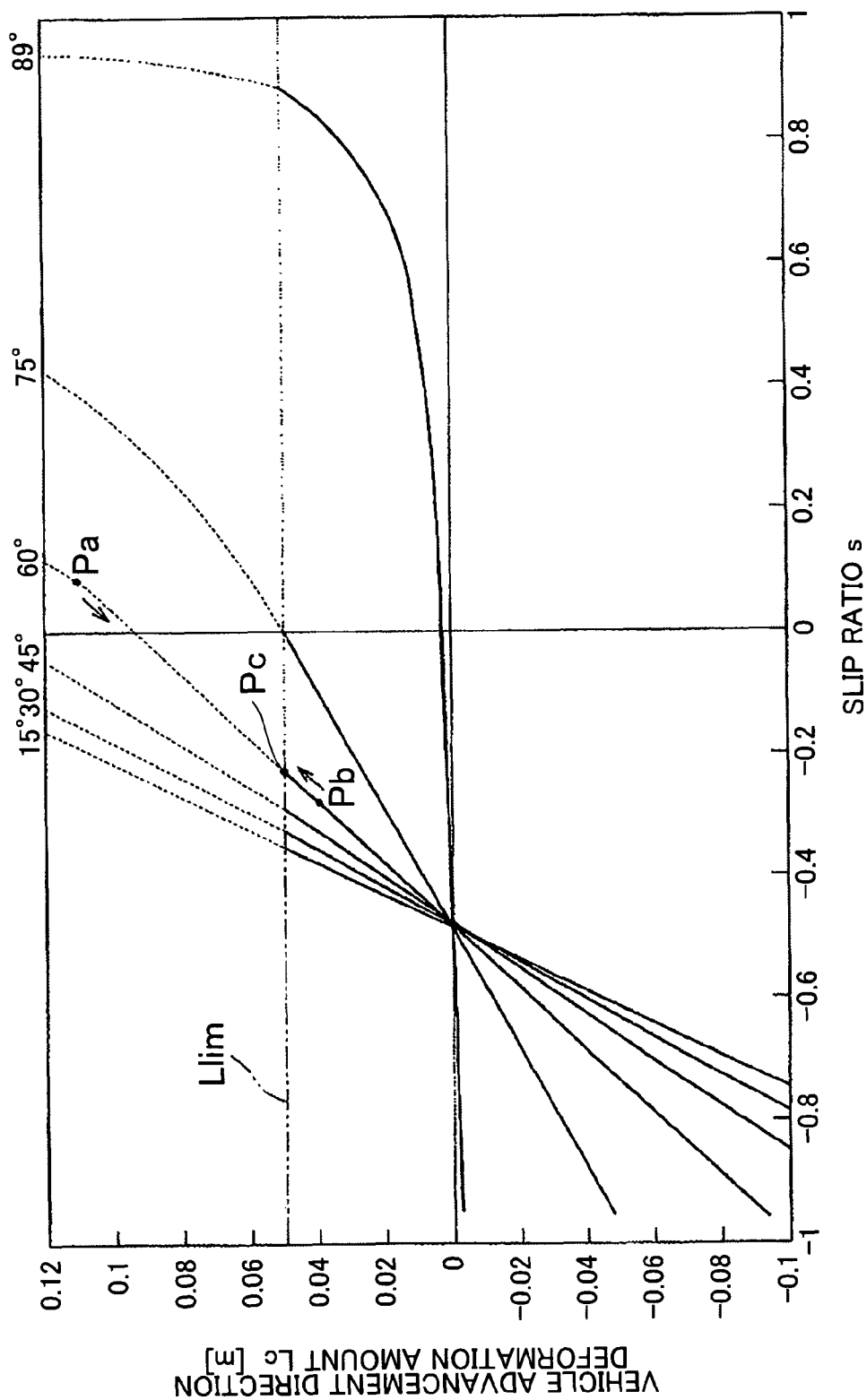
FIG. 14 is a view showing a relationship between a slip ratio of the wheel and the amount of vehicle advancement direction deformation on a ground contact surface of the wheel.

Accordingly, when the values of the ground speed Vc of the vehicle 3001 and the slip angle $\theta$ are fixed and the relationship between the slip ratio s of the wheel 2 and the deformation amount Lc of the ground contact surface of the wheel 2 in the vehicle advancement direction are illustrated in a diagram, the graph shown in FIG. 14, which uses the actual peripheral velocity Vr of the wheel 2 as a parameter, can be obtained.

Note that FIG. 14 shows six patterns in which the ground speed Vc of the vehicle 3001 is fixed at 60 km per hour and the slip angle $\theta$ is varied at 15° (or 14°) intervals within a range of 15° to 89°. Further, the length Le of the ground contact surface of the wheel 2 is a fixed value determined by the profile and so on (the tire size, air pressure, and so on) of the wheel 2, and in the wheel 2 used in this embodiment, Le=0.2 m.

The dot-dot-dash line Llim in FIG. 14 is a limit value of deformation of the ground contact surface of the wheel 2 in the advancement direction of the vehicle 3001 (approximately 0.05 m in the wheel 2 used in this embodiment). The value of the deformation limit value Llim is dependent on the properties of the wheel 2 itself and the road surface condition. This value is measured in advance through a preliminary test using the wheel 2, and a maximum value thereof is stored in the ROM 272 (see FIG. 12). Note that in this embodiment, as will be described below, the value of the deformation limit value Llim is corrected in accordance with the value of the frictional coefficient $\mu$ of the road surface.

As described above, the deformation amount Lc of the ground contact surface of the wheel 2 in the advancement direction of the vehicle 3001 is set as a function of the ground speed Vc of the vehicle 3001, the slip angle $\theta$ of the wheel 2, and the actual peripheral velocity Vr of the wheel 2. Hence, by calculating these values Vc, $\theta$, Vr on the basis of the detection values of the sensors 31 to 33 (see FIG. 12), the current deformation amount Lc of each wheel 2 can be obtained.

Accordingly, by controlling the peripheral velocity Vr of each wheel 2 using the wheel driving device 3 (see FIG. 12) such that the current deformation amount Lc approaches the deformation limit value Llim, a greater deformation amount Lc can be applied to the ground contact surface of the wheel 2 even when the ground speed Vc remains the same, and as a result, greater frictional force (braking force) can be generated.

For example, when the deformation amount Lc occurring at the current peripheral velocity Vr of the wheel 2 already exceeds the deformation limit value Llim during braking of the vehicle 3001 (for example, a position Pa in FIG. 14), the actual peripheral velocity Vr of the wheel 2 is decreased, and when the deformation amount Lc has not yet reached the deformation limit value Llim (for example, a position Pb in FIG. 14), the actual peripheral velocity Vr of the wheel 2 is increased. In so doing, the deformation amount Lc is controlled to approach the deformation limit value Llim (a position Pc in FIG. 14).

Hence, even when the ground speed Vc remains the same, the deformation amount Lc can be increased. As a result, greater frictional force (braking force) can be generated on the ground contact surface of the wheel 2, enabling an improvement in the braking force of the vehicle 3001 and a corresponding reduction in braking distance.

Next, processing executed by the control apparatus 2100 will be described with reference to FIG. 15. FIG. 15 is a flowchart illustrating braking control processing. This processing is executed repeatedly (at 0.2 ms intervals, for example) by the CPU 271 while the control apparatus 2100 is switched on.

First, the CPU 271 determines in relation to the braking control processing whether or not braking control is required, or in other words whether or not the brake pedal 252 has been depressed by the driver (S2001). When an operation of the brake pedal 252 by the driver is not detected or an operation is detected but the travel (depression amount) is equal to or smaller than a predetermined travel, it is determined that braking control is not required (S2001: No), and the braking control processing is terminated. Following termination, the routine shifts to other processing not shown in the drawing.

On the other hand, when an operation of the brake pedal 252 by the driver is detected in the processing of S2001, it is determined that braking control is required (S2001: Yes), and a target value of the slip angle θ is determined for each wheel 2 in accordance with the detected operation state of the brake pedal 252 (S2002). The routine then advances to the processing of S2003. Note that in this embodiment, the target value (0° to 90°) of the slip angle θ is determined as a proportional value of the depression amount (0% to 100%) of the brake pedal 252.

In the processing of S2003, the wheels 2 are steer-driven by driving the actuator devices 4, whereby the slip angle θ of each wheel 2 is controlled to approach the target value (S2003). Thus, the slip angle absolute value θ of each wheel 2 is increased and lateral force is generated on the ground contact surface of each wheel 2. As a result, this lateral force acts as a braking force of the wheel 2 (the vehicle 3001).

After applying the slip angle θ to each wheel 2 through the processing of S2003, the ground speed Vc of the vehicle 3001 is detected by the ground contact load sensor device 234 (S2004), the rotation speed (i.e. the actual peripheral velocity Vr) of each wheel 2 is detected by the wheel rotation speed sensor device 33 (S2005), the slip angle θ of each wheel 2 is detected by the steering angle sensor device 31 (S2006), and the road surface frictional coefficient μ is detected by the ground contact load sensor device 234 (S2007). The routine then advances to the processing of S2008 and S2009.

In the processing of S2008, the current deformation amount Lc of the ground contact surface of each wheel 2 is calculated on the basis of the ground speed Vc, rotation speed (peripheral velocity Vr), and slip angle θ detected in the processing of S2004 to S2006 (S2008).

Meanwhile, in the processing of S2009, the deformation limit value Llim of the ground contact surface of each wheel 2 is corrected on the basis of the road surface frictional coefficient μ, detected in the processing of S2007 (S2009). As described above, a maximum value of the deformation limit value Llim of the wheel 2 (in other words, a value when the road surface frictional coefficient μ is at a maximum) is stored in the ROM 272, and a value obtained by multiplying the frictional coefficient μ by the deformation limit value Llim serves as the correction value.

After calculating and correcting the current deformation amount Lc of each wheel 2 and the deformation limit value Llim in the processing of S2008 and S2009, the wheel driving device 3 is driven to control the respective peripheral velocities Vr (rotation speeds) of each wheel 2 such that the deformation amount Lc of each wheel 2 reaches a maximum, or in other words approaches the corrected deformation limit value Llim, within a range that does not exceed the corrected deformation limit value Llim (S2010). The braking control processing is then terminated.

Through this processing, the deformation amount Lc of the ground contact surface of each wheel 2 in the vehicle advancement direction can be increased, and greater frictional force can be generated. As a result, the braking force of the vehicle 3001 can be improved and the braking distance can be shortened.

Further, by driving the wheel driving device 3, the peripheral velocity Vr of each wheel 2 can be varied such that the deformation amount Lc of the ground contact surface of each wheel 2 in the vehicle advancement direction increases within a range that does not exceed the deformation limit value Llim, and therefore frictional force can be generated reliably on the ground contact surface of each wheel 2, and the resultant braking force can be increased efficiently.

Furthermore, the deformation limit value Llim is corrected in accordance with the frictional coefficient μ of the road surface, and the peripheral velocity Vr of each wheel 2 is controlled such that the deformation amount Lc of the ground contact surface of each wheel 2 in the vehicle advancement direction increases within a range that does not exceed the corrected deformation limit value Llim. Thus, control can be performed with a high degree of reliability.

In the third embodiment, the wheel 2 is driven to rotate by the wheel driving device 3 and the peripheral velocity Vr (rotation speed) of the wheel 2 is controlled regardless of the slip angle θ of the wheel 2, but the present invention is not limited thereto. For example, the wheel 2 may be driven to rotate by the wheel driving device 3 only when the slip angle θ of the wheel 2 exceeds a reference magnitude.

Figure 16:
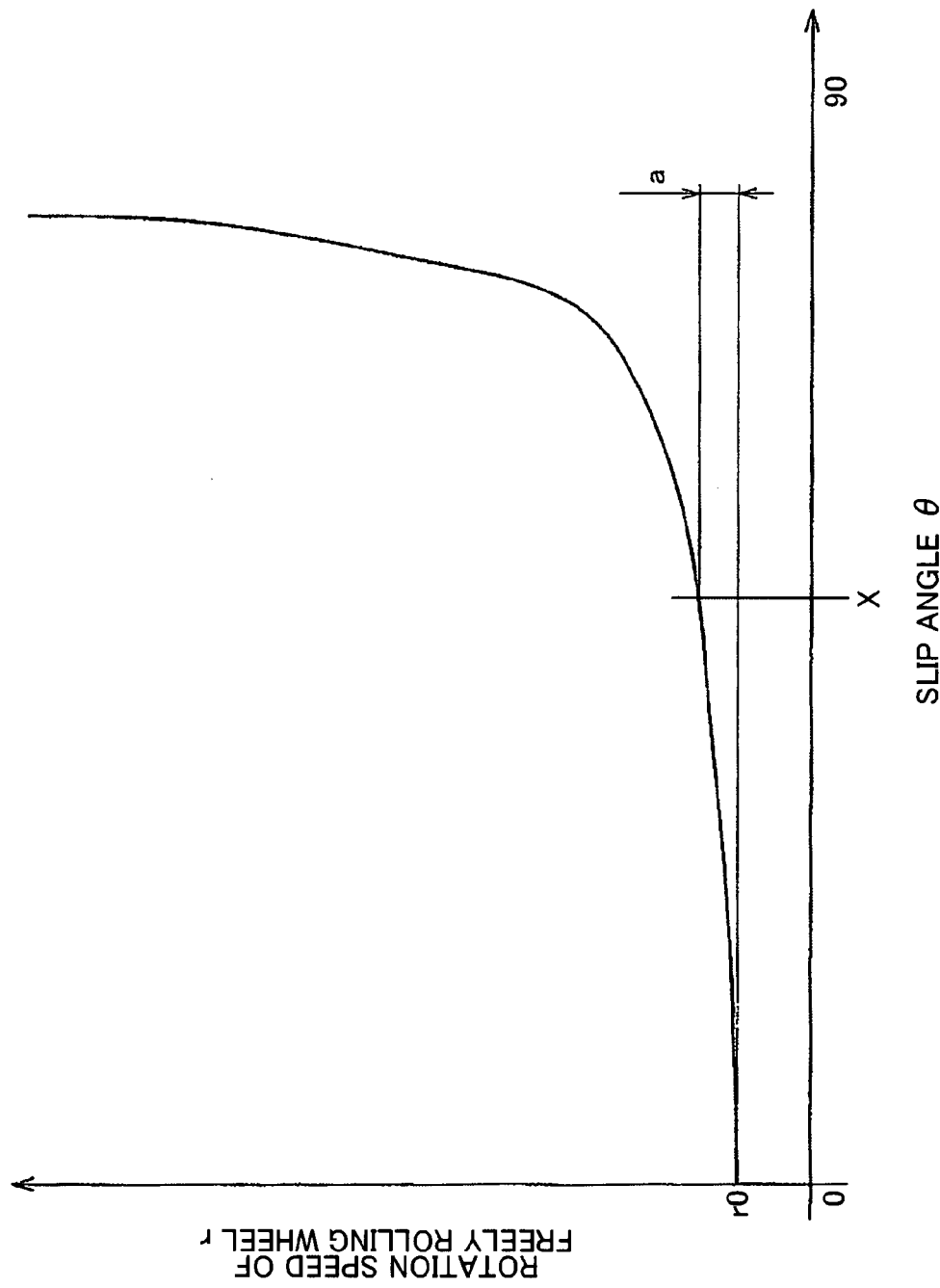
FIG. 16 is a view showing a relationship between a slip angle of the wheel and a rotation speed of a wheel that rolls freely.

FIG. 16 is a view showing a relationship between the slip angle θ of the wheel 2 and a rotation speed r of the freely rolling wheel 2. As shown in FIG. 16, to ensure that the wheel 2 rolls freely (as described above, free rolling is a state in which no slippage occurs between the wheel 2 and the road surface), the rotation speed of the wheel 2 must be raised as the slip angle θ increases.

More specifically, the rotation speed r of the freely rolling wheel 2 is $r=r0/\cos \theta$ relative to a rotation speed r0 when the slip angle θ=0. Hence, as shown in FIG. 16, in relation to variation in the slip angle θ, the rotation speed r of the freely rolling wheel 2 increases gradually in the former half and rises rapidly in the latter half.

Hence, as shown in FIG. 16, a slip angle X corresponding to a threshold a of the rotation speed r is determined. Until the value of the slip angle θ of the wheel 2 exceeds X (θ<X), the increase width of the rotation speed r of the wheel 2 is lower than the threshold a, and therefore rotation speed control of the wheel 2 (i.e. driving the wheel 2 to rotate using the wheel driving device 3 and controlling the peripheral speed Vr (rotation speed) thereof) is not performed. On the other hand, once the value of the slip angle θ of the wheel 2 has exceeded X (X<θ), rotation speed control of the wheel 2 is executed to cause the wheel 2 to follow the ground surface.

Figure 15:
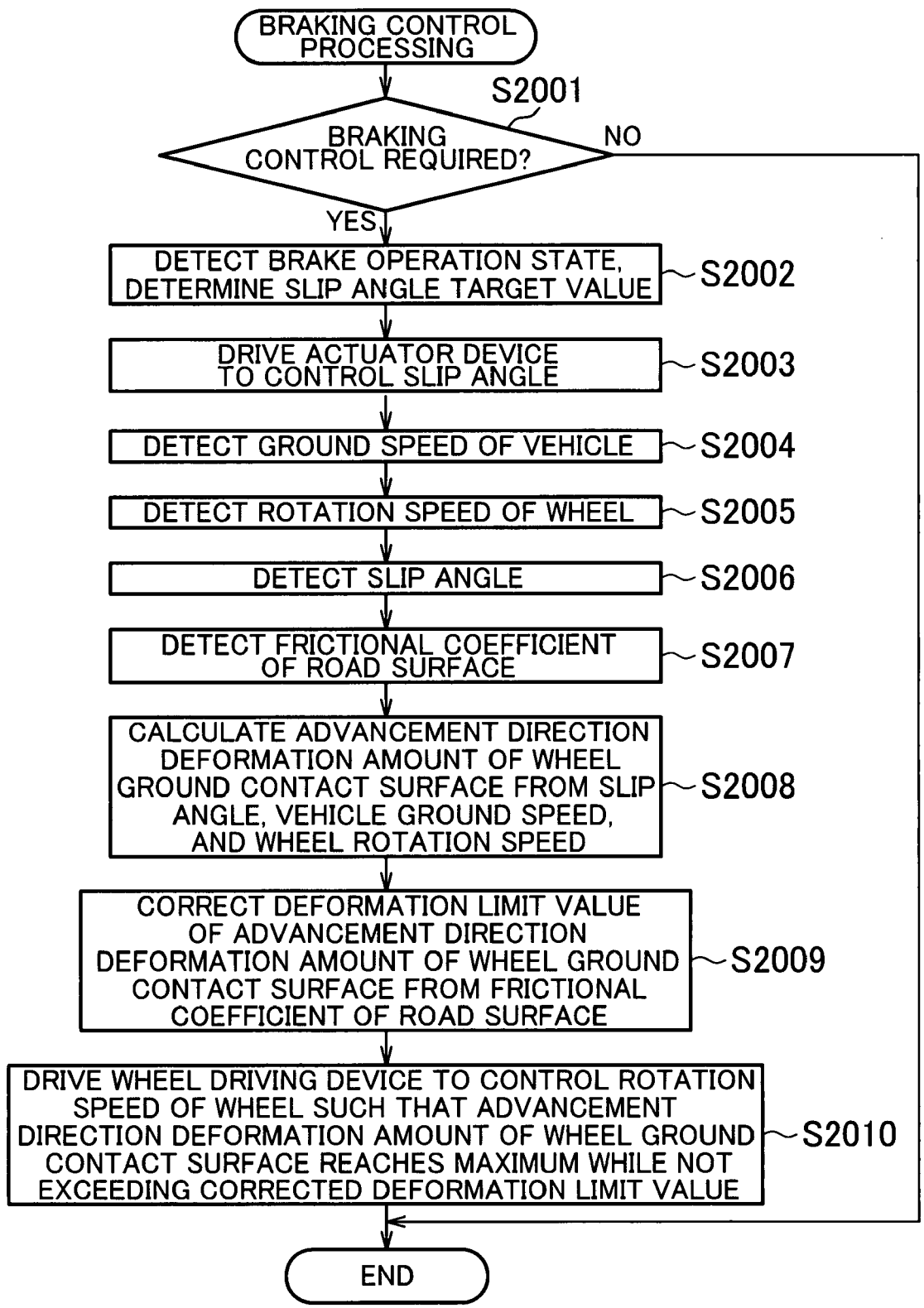
FIG. 15 is a flowchart showing braking control processing.

Note that in the flowchart (braking control processing) shown in FIG. 15, the processing of S2003 corresponds to an actuator operating unit of claim 5, the processing of S2010 corresponds to a wheel driving device operating unit of claim 5, the processing of S2004 corresponds to a ground speed detecting unit of claim 6, the processing of S2005 corresponds to a rotation speed detecting unit of claim 6, the processing of S2006 corresponds to a slip angle detecting unit of claim 6, the processing of S2008 corresponds to a deformation amount calculating unit of claim 6, the processing of S2007 corresponds to a frictional coefficient detecting unit of claim 7, and the processing of S2009 corresponds to a correcting unit of claim 7.

Figure 17:
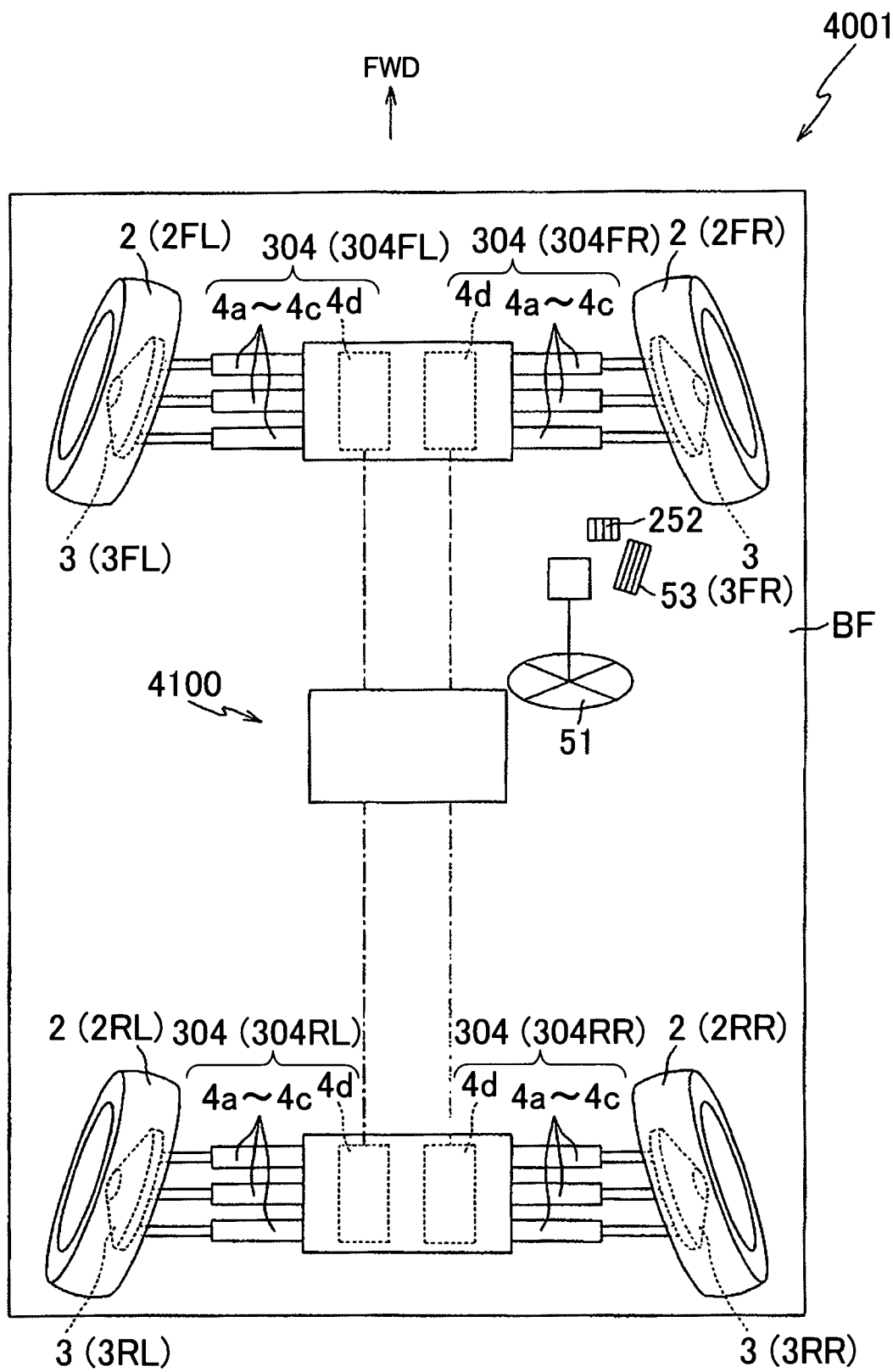
FIG. 17 is a pattern diagram showing a vehicle in which a control device according to a fourth embodiment of the present invention is installed.

Next, a fourth embodiment will be described with reference to the attached drawings. FIG. 17 is a pattern diagram showing a vehicle 4001 installed with a control device 4100 according to a fourth embodiment of the present invention. Note that an arrow FWD in FIG. 17 indicates the advancement direction of the vehicle 4001. Further, FIG. 17 shows a state in which a predetermined camber angle and a predetermined steering angle are applied to all of the wheels 2.

First, the schematic constitution of the vehicle 4001 will be described. As shown in FIG. 17, the vehicle 4001 is mainly constituted by a vehicle body frame BF, a plurality of (in this embodiment, four wheels) wheels 2 supported on the vehicle body frame BF, a wheel driving device 3 for driving each wheel 2 to rotate independently, and an actuator device 304 for performing steering driving and adjusting the camber angle and so on of each wheel 2. During braking, the camber angle and steering angle of the wheels 2 are controlled by a control device 4100 to be described below, thereby enabling an improvement in the braking force and a reduction in the braking distance.

Next, the constitution of each part will be described in detail. As shown in FIG. 17, the wheels 2 include left and right front wheels 2FL, 2FR positioned on the front side of the advancement direction of the vehicle 4001, and left and right rear wheels 2RL, 2RR positioned on the rear side of the advancement direction. The front and rear wheels 2FL to 2RR are constituted to be capable of independent rotation when a rotary driving force is applied thereto by the wheel driving device 3.

The wheel driving device 3 is a rotary driving device for driving each wheel 2 to rotate independently, and is constituted by attaching four electric motors (FL to RR motors 3FL to 3RR) to each wheel 2 (i.e. as in-wheel motors), as shown in FIG. 17. When a driver operates an accelerator pedal 53, a rotary driving force is applied to each wheel 2 from each wheel driving device 3, whereby each wheel 2 is rotated at a rotation speed corresponding to the operation amount of the accelerator pedal 53.

Further, the steering angle and camber angle of each wheel 2 (front and rear wheels 2FL to 2RR) can be adjusted by the actuator device 304. The actuator device 304 is a driving device for adjusting the camber angle and steering angle of each wheel 2, and a total of four actuator devices 304 (FL to RR actuators 304FL to 304RR) are disposed in positions corresponding to each wheel 2, as shown in FIG. 17.

For example, when the driver operates a steering wheel 51, all of the actuator devices 304 or a part thereof (for example, those corresponding to the front wheels 2FL, 2FR alone) are driven, whereby a steering angle corresponding to the operation amount of the steering wheel 51 is applied to the wheels 2. As a result, a steering operation is performed on the wheels 2 such that the vehicle 4001 turns in a predetermined direction.

The actuator device 304 is also driven when the driver operates a brake pedal 252, whereby the camber angles and steering angles of the wheels 2 are adjusted independently. As will be described below, when the driver presses the brake pedal 252, a camber angle and a steering angle corresponding to the depression amount are applied to each wheel 2, and thus braking control is performed on the vehicle 4001.

The constitution of the wheel driving device 3 and actuator device 304 will now be described in detail with reference to FIG. 18. FIG. 18A is a sectional view of the wheel 2, and FIG. 18B is a pattern diagram illustrating a method of adjusting the camber angle and steering angle of the wheel 2.

Note that power source wiring and the like for supplying a drive voltage to the wheel driving device 3 are omitted from FIG. 18A. Further, virtual axes Xf-Xb, Yl-Yr, and Zu-Zd in FIG. 18B correspond to the front-rear direction, left-right direction, and up-down direction of the vehicle 4001, respectively.

As shown in FIG. 18A, the wheel 2 (the front and rear wheels 2FL to 2RR) is constituted mainly by a tire 2a formed from a rubber elastic material, and a wheel 2b formed from an aluminum alloy or the like. The wheel driving device 3 (FL to RR motors 3FL to 3RR) is disposed in an inner peripheral portion of the wheel 2b as an in-wheel motor.

As shown in FIG. 18A, the wheel driving device 3 is constituted such that a drive shaft 3a projecting to a front surface side thereof (the left side in FIG. 18A) is connected and fixed to the wheel 2b, thereby enabling the transmission of a rotary driving force to the wheel 2 via the drive shaft 3a. Further, the actuator device 304 (FL to RR actuators 304FL to 304RR) is connected and fixed to a back surface of the wheel driving device 3.

An actuator driving device 4 has a plurality of (in this embodiment, three) hydraulic cylinders 4a to 4c, and a rod portion of these three hydraulic cylinders 4a to 4c is connected and fixed to the back surface side (the right side in FIG. 18A) of the wheel driving device 3 via a joint portion (in this embodiment, a universal joint) 54. As shown in FIG. 18B, the hydraulic cylinders 4a to 4c are disposed at substantially equal circumferential intervals (i.e. intervals of 120° in the circumferential direction), and one of the hydraulic cylinders 4b is disposed on the virtual axis Zu-Zd.

Thus, when the respective hydraulic cylinders 4a to 4c drive the respective rod portions to expand or contract by a predetermined length in a predetermined direction, the wheel driving device 3 is driven to swing about the virtual axes Xf-Xb, Zu-Zd, and as a result, a predetermined camber angle and a predetermined steering angle are applied to each wheel 2.

For example, as shown in FIG. 18B, when the rod portion of the hydraulic cylinder 4b is driven to contract and the rod portions of the hydraulic cylinders 4a, 4c are driven to expand while the wheel 2 is in a neutral position (the vehicle 4001 is in a state of direct advancement), the wheel driving device 3 is rotated about the virtual axis Xf-Xb (an arrow A in FIG. 18B), and a negative (negative camber) camber angle (the angle of a center line of the wheel 2 relative to the virtual axis Zu-Zd) is applied to the wheel 2. On the other hand, when the hydraulic cylinder 4b and the hydraulic cylinders 4a, 4c are driven respectively to expand and contract in opposite directions, a positive (positive camber) camber angle is applied to the wheel 2.

Further, when the rod portion of the hydraulic cylinder 4a is driven to contract and the rod portion of the hydraulic cylinder 4c is driven to expand while the wheel 2 is in a neutral position (the vehicle 4001 is in a state of direct advancement), the wheel driving device 3 is rotated about the virtual axis Zu-Zd (an arrow B in FIG. 18B), and a toe-in tendency steering angle (the angle of a center line of the wheel 2 relative to a reference line of the vehicle 4001, which is determined irrespective of the advancement direction of the vehicle 4001) is applied to the wheel 2. On the other hand, when the hydraulic cylinder 4a and the hydraulic cylinder 4c are driven to expand and contract in opposite directions, a toe-out tendency steering angle is applied to the wheel 2.

Note that the methods of driving the hydraulic cylinders 4a to 4c described here are examples of a case in which the wheel 2 is driven from a neutral position, as noted above, but by controlling the hydraulic cylinders 4a to 4c to expand and contract using these methods in combination, arbitrary camber angles and steering angles can be applied to the wheel 2.

Returning to FIG. 17, the control device 4100 is a control device for controlling each part of the vehicle 4001 constituted in the manner described above. For example, the control device 4100 controls the rotation speed of each wheel 2 by detecting the operation state of the accelerator pedal 53 and operating the wheel driving device 3 in accordance with the detection result, and controls braking and turning of the vehicle 4001 by detecting the operation states of the brake pedal 252 and steering wheel 51 and operating the actuator device 304 in accordance with the detection results such that the camber angle and steering angle of each wheel 2 are adjusted. The constitution of the control device 4100 will now be described in detail with reference to FIG. 19.

Figure 19:
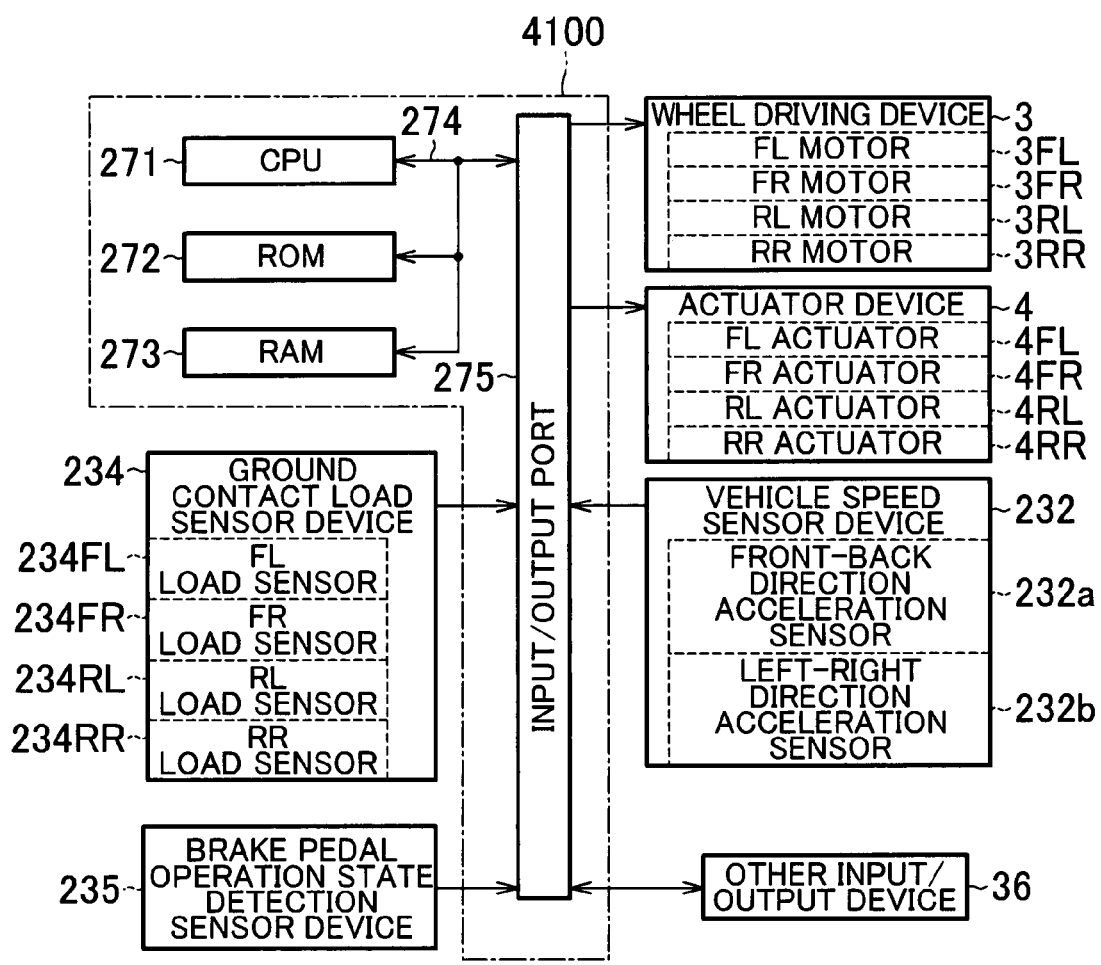
FIG. 19 is a block diagram showing the electric configuration of the control device.

FIG. 19 is a block diagram showing the electric configuration of the control device 4100. As shown in FIG. 19, the control device 4100 has a CPU 271, ROM 272, and RAM 273, which are connected to an input/output port 275 via a bus line 274. A plurality of devices such as the wheel driving motors 3 are also connected to the input/output port 275.

The CPU 271 is a calculation device for controlling the parts connected by the bus line 274. The ROM 272 is non-rewritable, non-volatile memory storing a control program that is executed by the CPU 271, fixed value data, and so on. The RAM 273 is memory for storing various data rewritably during execution of the control program.

Figure 20:
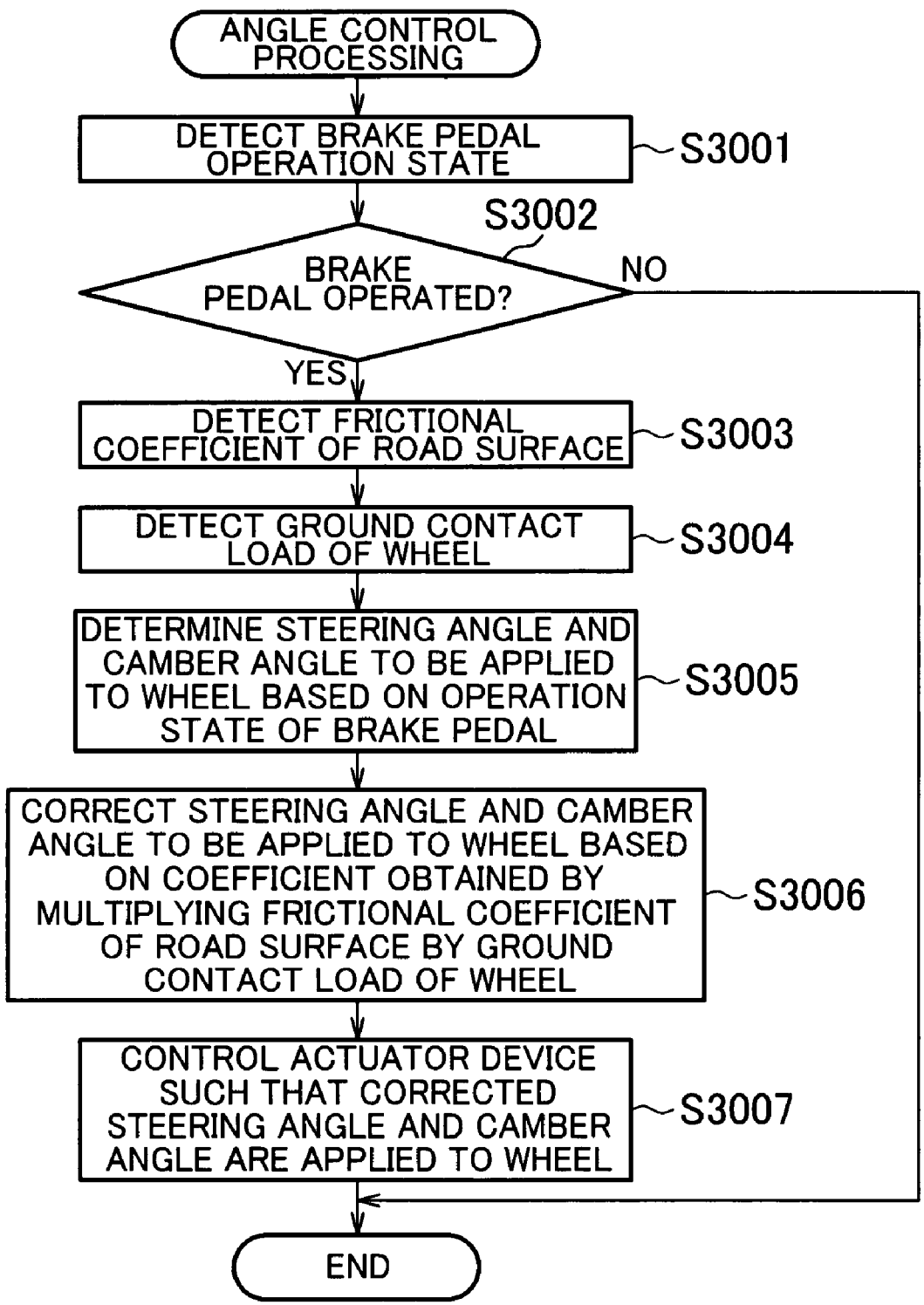
FIG. 20 is a flowchart showing angle control processing.
Figure 21A:
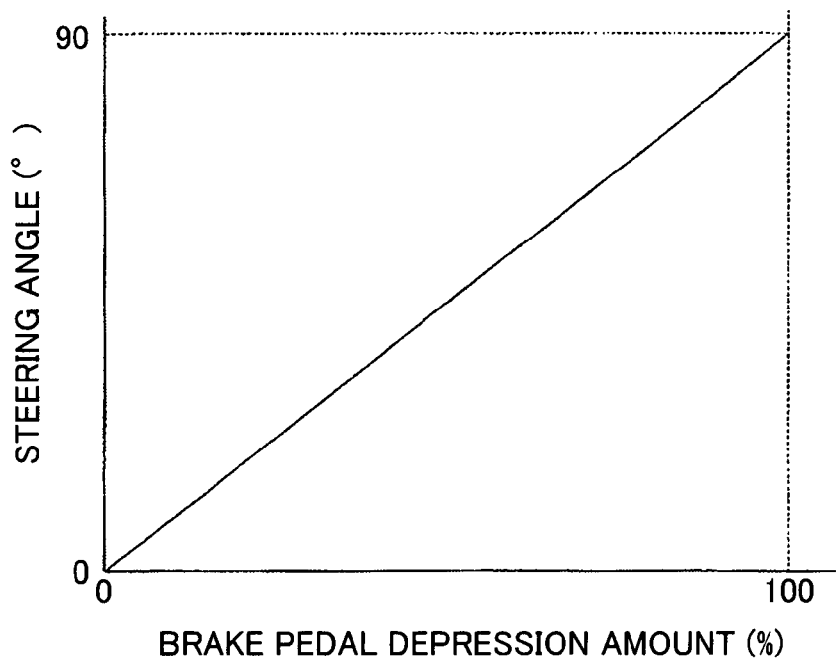
FIGS. 21A and 21B are pattern diagrams showing the content of a steering angle table and a camber angle table.
Figure 21B:
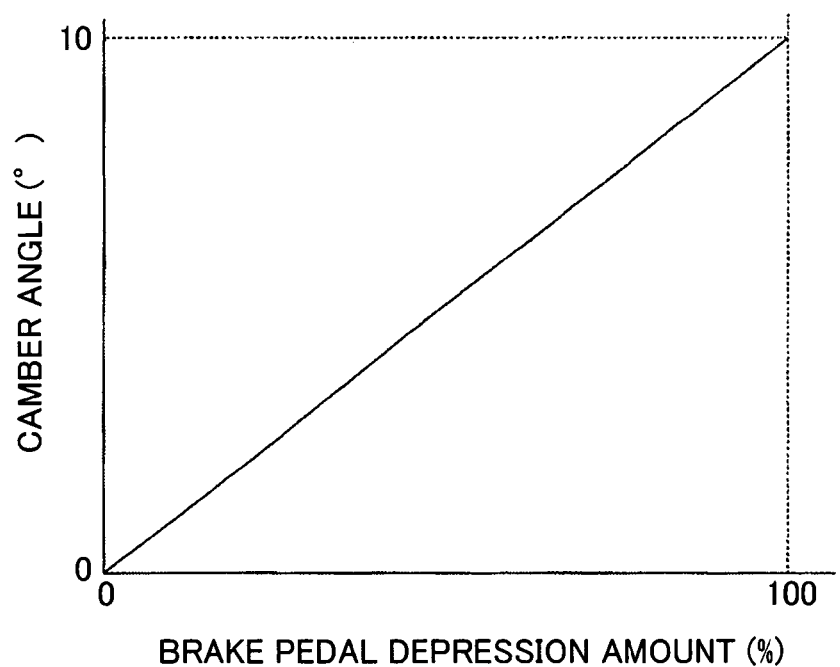

Note that the ROM 272 stores a flowchart (angle control processing) program shown in FIG. 20, and a steering angle table and a camber angle table shown in FIGS. 21A and 21B, respectively.

As will be described below, the steering angle table and camber angle table store relationships between the steering angle and camber angle to be applied to the wheel 2 and the depression amount of the brake pedal 252. The CPU 271 controls the steering angle and camber angle of the wheel 2 on the basis of the content of the steering angle table and camber angle table by operating the actuator device 304.

As described above, the wheel driving device 3 is a device for driving each wheel 2 (see FIG. 17) to rotate, and is mainly constituted by the four FL to RR motors 3FL to 3RR for applying a rotary driving force to the wheels 2, and a drive circuit (not shown) for drive-controlling the motors 3FL to 3RR on the basis of a command from the CPU 271.

As described above, the actuator device 304 is a driving device for adjusting the camber angle and steering angle of each wheel 2, and is mainly constituted by the four FL to RR actuators 304FL to 304RR for applying an angle adjustment driving force to each wheel 2 (wheel driving device 3), and a drive circuit (not shown) for drive-controlling the actuators 304FL to 304RR on the basis of a command from the CPU 271.

Note that the FL to RR actuators 304FL to 304RR are mainly constituted by the three hydraulic cylinders 4a to 4c, a hydraulic pump 4d (see FIG. 17) for supplying oil (oil pressure) to the respective hydraulic cylinders 4a to 4c, an electromagnetic valve (not shown) for switching the supply direction of the oil that is supplied to the hydraulic cylinders 4a to 4c from the hydraulic pump, and an expansion/contraction sensor (not shown) for detecting the expansion/contraction amount of each hydraulic cylinder 4a to 4c (rod portion).

When the drive circuit of the actuator device 304 drive-controls the hydraulic pump on the basis of a command from the CPU 271, the hydraulic cylinders 4a to 4c are driven to expand or contract by oil (oil pressure) supplied from the hydraulic pump. Further, when the electromagnetic valve is switched ON/OFF, the drive direction (expansion or contraction) of the hydraulic cylinders 4a to 4c is switched.

The drive circuit of the actuator device 304 monitors the expansion/contraction amount of each hydraulic cylinder 4a to 4c using an expansion/contraction sensor, and when the hydraulic cylinders 4a to 4c reach a target value (expansion/contraction amount) instructed by the CPU 271, expansion/contraction driving thereof is stopped. Note that the detection results of the expansion/contraction sensor are output to the CPU 271 from the drive circuit, and the CPU 271 is capable of learning the current camber angle and steering angle of each wheel 2 on the basis of the detection results.

For example, when the driver operates the steering wheel 51, a steering angle corresponding to the operation state of the steering wheel 51 is applied to the wheels 2 (in this embodiment, the front wheels 2FL, 2FR), and as a result, the vehicle 4001 turns. Further, when the driver operates the brake pedal 252, a camber angle and a steering angle corresponding to the operation state of the brake pedal 252 is applied to the wheels 2 (in this embodiment, the front wheels 2FL, 2FR and rear wheels 2RL, 2RR) regardless of whether or nor the steering wheel has been operated by the driver, and as a result, the vehicle 4001 brakes.

Hence, the wheels 2 are driven (a steering angle is applied thereto) by the actuator device 304 in two patterns, namely a pattern in which the wheels 2 are driven following an operation of the steering wheel 51 for the purpose of turning the vehicle 4001, and a pattern in which the wheels 2 are driven regardless of whether or not the steering wheel 51 has been operated, for the purpose of causing the vehicle 4001 to brake. In this embodiment, the former will be referred to as turning control, and the latter as braking control. Note that braking control will be described in detail below (see FIG. 20).

A vehicle speed sensor device 232 is a device for detecting the ground speed (absolute value and advancement direction) of the vehicle 4001 relative to the road surface, and outputting the detection result to the CPU 271. The vehicle speed sensor device 232 is mainly constituted by front-back and left-right direction acceleration sensors 232a, 232b, and a control circuit (not shown) for processing the detection results of the acceleration sensors 232a, 232b and outputting the processed results to the CPU 271.

The front-rear direction acceleration sensor 232a is a sensor for detecting the acceleration of the vehicle 4001 (the vehicle body frame BF) in the front-rear direction (the up-down direction in FIG. 17), while the left-right direction acceleration sensor 232b is a sensor for detecting the acceleration of the vehicle 4001 (the vehicle body frame BF) in the left-right direction (the left-right direction in FIG. 17). Note that in this embodiment, the acceleration sensors 232a, 232b are constituted by piezoelectric sensors using a piezoelectric element.

The CPU 271 time-integrates the detection results (acceleration values) of the acceleration sensors 232a, 232b, input from the control circuit of the vehicle speed sensor device 232, to calculate the speed in two directions (the front-rear and left-right directions), and by synthesizing these two direction components, the CPU 271 can obtain the ground speed (absolute value and advancement direction) of the vehicle 4001.

A ground contact load sensor device 234 is a device for detecting a ground contact load generated between each wheel 2 and the road surface, and outputting the detection result to the CPU 271. The ground contact load sensor device 234 is constituted mainly by FL to RR ground contact load sensors 234FL to 234RR for detecting the respective ground contact loads of the wheels 2, and a control circuit (not shown) for processing the detection results of the ground contact load sensors 234FL to 234RR and outputting the processed results to the CPU 271.

Note that in this embodiment, the ground contact load sensors 234FL to 234RR are constituted by piezo-resistance type three-axis load sensors. Each load sensor 234FL to 234RR is disposed in the actuator device 304 holding each wheel 2, and the ground contact load is detected in the front-rear direction (the direction of the virtual axis Xf-Xb), the left-right direction (the direction of the virtual axis Yl-Yr), and the up-down direction (the direction of the virtual axis Zu-Zd) of the vehicle 4001 (see FIG. 18).

The CPU 271 is capable of obtaining not only the ground contact load of each wheel 2, but also a frictional coefficient μ of the road surface on the ground contact surface of each wheel 2 from the detection results (ground contact load) of the load sensors 234FL to 234RR, input from the control circuit of the ground contact load sensor device 234.

For example, focusing on the front wheel 2FL, when the front-rear direction, left-right direction, and up-down direction loads of the vehicle 4001, detected by the FL load sensor 234FL, are Fx, Fy, and Fz, respectively, the frictional coefficient μ of the part of the road surface corresponding to the ground contact surface of the front wheel 2FL is obtained by calculating the advancement direction frictional coefficient μx of the vehicle 4001 from Fx/Fz, and calculating the left-right direction frictional coefficient μy of the vehicle 4001 from Fy/Fz.

A brake pedal operation state detection sensor device 235 is a device for detecting the operation state of the brake pedal 252, and outputting the detection result to the CPU 271. The brake pedal operation state detection sensor device 235 is mainly constituted by an angle sensor (not shown) for detecting the depression amount of the brake pedal 252, and a control circuit (not shown) for processing the detection result of the angle sensor and outputting the processed result to the CPU 271.

Note that in this embodiment, the angle sensor is constituted by a contact type potentiometer employing electric resistance. The CPU 271 can learn the depression amount of the brake pedal 252 from the detection result input from the control circuit of the brake pedal operation state detection sensor device 235, and can learn the depression speed (operation speed) of the brake pedal 252 by time-integrating the detection results.

An operation state detection sensor device (not shown) for detecting the operation state (the rotation angle, depression amount, operation speed, and so on) of the steering wheel 51 and accelerator pedal 53 (see FIG. 17), for example, may be used as another input/output device 36 shown in FIG. 19.

For example, when the steering wheel 51 or accelerator pedal 53 is operated, the operation quantity of state thereof is detected by the operation state detection sensor and output to the CPU 271. By drive-controlling the actuator device 304, the CPU 271 applies a steering angle corresponding to the operation amount of the steering wheel 51 to each wheel 2, thereby causing the vehicle 4001 to turn, and by drive-controlling the wheel driving device 3, the CPU 271 applies a rotary driving force corresponding to the operation amount of the accelerator pedal 53 to each wheel 2, thereby causing the vehicle 4001 to accelerate or decelerate.

Figure 22:
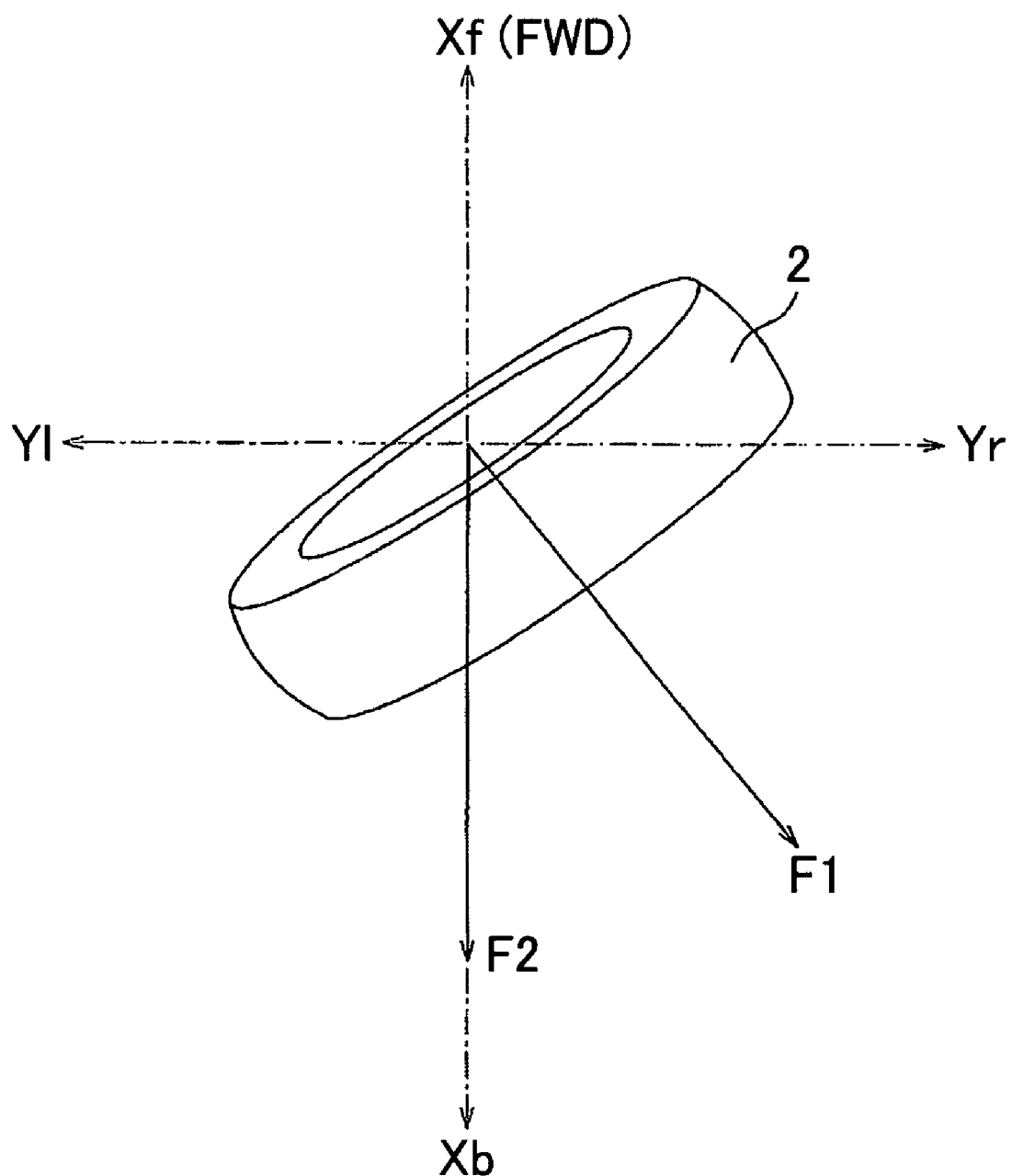
FIG. 22 is a top view of the wheel.

Next, the braking control of the present invention will be described with reference to FIGS. 20 to 22. FIG. 20 is a flowchart illustrating angle control processing. This processing is executed repeatedly (at 0.2 ms intervals, for example) by the CPU 271 while the control device 4100 is supplied with power. When the brake pedal 252 is depressed, a camber angle and a steering angle are applied to the wheels 2, and thus braking control of the vehicle 4001 is performed.

With respect to angle control processing, first the CPU 271 detects the operation state of the brake pedal 252 (S3001) to determine whether or not the brake pedal 252 has been operated (depressed) by the driver, or in other words whether or not a braking operation relating to the vehicle 4001 has been instructed by the driver (S3002). When it is determined as a result that the brake pedal 252 has not been operated (S3002; No), this indicates that braking of the vehicle 4001 is not required, and the angle control processing is terminated.

On the other hand, when it is determined in the processing of S3002 that the brake pedal 252 has been operated (S3002; Yes), this means that the driver has issued an instruction to perform a braking operation on the vehicle 4001, and the processing of S3003 onward is executed to perform braking control.

In the processing of S3003 onward, first the frictional coefficient μ of the part of the road surface along which each wheel 2 travels corresponding to the ground contact surface of each wheel 2 is detected (S3003), and then the ground contact load on the ground contact surface of each wheel 2 is detected (S3004). As described above, the CPU 271 detects the frictional coefficient μ and the ground contact load from the detection results of the load sensors 234FL to 234RR, input from the control circuit of the ground contact load sensor device 234 (see FIG. 19).

Next, in the processing of S3005, a camber angle and a steering angle to be applied to each wheel 2 are determined on the basis of the operation state of the brake pedal 252 (S3005). As described above, the camber angle and steering angle are determined on the basis of the content of the steering angle table and camber angle table stored in the ROM 272. The content of the steering angle table and camber angle table will now be described with reference to FIG. 21.

FIGS. 21A and 21B are pattern diagrams illustrating the content of the steering angle table and camber angle table. The steering angle table stores the relationship between the depression amount of the brake pedal 252 and the steering angle to be applied to the wheel 2, while the camber angle table stores the relationship between the depression amount of the brake pedal 252 and the camber angle to be applied to the wheel 2.

Note that the steering angle and camber angle to be applied to the wheel 2 are defined here as the steering angle and camber angle to be applied to the wheel in accordance with an operation of the brake pedal 252. Accordingly, the steering angle and camber angle to be applied to the wheel 2 may naturally refer to a steering angle and camber angle attributable to other factors (for example, an operation of the steering wheel 51 or the like).

As shown in FIGS. 21A and 21B, these tables define the primary relationship of the steering angle and camber angle to be applied to the wheel 2 to the depression amount of the brake pedal 252. More specifically, the steering angle and camber angle to be applied to the wheel 2 are set at 0° when the brake pedal 252 has not been operated (depression amount 0%), and increase linearly together with the depression amount of the brake pedal 252. Note that in this embodiment, the maximum values of the steering angle and camber angle are set at 90° and 10°, respectively.

Returning to the processing of S3005 in FIG. 20, the CPU 271 detects the depression amount of the brake pedal 252 on the basis of the detection result input from the control circuit of the brake pedal operation state detection sensor device 235 (see FIG. 19), reads a steering angle and a camber angle corresponding to the detection result (depression amount) from the steering angle table and camber angle table described above, and determines the steering angle and camber angle to be applied to each wheel 2 (S3005).

Here, the steering angle and camber angle determined in the processing of S3005 are set respectively at the same magnitude in each wheel 2 (in this embodiment, four wheels, namely the front wheels 2FL, 2FR and rear wheels 2RL, 2RR). For example, if the depression amount of the brake pedal 252 is 50%, the steering angle is set at 45° in all of the wheels 2, and the camber angle is set at 5° in all of the wheels 2 (see S3005 and FIG. 21).

Therefore, when the road surface condition is different for the left and right wheels 2 during braking control, for example, the balance of the braking force generated in the left and right wheels 2 becomes uneven, and as a result, the behavior of the vehicle 4001 becomes unstable.

More specifically, the braking force (frictional force) that can be generated on the ground contact surface of the wheel 2 is dependent on a value (coefficient) obtained by multiplying the ground contact load of the ground contact surface by the frictional coefficient μ of the road surface. When this coefficient is identical in the left and right wheels 2, the braking force that can be generated on the ground contact surface of the wheels 2 is also identical, but when the coefficient is different in the left and right wheels 2, a difference arises in the braking force that can be generated on the ground contact surface of the left and right wheels 2.

Therefore, if the coefficient takes a different value in the left and right wheels 2 and the camber angle and steering angle are set identically for the left and right wheels 2 in the manner described above, a difference arises in the braking force generated on the ground contact surface of the left and right wheels 2. As a result, a rotational yawing moment is generated in the vehicle 4001 on the side with the larger braking force, causing the behavior of the vehicle 4001 during braking to become unstable.

Hence, in the processing of S3006, the value of the aforementioned coefficient is calculated for each wheel 2 from the detection results (the frictional coefficient μ of the road surface and the ground contact load) detected in the processing of S3003 and S3004 to even out the balance of the braking force generated in the left and right wheels 2 and stabilize the behavior of the vehicle 4001 during braking, and on the basis of these coefficients, the steering angle and camber angle to be applied to each wheel 2 are corrected (S3006).

More specifically, the coefficients relating to the left and right wheels 2 are compared, and when the coefficient of one of the left and right wheels 2 is smaller than the coefficient of the other wheel 2, correction is performed to make the camber angle and steering angle of the wheel 2 having the smaller coefficient greater than the camber angle and steering angle of the wheel 2 having the larger coefficient.

For example, when it is found, as a result of comparing the coefficients relating to the left and right wheels 2, that the value of a coefficient KR of a first wheel 2 is 10% larger than the value of a coefficient KL of a second wheel 2 (KL:KR=1:1.1), the braking force that can be generated on the ground contact surface of the first wheel 2 is 1.1 times greater than the braking force that can be generated on the ground contact surface of the second wheel 2.

Hence, in this embodiment, the steering angle and camber angle to be applied to the second (coefficient KL) wheel 2 are corrected to be 1.1 times greater than the steering angle and camber angle to be applied to the first (coefficient KR) wheel 2, whereby identical braking forces are generated on the ground contact surfaces of both the left and right (first and second) wheels 2.

In other words, when the depression amount of the brake pedal 252 is 50%, the steering angle and camber angle are set at 45° and 5°, respectively, for both the left and right wheels 2 in the processing of S3005. Then, in the processing of S3006, the steering angle and camber angle to be applied to the first (coefficient KR) wheel 2 are left uncorrected at the values determined in the processing of S3005, i.e. 45° and 5°, whereas the steering angle and camber angle to be applied to the second (coefficient KL) wheel 2 are corrected to be 1.1 times greater than the values determined in the processing of S3005, i.e. to 49.5° and 5.5°.

In so doing, the braking force generated on the ground contact surface of the second (coefficient KL) wheel 2 is increased so that a difference can be prevented from occurring between the braking force generated on the ground contact surface of the second (coefficient KL) wheel 2 and the braking force generated on the ground contact surface of the first (coefficient KR) wheel 2. As a result, the balance of the braking force generated in the left and right wheels 2 is evened out while increasing the overall braking force of the vehicle 4001 gradually, and the behavior of the vehicle 4001 during braking can be stabilized.

As another example, when the value of the coefficient KR of the first wheel 2 is 10% larger than the value of the coefficient KL of the second wheel 2 (KL:KR=1:1.1), similarly to the case described above, and the current depression amount of the brake pedal 252 has already reached 100%, the steering angle and camber angle are already at their maximum values (90° and 10°) (see S3005 and FIG. 21), and therefore correction to make the steering angle and camber angle to be applied to the second (coefficient KL) wheel 2 to be 1.1 times greater than that of the first (coefficient KR) wheel 2 cannot be performed.

In this case, in the processing of S3006, the steering angle and camber angle to be applied to the first (coefficient KR) wheel 2 are corrected to 0.9 times the values thereof determined in the processing of S3005, i.e. to 81° and 9°, while the steering angle and camber angle to be applied to the second (coefficient KL) wheel 2 remain uncorrected at the values thereof determined in the processing of S3005, i.e. 45° and 5°.

In so doing, the braking force generated on the ground contact surface of the first (coefficient KR) wheel 2 is decreased so that a difference can be prevented from occurring between the braking force generated on the ground contact surface of the second (coefficient KL) wheel 2 and the braking force generated on the ground contact surface of the first (coefficient KR) wheel 2. As a result, the balance of the braking force generated in the left and right wheels 2 is evened out while increasing the overall braking force of the vehicle 4001 gradually, and the behavior of the vehicle 4001 during braking can be stabilized.

Note that in this embodiment, as described above, the steering angle and camber angle are corrected in proportion with the ratio between the coefficients KL, KR. This is based on the knowledge that the braking force that can be generated on the ground contact surface of the wheels 2 is commensurate with the magnitude of the steering angle and camber angle. However, the present invention is not limited to this correction method, and another method may of course be employed.

Following correction of the steering angle and camber angle to be applied to each wheel 2 in the processing of S3006, the actuator device 304 is operated to apply the corrected steering angles and camber angles to the wheels 2 (S3007), whereupon the angle control processing ends.

Hence, when the brake pedal 252 is depressed, the absolute values of the steering angle and camber angle to be applied to the wheel 2 are increased so that lateral force corresponding to the steering angle and camber thrust corresponding to the camber angle can be generated on the ground contact surface of the wheel 2. In so doing, as shown in FIG. 22, a vehicle advancement direction component (shown by an arrow F2) of the resulting force (shown by an arrow F1) of the lateral force and camber thrust can be used as the braking force of the vehicle 4001, and therefore the braking force of the vehicle 4001 can be improved.

Note that in the processing of S3007, the actuator device 304 is preferably operated such that the left and right wheels 2 become either toe-in or toe-out and exhibit either negative camber or positive camber. By making the left and right wheels 2 exhibit negative camber or positive camber, camber thrust can be generated in the left and right wheels 2 in opposing or repulsing directions, and therefore the behavior of the vehicle 4001 during braking can be stabilized.

Further, by making the left and right wheels 2 either toe-in or toe-out, the behavior of the vehicle 4001 during braking can be stabilized, and moreover, the camber thrust generated in the left and right wheels 2 can be provided with a component in the advancement direction of the vehicle 4001. In so doing, the resulting force (see the arrow F2, FIG. 22) of the vehicle advancement direction component of the camber thrust and the vehicle advancement direction component of the lateral force can be increased, enabling an improvement in the braking force of the vehicle 4001.

In the flowchart (angle control processing) shown in FIG. 20, the processing of S3001 and S3002 corresponds to a braking instruction determining unit in claim 10, the processing of S3007 corresponds to an actuator operating unit in claim 10, the processing of S3003 corresponds to a frictional coefficient detecting unit in claim 12, the processing of S3004 corresponds to a ground contact load detecting unit in claim 12, and the processing of S3006 corresponds to a coefficient calculating unit and an angle correcting unit in claim 12.

Figure 23:
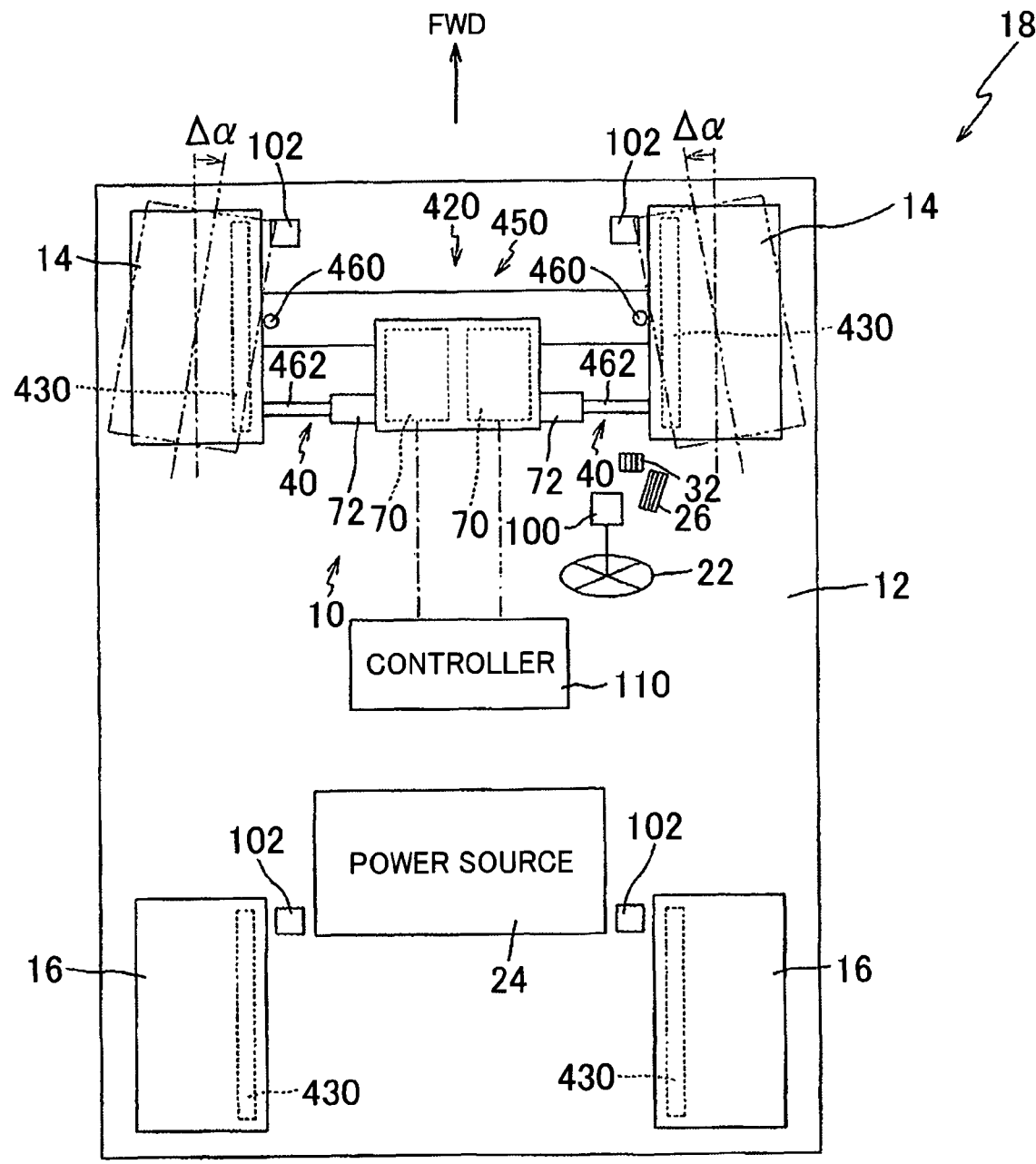
FIG. 23 is a plan view showing a wheel control device according to a fifth embodiment of the present invention, together with a vehicle in which the wheel control device is installed.

Next, a fifth embodiment will be described with reference to the attached drawings. FIG. 23 is a plan view of a wheel driving device 10 according to the fifth embodiment of the present invention. The wheel driving device 10 is installed for use in a vehicle 18 formed by attaching a plurality of wheels 14, 14, 16, 16 to a vehicle body 12. As shown in FIG. 23, an example of this vehicle 18 has left and right front wheels 14, 14, and left and right rear wheels 16, 16.

In the vehicle 18, the left and right front wheels 14, 14 are steered by a steering device 420 in accordance with a steering operation of a steering wheel 22 performed by a driver. In other words, in this embodiment the left and right front wheels 14, 14 serve as an example of "left and right steered wheels" in claim 14. The steering device 420 will be described in detail below.

Further, in the vehicle 18, the left and right rear wheels 16, 16 are driven wheels driven by a power source 24, and are non-steered wheels that are not steered. In other words, in this embodiment the left and right rear wheels 16, 16 serve as an example of "left and right non-steered wheels" in claim 14.

The power source 24 may be formed using an engine, a motor, a combination of an engine and a motor, and so on as a main body, for example. Driving torque transmitted from the power source 24 to the rear wheels 16, 16 is controlled in accordance with a depression operation of an accelerator pedal 26, which serves as an accelerator operation member, by the driver.

In the vehicle 18, the left and right rear wheels 16, 16 are driven wheels, whereas the left and right front wheels 14, 14 are non-driven wheels (idler wheels). However, the present invention is also applicable to an embodiment in which the left and right front wheels 14, 14 are also driven wheels.

Furthermore, in the vehicle 18, braking is performed on the wheels 14, 16 using individual brakes 430. The operating torque of each brake 430 is controlled in accordance with a depression operation of a brake pedal 32, which serves as a brake operation member, by the driver.

As shown in FIG. 23, the steering device 420 has two steering devices 40, 40 attached to the vehicle body 12 so as to be capable of steering the left and right front wheels 14, 14 independently of each other. The steering device 420 also has an electric driving device 450 capable of controlling steering angles δ of the front wheels 14, 14 independently of each other. In other words, in this embodiment the electric driving device 450 serves as an example of an "actuator device" in claim 14.

The steering devices 40, 40 support the respective front wheels 14, 14 swingably about king pins 460, 460 extending in a substantially up-down direction. Each steering device 40, 40 has a tie rod 462, 462 for the respective front wheels 14, 14, which extends in a lateral direction from a tip end portion of a knuckle arm (not shown) of the respective front wheels 14, 14.

The electric driving device 450 displaces the tie rod 462, 462 of each front wheel 14, 14 linearly. For this purpose, the electric driving device 450 has, for each front wheel 14, 14, an electric actuator 70, 70 serving as a drive source, and a motion transmission mechanism 72, 72 for transmitting mechanical motion generated in the electric actuator 70, 70 to the corresponding tie rod 462, 462.

One of the electric actuators 70, 70 controls the steering angle δ and slip angle α of the left front wheel (FL) 14, and the other controls the steering angle δ and slip angle α of the right front wheel (FR) 14. In an example of the electric driving device 450, an electric motor is used as the electric actuator 70, and a screw mechanism that converts the rotary motion of the electric motor into linear motion of the tie rod 462 is used as the motion transmission mechanism 72.

Briefly, the wheel control device 10 is installed in the vehicle 18 to perform slip angle control for controlling the slip angle α of the left and right front wheels 14, 14 when the power source 24 is activated in accordance with an operation performed by the driver to instruct the power source 24 to start the vehicle 18 and there is a possibility that the spin tendency of either one of the left and right front wheels 14, 14 may deviate from an allowable range.

The wheel control device 10 is also designed to perform basic control for controlling steering of the front wheels 14, 14 to control the advancement direction of the vehicle 18 in accordance with a steering operation performed by the driver.

In the aforementioned slip angle control, the respective slip angles α of the left and right front wheels 14, 14 are varied by an equal amount Δα at a time such that the toe-in tendency of the left and right front wheels 14, 14 increases. The variation Δα in the slip angle α of each front wheel 14, 14 is equal to a variation Δδ in the steering angle δ of each front wheel 14, 14.

During slip angle control, the variation Δα is also varied in accordance with a frictional coefficient (to be referred to as a "road surface μ" hereafter) of the part of the road surface along which the vehicle 18 is traveling that is contacted by the corresponding wheel 14, 14.

Also during slip angle control, the variation Δα is varied on the basis of a required acceleration Greq of the vehicle. In this embodiment, the term "required acceleration Greq" indicates an acceleration instructed by the driver, and therefore the required acceleration Greq is detected in accordance with the depression amount of the accelerator pedal 26.

Figure 24:
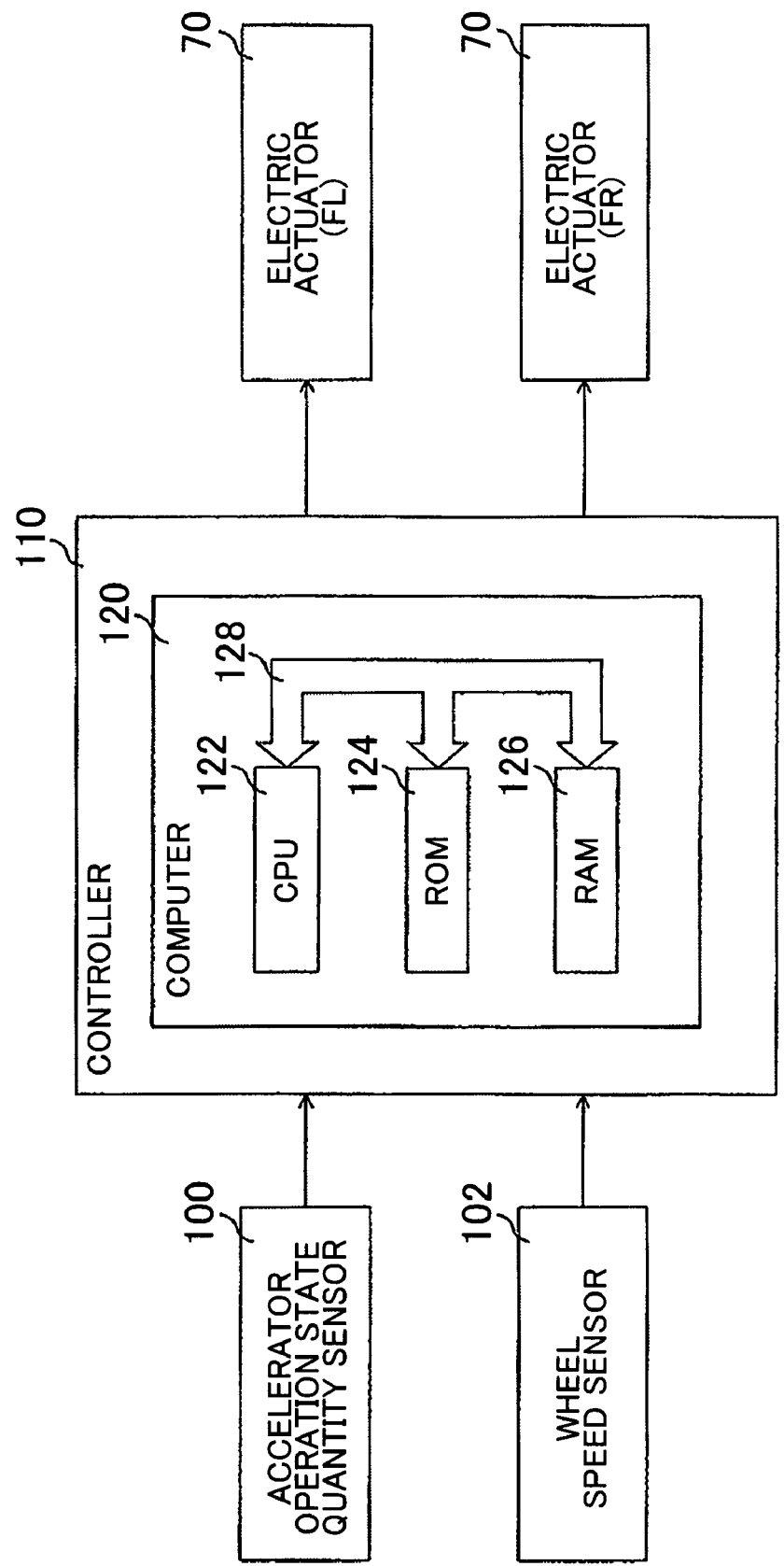
FIG. 24 is a block diagram illustrating conceptually the electric configuration of the wheel control device shown in FIG. 23.

FIG. 24 is a block diagram showing conceptually the electric configuration of the wheel control device 10. The wheel control device 10 has a plurality of types of sensor, including an accelerator operation state quantity sensor 100 and a wheel speed sensor 102.

The accelerator operation state quantity sensor 100 is constituted to detect depression of the accelerator pedal 26 by the driver, the depression force, and the depression stroke or depression speed, for example, as the accelerator operation quantity of state. More specifically, the accelerator operation state quantity sensor 100 is constituted to include an accelerator switch, a force sensor, a pedal angle sensor, a pedal stroke sensor, and so on, for example.

The wheel speed sensor 102 is provided for each wheel 14, 16, and detects the angular velocity of each wheel 14, 16 as the wheel speed. An example of the wheel speed sensor 102 is an electromagnetic pickup sensor for electromagnetically detecting the time intervals at which a large number of teeth, formed in series in the circumferential direction of a rotary body that rotates together with the wheels 14, 16, pass thereby.

The wheel speed sensor 102 of each wheel 14, 16 is used to estimate the vehicle body speed, i.e. the traveling speed of the vehicle body 12, in cooperation with the wheel speed sensors 102 of the other wheels 14, 16, to detect the rotation angle acceleration of each wheel 14, 16 as the wheel acceleration of each wheel 14, 16, and to detect the frictional coefficient μ (to be referred to simply as "road surface μ" hereafter) between each wheel 14, 16 and the road surface in relation to each wheel 14, 16. The road surface μ corresponding to each wheel 14, 16 may be assumed to increase steadily as the absolute value of wheel acceleration generated in each wheel 14, 16 during driving of each wheel 14, 16 increases, for example.

As shown in FIG. 24, the wheel control device 10 is also provided with a controller 110. The controller 110 is electrically connected to the accelerator operation state quantity sensor 100 and wheel speed sensor 102. The controller 110 is also electrically connected to the electric actuator 70 for the left front wheel (FL) 14 and the electric actuator 70 for the right front wheel (FR) 14.

The controller 110 is constituted mainly by a computer 120. As is well known, in the computer 120, a CPU 122, ROM 124, and RAM 126 are connected to each other by a bus 128.

Various programs are stored in the ROM 124. These programs include a basic control program that is executed by the CPU 122 to determine a basic value δ base of a target steering angle of each front wheel 14, 14 in accordance with a steering operation of the steering wheel 22. Hereafter, control of the front wheels 14, 14 in accordance with a steering operation performed by the driver will be referred to as basic control.

The program also include a slip angle control program for controlling the slip angles α of the respective front wheels 14, 14 independently of each other via the respective electric actuators 70 during driving of the vehicle 18. Basic control and slip angle control are executed by having the CPU 122 execute these programs using the RAM 126.

Figure 25:
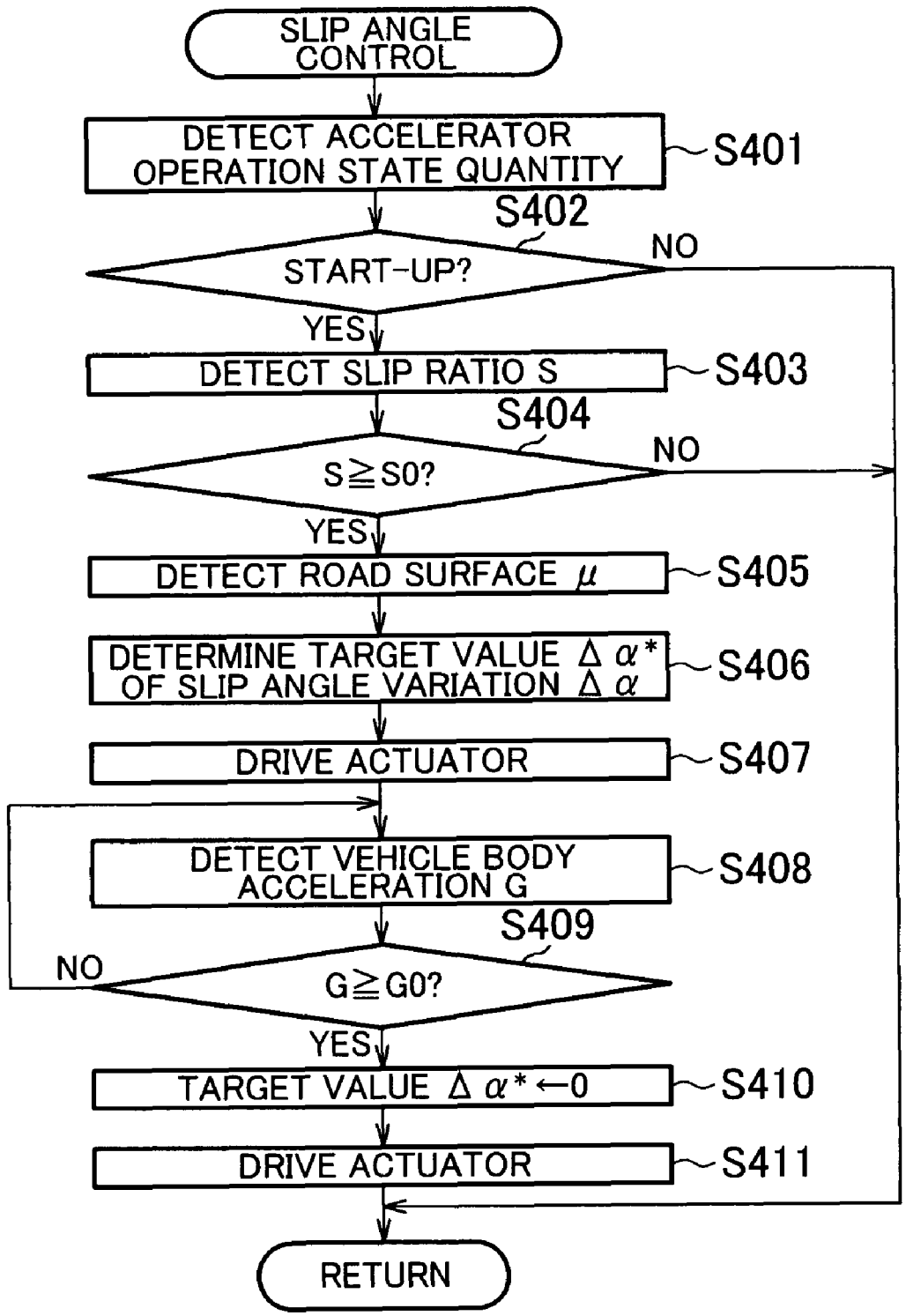
FIG. 25 is a flowchart illustrating conceptually a slip angle control program executed by a computer shown in FIG. 24.
Figure 26:
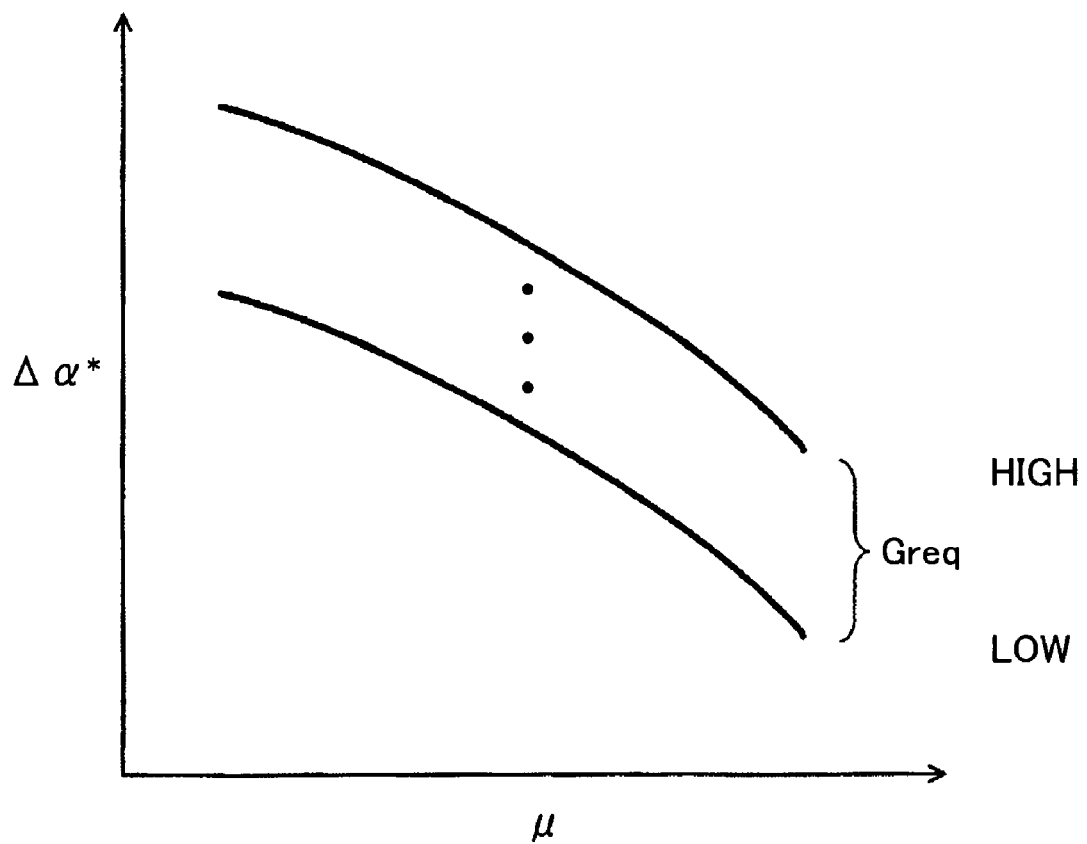
FIG. 26 is a graph illustrating a condition in which the target value $\alpha^*$ is determined through execution of the slip angle control program shown in FIG. 25.

FIG. 25 is a flowchart illustrating the slip angle control program conceptually. FIG. 26 is a graph showing a relationship between the road surface μ, the required acceleration Greq, and a target value Δα* of the variation Δα.

The slip angle control program shown in FIG. 25 is executed repeatedly for each front wheel 14, 14 when power is supplied to the computer 120. During each execution, first, in a step S401 (to be referred to simply as "S401" hereafter; this applies likewise to the other steps), the accelerator operation quantity of state is detected on the basis of a signal output by the accelerator operation state quantity sensor 100.

More specifically, for example, an acceleration operation performed by the driver and the strength of the desire of the driver to accelerate, or in other words the required acceleration Greq of the driver, are detected. The required acceleration Greq of the driver may be estimated to be steadily greater as the operation amount of the accelerator pedal 26 increases, for example. Accordingly, the required acceleration Greq may also be expressed as the accelerator operation amount. An example of the accelerator operation amount is the depression angle of the accelerator pedal 26.

Next, in S402, a determination as to whether or not the vehicle 18 is in a start-up state, in which the driver attempts to start the vehicle 18, is made by referring to the detected accelerator operation quantity of state alone or in combination with another physical quantity (the aforementioned vehicle body speed and wheel acceleration). When the vehicle 18 is not in the start-up state, the determination of S402 becomes negative, and the current execution of the slip angle control program ends immediately.

On the other hand, when the vehicle 18 is in the start-up state, the determination of S402 becomes affirmative, and in S403, a slip ratio s of the current execution subject wheel is detected using the wheel speed sensor 102. The slip ratio s is obtained by dividing the difference between the wheel speed and the vehicle body speed by the vehicle body speed, for example.

Next, in S404, a determination is made as to whether or not the absolute value of the detected slip ratio s is equal to or greater than a reference value s0, or in other words whether or not the spin tendency of the current execution subject wheel has exceeded an allowable range. The reference value s0 is set at a smaller value than a limit value of the slip ratio s (for example, a peak value on a μ-s curve or an upper limit value in an appropriate range immediately before the peak value).

When it is determined that the absolute value of the slip ratio s is not equal to or greater than the reference value s0, the determination of S404 becomes negative, and the current execution of the slip angle control program ends immediately. On the other hand, when it is determined that the absolute value of the slip ratio s is equal to or greater than the reference value s0, the determination of S404 becomes affirmative, and the routine advances to S405.

In S405, the road surface μ of the part of the road surface on which the vehicle 18 is traveling that is contacted by the current execution subject wheel is detected in relation to the current execution subject wheel using the wheel speed sensor 102, as described above. Next, in S406, the target value Δα* of the variation Δα in the slip angle α is determined for the current execution subject wheel on the basis of the detected road surface μ and the detected required acceleration Greq.

More specifically, as shown conceptually by the graph in FIG. 26, the target value Δα* is determined to increase steadily as the required acceleration Greq increases and the road surface μ decreases. The relationship between the required acceleration Greq, the road surface μ, and the target value Δα* is stored in the ROM 124, and the computer 120 determines the target value Δα* in accordance with the stored relationship so as to correspond to both the detected required acceleration Greq and the road surface μ.

The sign of the target value Δα* is determined to express a rightward rotation direction when the left front wheel 14 is the current execution subject wheel, and to express a leftward rotation direction when the right front wheel 14 is the current execution subject wheel.

Hence, when the target value Δα*, the absolute value and sign of which are determined for each front wheel 14, 14 in the manner described above, is realized as described below, the respective toe-in tendencies of the left and right front wheels 14, 14 are increased by an equal amount at a time in the left and right front wheels 14, 14 in accordance with the road surface μ and the required acceleration Greq.

Next, in S407, the electric actuator 70 corresponding to the current execution subject wheel is driven such that the determined target value Δα* is reached. By executing S407, the actual respective slip angles α of the left and right front wheels 14, 14 are varied by an equal amount at a time such that the toe-in tendency of each front wheel 14, 14 increases.

In addition, feedback control is preferably performed in S407 on the basis of a signal from a sensor for monitoring the actual operation state of the electric actuator 70 in order to drive the electric actuator 70 such that the actual variation $\Delta\alpha$ in the slip angle $\alpha$ matches the target value $\Delta\alpha^*$ with a high degree of precision, for example. Examples of the sensor include a sensor for detecting the operation amount of the electric actuator 70 (for example, the absolute rotation angle or relative rotation angle of a rotor provided in the aforementioned electric motor), or a sensor for detecting the absolute or relative linear displacement position of the corresponding tie rod 462.

The solid lines in FIG. 23 illustrate a normal advancement state of the left and right front wheels 14, 14 when slip angle control is not performed. The chain double-dashed lines in the drawing illustrate the advancement state of the left and right front wheels 14, 14 when slip angle control is performed such that the toe-in tendency of the front wheels 14, 14 is more emphasized than usual.

In S407, the two electric actuators 70, 70 corresponding respectively to the left and right front wheels 14, 14 are driven in synchronization such that the actual variations $\Delta\alpha$ in the respective slip angles $\alpha$ of the left and right front wheels 14, 14 vary substantially in synchronization with each other. Hence, according to this embodiment, the toe-in tendencies of the respective front wheels 14, 14 are less likely to be mismatched between the left and right front wheels 14, 14. Accordingly, through this slip angle control, a situation in which an imbalance occurs between the forces acting on the tires of the left and right front wheels 14, 14 is avoided favorably.

Next, in S408, a vehicle body acceleration G, or in other words the traveling acceleration of the vehicle body 12, is detected by differentiating the estimated vehicle body speed relative to time or using a front-rear acceleration sensor, not shown in the drawing. Then, in S409, a determination is made as to whether or not the detected vehicle body acceleration G is equal to or greater than a reference value G0 (a fixed value or a value that is equal to the required acceleration Greq). When the detected vehicle body acceleration G is not equal to or greater than the reference value G0, the determination of S409 becomes negative, and the routine returns to S408.

S408 and S409 are executed such that the current execution of slip angle control continues until the vehicle 18 begins to advance smoothly. When the detected vehicle body acceleration G reaches or exceeds the reference value G0 after S408 and S409 have been repeated the required number of times, the determination of S409 becomes affirmative, and thereafter, return processing is performed in S410 and S411.

More specifically, in S410, the target value $\Delta\alpha^*$ of the current execution subject wheel is set at 0, and then, in S411, the electric actuator 70 is driven to realize the set target value $\Delta\alpha^*$.

In this embodiment, the same electric actuator 70 performs basic control through execution of the basic control program and slip angle control through execution of the slip angle control program for each of the front wheels 14, 14.

Therefore, when slip angle control is required, the electric actuator 70 is driven to realize a value obtained by totaling a target steering angle for basic control and the target value $\Delta\alpha^*$ for slip control. In contrast, when slip angle control is not required, the electric actuator 70 is driven to realize only the target steering angle for basic control.

Hence, in the slip angle control program shown in FIG. 25, when the effect of slip angle control appears in the vehicle 18 such that slip angle control is no longer required, the target value $\Delta\alpha^*$ for slip control is returned to 0 rather than returning the electric actuator 70 to a neutral position.

The current execution of the slip angle control program is then terminated.

As is evident from the above description, in this embodiment the part of the controller 110 that executes the slip angle control program shown in FIG. 25 serves as an example of a "controller" in claim 14.

Furthermore, in this embodiment the part of the controller 110 that executes S405 through S407 in FIG. 25 serves as an example of a "first control portion" in claim 14, the part of the controller 110 that executes S401, S406, and S407 serves as an example of a "second control portion" in claim 15, and the part of the controller 110 that executes S401 through S404, S406, and S407 serves as an example of a "third control portion" in claim 16.

The present invention was described above on the basis of embodiments, but the present invention is not limited to or by these embodiments, and it is evident that the present invention can be modified favorably in various ways within a scope that does not depart from the spirit of the present invention.

For example, the numerical values cited in each of the embodiments described above are merely example, and needless to say, other numerical values may be employed.

Further, in the third embodiment, a case in which the slip angle $\theta$ of each wheel 2 is determined in proportion to the operation amount (depression amount) of the brake pedal 252 by the driver was described (see S2002 and S2003 in FIG. 15), but the present invention is not limited to this case, and needless to say, the slip angle $\theta$ of each wheel 2 may be determined on the basis of another quantity of state.

Examples of this other quantity of state include the operation speed of the brake pedal 252, the deceleration of the vehicle 3001, and the frictional coefficient $\mu$ of the road surface. For example, control may be performed to increase (decrease) the slip angle $\theta$ when the operation speed of the brake pedal 252 is high (low) in relation to a constant depression amount.

As another example, control may be performed to increase (decrease) the slip angle $\theta$ when the deceleration of the vehicle 3001 is small (large) in relation to a constant brake pedal depression amount or operation speed. As a further example, control may be performed to increase (decrease) the slip angle $\theta$ when the frictional coefficient $\mu$ of the road surface is small (large) in relation to a constant brake pedal operation amount or the like.

Note that these quantities of state may be used individually or in combination as reference values for determining the slip angle $\theta$. In so doing, the operation state of the driver can be reflected accurately in the braking force control, enabling an improvement in operational feeling, and the braking force of the vehicle 3001 can be improved, enabling a further reduction in braking distance.

Further, in the third embodiment, a control unit for varying the peripheral speed Vr (rotation speed) of the wheels 2 was described as a control unit for bringing the deformation Lc on the ground contact surface of each wheel 2 close to the deformation limit value Llim. However, instead of, or together with, this control unit, a control unit for bringing the deformation Lc on the ground contact surface of each wheel 2 close to the deformation limit value Llim by varying the slip angle $\theta$ of each wheel 2 may be employed.

Further, in the third embodiment a case in which the actuator device 4 is constituted by an electric motor and the transmission mechanism portion 23 is constituted by a screw mechanism was described, but the present invention is not limited to this case, and the actuator device 4 may be constituted by a hydraulic/pneumatic cylinder, for example. In so doing, the transmission mechanism portion 23 can be omitted, enabling structural simplification and reductions in weight and product cost.

Further, although not described in the third embodiment, when applying the slip angle θ to the wheels 2, the slip angle θ may be applied to only a part of the wheels 2 (for example, only the front wheels 2FL, 2FR or only the rear wheels 2RL, 2RR) or to all of the wheels 2. In other words, the respective slip angles θ of the wheels 2 do not have to be identical.

In this case, for example, the operating angle of the steering wheel 51 is detected, and when the detected operating angle is equal to or greater than a predetermined operating angle, control may be performed to apply the slip angle θ to only the wheels 2 on the outside or inside of the turning direction. Alternatively, the slip angle θ may be applied to a part of all of the wheels 2 only when the operating angle of the steering wheel 51 is equal to or smaller than a predetermined operating angle. Further, the slip angle θ may be applied to turn the wheels 2 toe-in or toe-out, or such that the steering angles of the left and right wheels 2 face the same direction.

Note that in this case, the slip angle θ is preferably applied to all of the wheels 2 and such that the left and right wheels 2 turn toe-in. Most preferably, the slip angle θ is applied to all of the wheels 2 such that the front wheels 2FL, 2FR and rear wheels 2RL, 2RR all turn toe-in. In so doing, the overall braking force can be increased, enabling a reduction in braking distance, and maneuvering stability during deceleration can be secured.

Furthermore, in the third embodiment a case in which the vehicle 3001 is not provided with a brake device (a drum brake or disk brake using frictional force, for example) was described, but needless to say, the vehicle 3001 may be further provided with this type of brake device.

Further, in the fourth embodiment, a case in which the absolute values of the steering angle and camber angle of each wheel 2 is determined in proportion to the operation amount (depression amount) of the brake pedal 252 by the driver was described (see FIG. 21), but the present invention is not limited thereto, and needless to say, the steering angle and camber angle of each wheel 2 may be determined on the basis of another quantity of state.

Examples of this other quantity of state include the operation speed of the brake pedal 252 and the deceleration of the vehicle 4001. For example, control may be performed to increase (decrease) the steering angle and camber angle when the operating speed of the brake pedal 252 is higher (lower) than a reference value in relation to a constant depression amount.

Further, control may be performed to increase (decrease) the steering angle and camber angle when the deceleration of the vehicle 4001 is higher (lower) than a reference value in relation to a constant depression amount or operation speed.

Note that these quantities of state may be used individually or in combination as reference values for determining the steering angle and camber angle. In so doing, the operation state of the driver can be reflected accurately in the braking force control, enabling an improvement in operational feeling, and the braking force of the vehicle 4001 can be improved, enabling a further reduction in braking distance.

Further, in the fourth embodiment a case in which the driving portion of the actuator device 304 is constituted by the hydraulic cylinders 4a to 4c was described, but the present invention is not limited thereto, and it goes without saying that the driving portion may be constituted by another mechanism. Examples of this other mechanism include a mechanism that converts the rotary motion of a hydraulic cylinder or electric motor into linear motion using a screw mechanism.

Further, although description thereof was omitted from the fourth embodiment, each wheel 2 is provided with a brake device (a drum brake or disk brake using frictional force, for example), and the brake device operates in conjunction with an operation of the brake pedal 252 such that braking is applied relatively to each wheel 2 relative to the wheel driving device 3. Alternatively, the wheel driving device 3 may be constituted by a regenerative brake that is provided together with or instead of the brake device.

In this case, the flowchart (angle control processing) shown in FIG. 20 is executed only when a predetermined condition is satisfied.

More specifically, when it is determined that the predetermined condition has been satisfied, the brake device (and regenerative brake) is operated in accordance with the operation of the brake pedal 252, and the braking control of the flowchart (angle control processing) in FIG. 20 is executed. On the other hand, when it is determined by a condition determination unit that the predetermined condition has not been satisfied, the brake device (and regenerative brake) is operated in accordance with the operation of the brake pedal 252, but execution of the braking control of the flowchart (angle control processing) in FIG. 20 is halted.

An example of the predetermined condition is a condition based on the operation state of the steering wheel 51. More specifically, a steering wheel operation state detection sensor device (for example, the other input/output device 36) for detecting the operating angle of the steering wheel 51, an angle storage unit (for example, the ROM 272) for storing a reference value (for example, 10°) of the operating angle of the steering wheel 51, and an angle determining unit for determining whether or not the operating angle of the steering wheel 51 detected by the steering wheel operation state detection sensor device is smaller than the reference value stored in the angle storage unit are provided, and when it is determined by the angle determining unit that the operating angle is smaller than the reference value, the predetermined condition is assumed to be satisfied.

Hence, the braking control of the flowchart in FIG. 20 is executed only when the operating angle of the steering wheel 51 is smaller than the reference value, or in other words only when the vehicle 4001 is traveling straight forward (or in a state close to straight forward), and therefore a situation in which excessive braking force is applied to the vehicle 4001 when turning such that the behavior of the vehicle 4001 becomes unstable can be prevented.

Another example of the predetermined condition is a condition based on the operation state of the brake pedal 252. More specifically, a state storage unit (for example, the ROM 272) for storing a reference operation state (for example, the operation speed, operation amount, and operating time) of the brake pedal 252 is provided, and when the operation state of the brake pedal 252 detected by the brake pedal operation state detection sensor device 36 satisfied the reference operation state stored in the operation state storage unit, the braking instruction determining unit (S3001, S3002 in FIG. 20) determines that a braking instruction has been issued.

Hence, when the operation of the brake pedal 252 satisfies the reference operation state, the braking instruction determining unit determines that a braking instruction has been issued. Therefore, during normal operations (i.e. when an operation satisfying the reference operation state has not been performed), only the brake device (and regenerative brake) are operated, and as a result, excessive braking force and wear on the wheels 2, leading to a reduction in the life of the wheels 2, can be suppressed. During emergencies (i.e. when an operation satisfying the reference operation state has been performed), on the other hand, an operation of the brake device (and regenerative brake) is combined with braking control, and as a result, the required braking force can be exhibited reliably during emergencies.

Note that a case in which the operation state of the brake pedal 252 satisfies the reference operation state corresponds to a case in which the brake pedal 252 is operated (depressed) at a higher speed than the operation speed of the reference operation state when the reference operation state refers to the operation speed of the brake pedal 252, for example.

Further, when the reference operation state refers to the operation amount (operating angle) of the brake pedal 252, for example, the reference operation state is satisfied when the brake pedal 252 has been operated by a larger operation amount (operating angle) than the operation amount of the reference operation state. Further, when the reference operation state refers to the operation time of the brake pedal 252, for example, the reference operation state is satisfied when the brake pedal 252 has been operated continuously for a greater amount of time than the operation time of the reference operation state. Alternatively, these cases may be combined.

Another example of the predetermined condition is a condition based on the traveling state of the vehicle 4001. More specifically, a collision sensor device (for example, an infrared sensor device or the like), and a collision determining unit for determining whether or not a collision between the vehicle 4001 and another object is unavoidable on the basis of the detection result of the collision sensor device are provided, and when it is determined by the collision determining unit that a collision is unavoidable, the braking instruction determining unit (S3001, S3002 in FIG. 20) determines that a braking instruction has been issued even when the brake pedal 252 has not been operated. In so doing, emergency braking of the vehicle 4001 can be performed more efficiently.

What is claimed is:

1. A wheel control device for controlling a wheel in a vehicle having said wheel, comprising:
    an actuator that operates to vary a slip angle of said wheel; and
    a controller for controlling said actuator to increase a braking force of said wheel by increasing the absolute value of said slip angle of said wheel such that a lateral force is generated in said wheel relative to a ground contact surface of said wheel,
    wherein said controller comprises a braking control portion for controlling said actuator to apply braking to said vehicle, and
    when braking of said vehicle is required, said braking control portion increases the absolute value of said slip angle by a variable amount based on at least one of a frictional coefficient of a part of a road surface along which said vehicle is traveling that is contacted by said wheel, and a ground contact load of said wheel.

2. The wheel control device according to claim 1, wherein said vehicle further comprises a power source for driving said wheel, and
    said controller comprises a driving control portion for controlling said actuator when said vehicle needs to be driven by said power source to reduce a driving torque of said wheel, generated by said drive source, using said braking force of said wheel.

3. The wheel control device according to claim 1, wherein said controller comprises an emergency braking control portion for controlling said actuator to apply emergency braking to said vehicle, and
    when emergency braking of said vehicle is required, said emergency braking control portion performs at least one of increasing said slip angle absolute value by a fixed amount and increasing said slip angle absolute value by a variable amount corresponding to a required deceleration of said vehicle.

4. The wheel control device according to claim 1, wherein said vehicle further comprises a power source for driving said wheel, and
    said controller comprises a driving control portion for controlling said actuator when said vehicle needs to be driven by said power source to reduce a driving torque of said wheel, generated by said drive source, using said braking force of said wheel.

* * * * *